US011042631B2

(12) United States Patent
Ghosh et al.

(10) Patent No.: US 11,042,631 B2
(45) Date of Patent: Jun. 22, 2021

(54) SYSTEM, METHOD AND COMPUTER READABLE MEDIUM FOR SOFTWARE PROTECTION VIA COMPOSABLE PROCESS-LEVEL VIRTUAL MACHINES

(71) Applicants: Sudeep Ghosh, Kirkland, WA (US); Jason D. Hiser, Charlottesville, VA (US); Jack W. Davidson, Charlottesville, VA (US)

(72) Inventors: Sudeep Ghosh, Kirkland, WA (US); Jason D. Hiser, Charlottesville, VA (US); Jack W. Davidson, Charlottesville, VA (US)

(73) Assignee: UNIVERSITY OF VIRGINIA PATENT FOUNDATION, Charlottesville, VA (US)

( * ) Notice: Subject to any disclaimer, the term of this patent is extended or adjusted under 35 U.S.C. 154(b) by 295 days.

(21) Appl. No.: 15/535,047

(22) PCT Filed: Dec. 11, 2015

(86) PCT No.: PCT/US2015/065335
§ 371 (c)(1),
(2) Date: Jun. 10, 2017

(87) PCT Pub. No.: WO2016/094840
PCT Pub. Date: Jun. 6, 2016

(65) Prior Publication Data
US 2018/0268130 A1 Sep. 20, 2018

Related U.S. Application Data

(60) Provisional application No. 62/090,556, filed on Dec. 11, 2014.

(51) Int. Cl.
G06F 21/54 (2013.01)
G06F 21/53 (2013.01)
G06F 9/455 (2018.01)

(52) U.S. Cl.
CPC .......... G06F 21/53 (2013.01); G06F 9/45558 (2013.01); G06F 21/54 (2013.01); G06F 2009/45591 (2013.01)

(58) Field of Classification Search
CPC ........ G06F 21/12; G06F 21/125; G06F 21/14; G06F 21/53–54; G06F 9/45558; G06F 2009/45591
See application file for complete search history.

(56) References Cited

U.S. PATENT DOCUMENTS 6,529,909 B1    3/2003   Bowman-Amuah
9,111,072 B1*   8/2015   Thai ................... G06F 21/10
(Continued)

OTHER PUBLICATIONS

Ghosh, Software Protection via Composable Process-level Virtual Machines, Dec. 2013.*

(Continued)

Primary Examiner — Minh Dinh
(74) Attorney, Agent, or Firm — Westerman, Hattori, Daniels & Adrian, LLP

(57) ABSTRACT

According to some illustrative embodiments, a method for blending the data of an execution environment and the data of the protected application includes modifying the data values of the protected application using the values of the execution environment in a semantically-neutral manner or modifying the data values of the execution environment using the values of the protected application in a semantically-neutral manner. In some other embodiments, a computer implemented method for binding an execution environment and a protected application includes: selecting at least one instruction from an instruction set of the protected (Continued)

HIGH-LEVEL OVERVIEW OF THE PROTECTION PROCESS. DURING APPLICATION CREATION, THE APPLICATION IS CO-LOCATED WITH A PROTECTIVE PVM. AT RUN TIME, THE PVM TAKES CONTROL OF EXECUTION AND RUNS THE APPLICATION IN A PROTECTIVE ENVIRONMENT.

application; selecting at least one context from within the protected application; assigning a new meaning to the selected at least one instruction for the selected at least one context; transforming a program to use the new meaning for the selected at least one instruction and the selected at least one context; and executing the program with the execution environment that knows the newly assigned selected at least one instruction and selected at least one context. In the preferred embodiments, the execution environment comprises any combination of a process-level virtual machine, a system-level virtual machine, a hypervisor, a simulator, an emulator, or a just-in-time compilation system.

8 Claims, 21 Drawing Sheets

(56) References Cited

U.S. PATENT DOCUMENTS

| 2006/0031686 A1 | 2/2006 | Atallah et al. |
| 2013/0007698 A1 | 1/2013 | Warila et al. |

OTHER PUBLICATIONS

Ghosh et al., What's the PointISA?, ACM, Jun. 2014.*

International Preliminary Report on Patentability (Form PCT/IB/373) issued in counterpart International Application No. PCT/US2015/065335 dated Jun. 13, 2017, with Form PCT/ISA/237 (7 pages).

Written Opinion and International Search Report issued in counterpart International Application No. PCT/US2015/065335 dated Feb. 23, 2016 (previously filed).

Gosh, et al. "Replacement Attacks Against VM-Protected Applications," In: ACM SIGPLAN Notices. Mar. 4, 2012. Cited in International Search Report.

Yu, et al. "A Feather-weight Virtual Machine for Windows Applications," In: Proceedings of the 2nd international conference on Virtual execution environment. Jun. 16, 2006. Cited in International Search Report.

* cited by examiner

A HIGH-LEVEL ILLUSTRATION OF PROCESS-LEVEL VIRTUALIZATION

HIGH-LEVEL OVERVIEW OF THE PROTECTION PROCESS. DURING APPLICATION CREATION, THE APPLICATION IS CO-LOCATED WITH A PROTECTIVE PVM. AT RUN TIME, THE PVM TAKES CONTROL OF EXECUTION AND RUNS THE APPLICATION IN A PROTECTIVE ENVIRONMENT.

COMPUTING SYSTEMS ARE DESIGNED USING LAYERS OF ABSTRACTION. THESE LAYERS TYPICALLY MANAGE DIFFERENT ASPECTS OF THE SYSTEM THAT PERTAIN TO THE IMPLEMENTATION. IN THIS PARTICULAR DESIGN, THE SYSTEM HAS BEEN PARTITIONED INTO THE HARDWARE, THE OS KERNEL, THE SYSTEM LIBRARIES, AND FINALLY, THE APPLICATIONS THAT RUN ON THE SYSTEM.

HIGH-LEVEL OVERVIEW OF THE *FETCH-DECODE-DISPATCH* MECHANISM THAT FORMS THE BASIS FOR PVMs. THE GUEST APPLICATION INSTRUCTIONS ARE DECODED, ONE AT A TIME AND DISPATCHED TO APPROPRIATE HANDLING FUNCTIONS, WHICH EXECUTE ACCORDING TO THE SEMANTICS OF THE INSTRUCTIONS.

(A) THE VIRTUALIZED APPLICATION, T R(P), IS RUN UNDER AN INTROSPECTION FRAMEWORK. STEPS ILLUSTRATING THE ATTACK METHODOLOGY ON VIRTUALIZED APPLICATIONS (B) THE CIF INTERCEPTS THE CALL TO THE ENTRY FUNCTION OF THE PROTECTIVE PVM. STEPS ILLUSTRATING THE ATTACK METHODOLOGY ON VIRTUALIZED APPLICATIONS (C) THE CIF PROCEEDS TO LOAD AN ATTACK PVM.
STEPS ILLUSTRATING THE ATTACK METHODOLOGY ON VIRTUALIZED APPLICATIONS (D) CONTROL IS THEN TRANSFERRED TO THE ENTRY FUNCTION OF THE ATTACK PVM,
WHICH PROCEEDS TO RUN P WITHOUT ANY DYNAMIC PROTECTIONS.
STEPS ILLUSTRATING THE ATTACK METHODOLOGY ON VIRTUALIZED APPLICATIONS

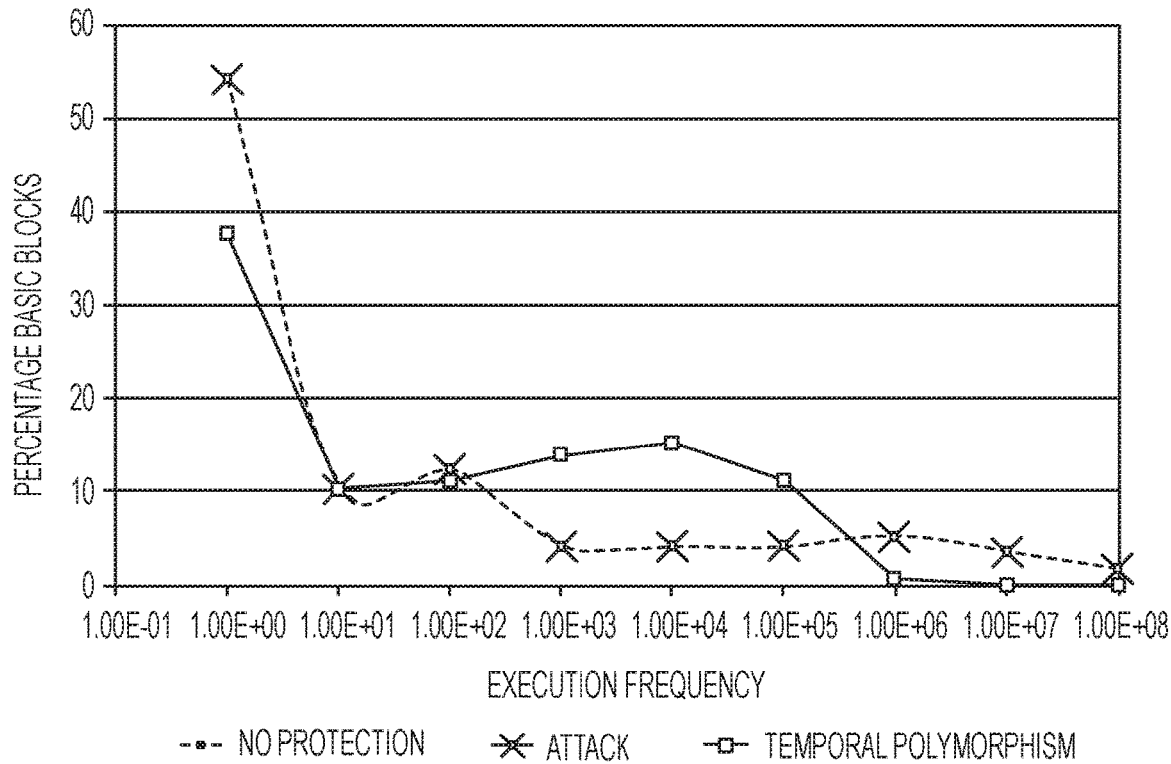

EXECUTION FREQUENCIES FOR THE APPLICATION BLOCKS UNDER THE THREE RUN-TIME SCENARIOS (NO PROTECTION, PROTECTED, AND ATTACK). THE PERIODIC FLUSHING AND RETRANSLATION OF THE APPLICATION'S CODE BLOCKS BY THE PROTECTIVE VM DRASTICALLY CHANGES THE EXECUTION FREQUENCY CHARACTERISTICS. UNDER THE CONTROL OF THE VM, BLOCKS NO LONGER EXECUTE AT VERY HIGH FREQUENCIES ($10^7$), INSTEAD SUBSTANTIALLY MORE BLOCKS EXECUTE AT INTERMEDIATE RATES ($10^3$ AND $10^5$), FORCING THE ATTACKER TO EXPAND THEIR SEARCH SPACE. REPLACING THE PROTECTIVE VM RESTORES THE ORIGINAL EXECUTION CHARACTERISTICS.

FIG. 8

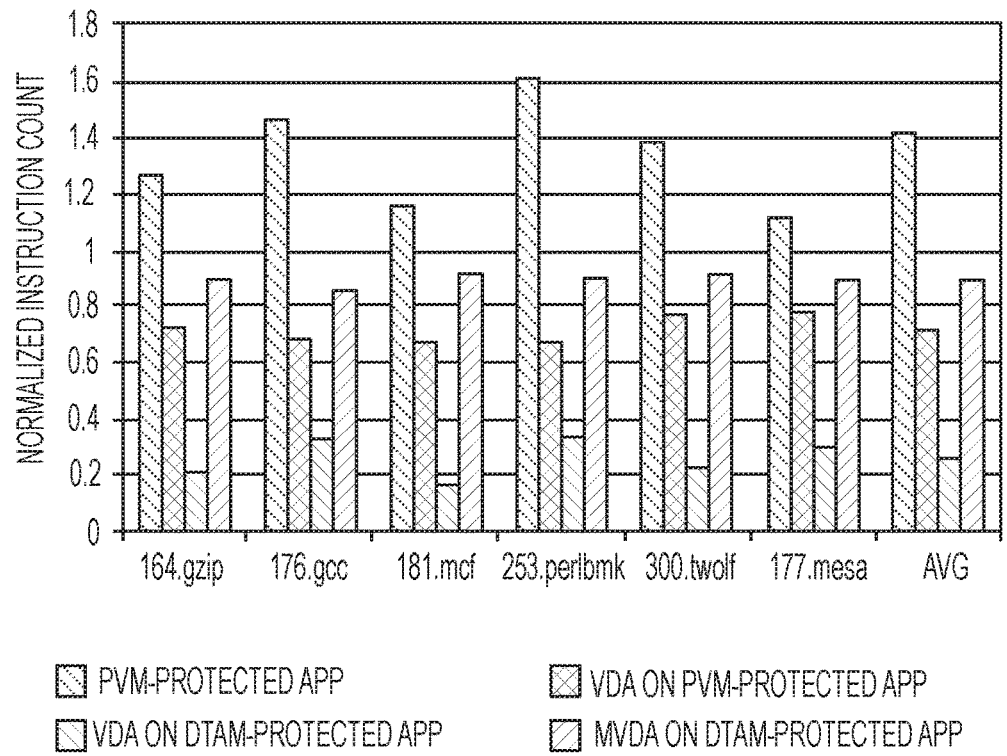

: DYNAMIC INSTRUCTION COUNTS, NORMALIZED TO THE ORIGINAL APPLICATION. THE FOUR SCENARIOS INCLUDE RUNNING THE PVM-PROTECTED APPLICATION, THE COUNT OF THE INSTRUCTIONS OBTAINED WHEN VDA IS APPLIED TO THE PVM-PROTECTED APPLICATION, THE INSTRUCTION COUNT WHEN VDA IS APPLIED TO AN APPLICATION PROTECTED WITH DYNAMIC ADDRESS-MODE TRANSFORMATION, AND FINALLY, MVDA APPLIED TO AN APPLICATION PROTECTED WITH DYNAMIC ADDRESS-MODE TRANSLATION.

FIG. 9D

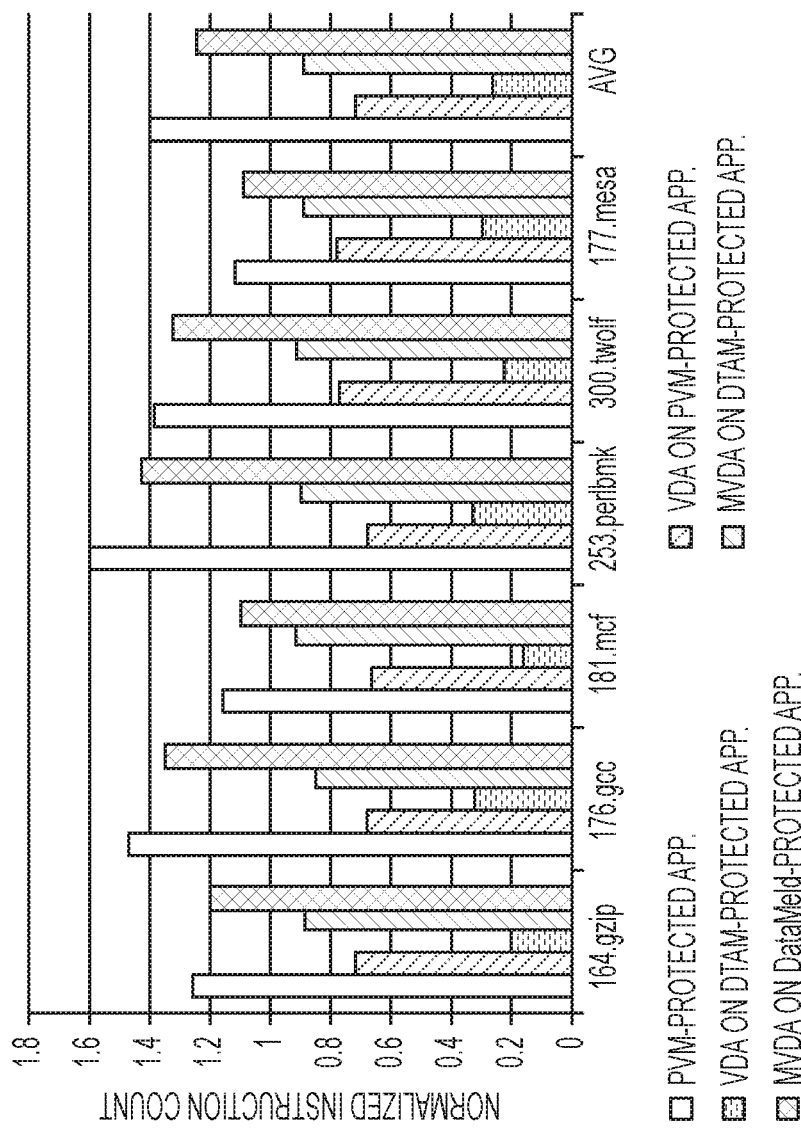

FIG. 9F

DYNAMIC INSTRUCTION COUNTS, NORMALIZED TO THE ORIGINAL APPLICATION ACROSS ALL THE FIVE SCENARIOS. TO RECAP, THESE SCENARIOS INCLUDE RUNNING THE PVM-PROTECTED APPLICATION AS IS, THE DIC OBTAINED WHEN VDA IS APPLIED TO THE PVM-PROTECTED APPLICATION, THE DIC WHEN VDA IS APPLIED TO AN APPLICATION PROTECTED WITH DTAM, THE DIC OBTAINED WHEN MVDA IS APPLIED TO AN APPLICATION PROTECTED WITH DTAM, AND FINALLY, THE DIC WHEN MVDA IS APPLIED TO AN APPLICATION PROTECTED VIA DataMeld.

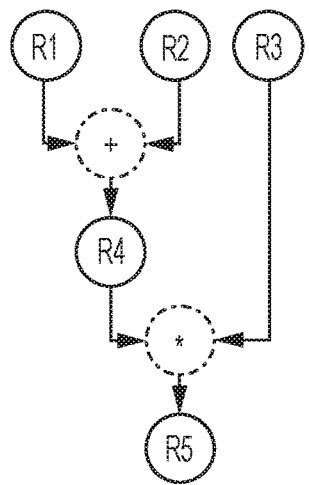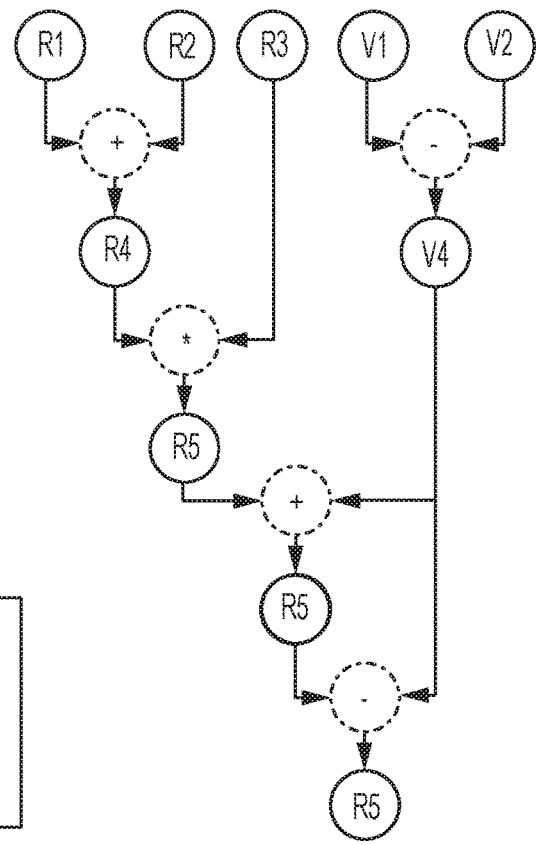
FIG. 11

SYSTEM, METHOD AND COMPUTER READABLE MEDIUM FOR SOFTWARE PROTECTION VIA COMPOSABLE PROCESS-LEVEL VIRTUAL MACHINES

The present application claims priority to U.S. Provisional application No. 62/090,556, filed on Dec. 11, 2014, entitled SYSTEM, METHOD & COMPUTER READABLE MEDIUM FOR SOFTWARE PROTECTION VIA COMPOSABLE PROCESS-LEVEL VIRTUAL MACHINES, the entire disclosure of which is incorporated herein by reference.

This invention was made with government support under contract W911NF-10-1-0131 awarded by the Army Research Office and contract CNS-00716446 awarded by the National Science Foundation. The government has certain rights in the invention.

FIELD OF THE INVENTION

The present invention relates generally to providing computer program security from malicious analysis and modification of software applications. The present invention relates more specifically to thwarting replacement attacks and value dependency attacks by using homographic instructions and interleaving a protected computer application to its associated process-level virtual machines (PVMs).

BACKGROUND

Today, computer and software usage has become ubiquitous. This proliferation of software systems has primarily been fueled by the availability of inexpensive hardware and development of advanced toolsets which enable programmers to create complex and efficient software applications using high-level languages. Software's malleability has enabled vendors to continuously provide new features and repair erroneous program operation, all without expensive hardware updates. Such utility, and ease of design and flexibility have enabled the use of software applications to provide critical functionality in a wide range of systems. To give a few examples, doctors use applications on embedded devices to diagnose and treat patients, and store patient related information on standard computing systems.

Transportation systems (e.g., air traffic control systems, highway traffic systems, railway switching systems, etc.) rely on the correct operation of software applications to ensure smooth and consistent functioning. Financial institutions use software to process important financial information about their clients.

Because software provides essential and critical functions in these systems, the software has become the target of malicious entities that aim to subvert the functionality of these systems for personal gain. Such entities have been aided in their goals by the availability of tools to reverse engineer application packages and obtain a higher level of comprehension (also known as decompilation). Reverse engineering tools, such as IDA-Pro [13], OllyDbg [14], and LordPE [15], have made it easier to obtain a representation at a higher level of abstraction and provide increasing opportunities for modification and unauthorized use. An adversary with access to such state-of-the-art technology and tools can modify the binary file (i.e., the software file that contains the instructions and data of the application), and use it to their own advantage.

Even with a superficial understanding of the software, an adversary can change the operation of a program and exploit functionalities which they are not entitled to use or cause damage to the underlying system (e.g., disrupting the network by tampering with the routing software, accessing privileged information). Any unauthorized modification to critical software systems could lead to extensive disruption of services and losses in terms of life and property. The Business Software Alliance estimated that worldwide losses due to information theft totaled $63.4 billion in 2011 alone, up from $59 billion in the previous year [16].

In addition, code tampering is commonly used by malware to exploit software systems. Worms and viruses are increasingly being programmed to first disable any protective software and then infect the system (called retroviruses) [17]. One example is the Beast Trojan, which infects different variants of Microsoft's Windows operating system, from Windows 98 to Windows XP [18]. It operates by modifying explorer.exe to incorporate and execute its payload. The payload then proceeds to disable any anti-virus and/or Firewall applications executing in the system and allowing the attacker to essentially obtain complete control over the host machine.

Because of the potential consequences of the such attacks along with the growing ease that they can be carried out, it has become vital to develop protection mechanisms that hamper reverse engineering and tampering of software, either on disk or while the program is running.

Computer or software hackers have designed an attack methodology, called replacement attacks, which targeted towards virtualized applications (i.e., applications that run under the mediation of a process-level virtual machine), that seeks to render the protective PVM ineffective. A replacement attack can be used against any application that is run under the mediation of a process-level virtual machine. The goal of a replacement attack is the circumvention of the dynamic protections driven by PVMs, thereby making dynamic analysis easier. Unfortunately, existing protection schemes, such as software checksumming guards fail to adequately protect virtualized applications from replacement attacks.

In evaluating existing tamper resistance techniques and developing metrics to measure the strength of tamper resistance techniques, serious flaws in current PVM-based protections were discovered, since previous attempts in virtualization-based software protections have approached the design of the application and the PVM in isolation.

That is, it is indeed possible to use Value-based Dependence Analysis (VDA) to inspect software, and extract critical information using post-execution analyses (i.e., by examining the application trace, which refers to the sequence of executed instructions) [57]. Such attacks consist of isolating unique application attributes (e.g., system calls) from the trace, and performing a data flow analysis. In traditional PVM systems, the data access patterns of the application, and those of the PVM are distinct. As such, examining the flow of data could reveal all the relevant information about the original application.

Thus, there is a continuing need for new composition methodology for the creation of tamper resistant software that provides a robust tamper-resistant execution environment.

SUMMARY OF THE PREFERRED EMBODIMENTS

To address this flaw, a revolutionary new composition methodology for the creation of tamper resistant software was developed that provides a robust tamper-resistant execution environment.

According to some illustrative embodiments of the invention, a method for blending the data of an execution environment and the data of the protected application includes modifying the data values of the protected application using the values of the execution environment in a semantically-neutral manner, wherein the execution environment comprises any combination of a process-level virtual machine, a system-level virtual machine, a hypervisor, a simulator, an emulator, or a just-in-time compilation system.

According to some other illustrative embodiments of the invention, a method for blending the data of an execution environment and the data of the protected application, comprising: modifying the data values of the execution environment using the values of the protected application in a semantically-neutral manner, wherein the execution environment comprises any combination of a process-level virtual machine, a system-level virtual machine, a hypervisor, a simulator, an emulator, or a just-in-time compilation system.

In some further embodiments, the modifying step includes: applying at least one operation on the data values of the protected application using a execution environment data value as an operand; and applying the inverse of the at least one operation using the same execution environment data value as an operand.

In some other further embodiments, the modifying step occurs at different points in the run time of the protected application.

In some other further embodiments, the modifying step occurs during preprocessing, compilation, linking, static analysis, or binary rewriting time.

In some other further embodiments, the modifying step occurs when the execution environment obtains control, the execution environment translates or analyzes the protected application, when the execution environment beings execution, or when the protected application begins execution.

In some other further embodiments, the modifying step includes: storing the data values of the protected application on a software stack; using the execution environment to read the data values on the software stack; changing at least one data value using at least one execution environment variable; storing the changed at least one data value back on the software stack; translating the protected application with the at least one changed data value using the execution environment; reverting the changes to the at least data value after translating; and storing the reverted at least data value to the original stack position, wherein the changes to the at least one data value have no semantic effect of the protected application.

In some other further embodiments, the at least one execution environment variable is determined based on the number of execution environment operations that affect the variable.

According to some other embodiments of the invention, a computer implemented method for binding an execution environment and a protected application includes: selecting at least one instruction from an instruction set of the protected application; selecting at least one context from within the protected application; assigning a new meaning to the selected at least one instruction for the selected at least one context; transforming a program to use the new meaning for the selected at least one instruction and the selected at least one context; executing the program with an execution environment that effects the assigned new meaning for the selected at least one instruction and selected at least one context, wherein the execution environment comprises any combination of a process-level virtual machine, a system-level virtual machine, a hypervisor, a simulator, an emulator, or a just-in-time compilation system.

In some further embodiments, the transforming includes: transforming the protected application using the at least one selected instruction to modify the program; and undoing the transformation such that the program remains semantically neutral as long as the selected at least one instruction is executed with the given meaning.

In some other further embodiments, the transformation includes modifying a program's registers, memory, files, locks, shared memory, pipes, or network connections.

In some other further embodiments, the transformation includes checking that the selected at least one instruction executes using the assigned new meaning in the selected at least one context.

In some other further embodiments, the transformation includes modifying the program such that it likely will not be semantically neutral if the selected at least one instruction executes in selected at least one context, but does not implement the assigned new meaning.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 8 shows an illustrative graph of execution frequencies for application blocks under three run-time scenarios;

FIG. 9D is an illustrative graph of dynamic instruction counts, normalized to the original application;

FIG. 9F is an illustrative graph of dynamic instruction counts, normalized to the original application across five scenarios;

FIG. 11 provides a schematic diagram illustrating an aspect of an embodiment of the present invention;

DETAILED DESCRIPTION OF THE PREFERRED EMBODIMENTS

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

Part 1—Introduction

Figure 1:
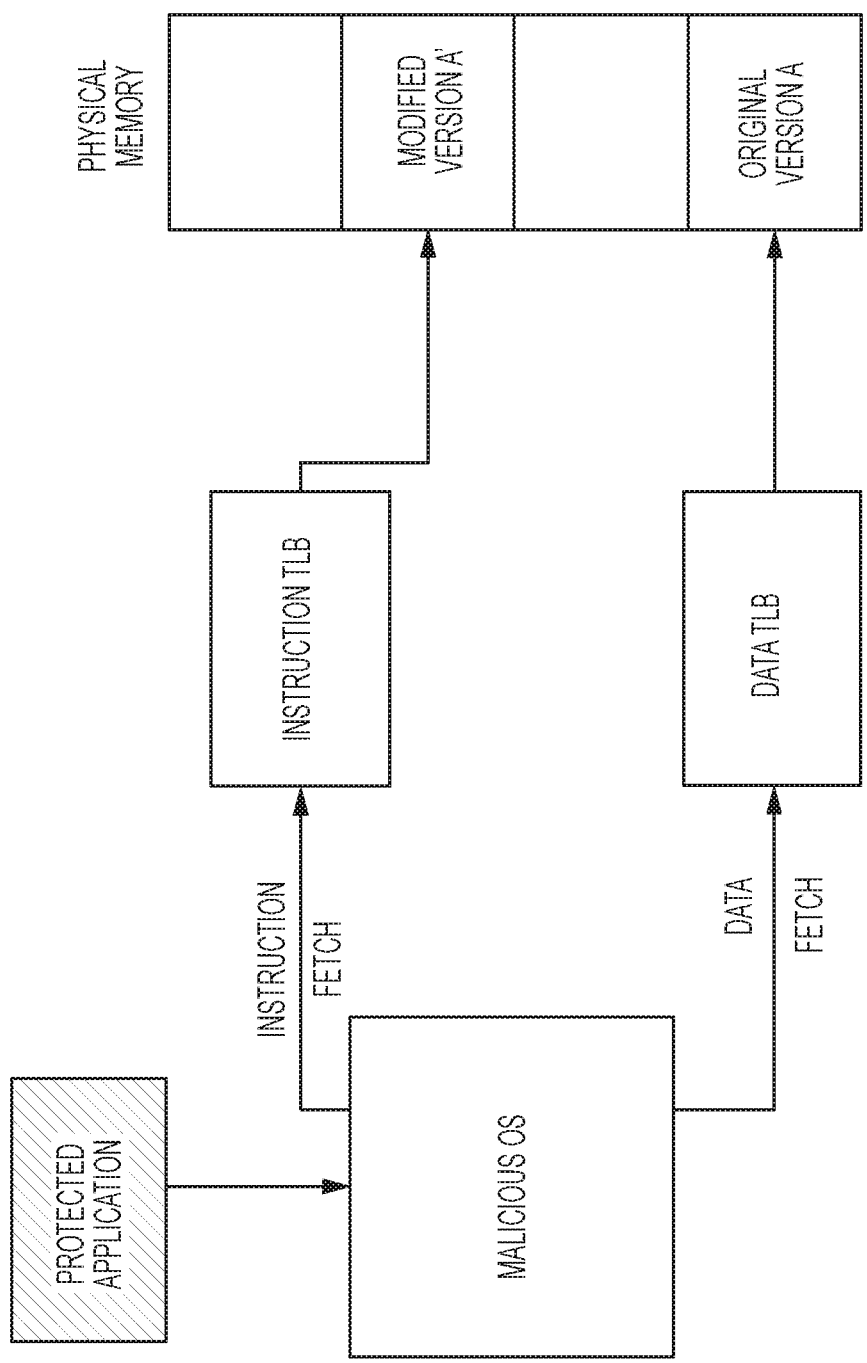
FIG. 1 provides a flow diagram of an illustrative attack methodology.

FIG. 1 shows split memory attack on guard systems, as devised by Wurster et al. The Translation Lookaside Buffer (TLB) is a structure that is used to store virtual to physical address mappings. Instruction fetches are directed by the OS to physical addresses containing pages from the modified program A' whereas data reads go to the original version A.

In particular, FIG. 1 illustrates this attack methodology in more detail. The adversary initially creates a tampered version (A') of the original protected program (A). The malicious OS maps instruction accesses to A', while data accesses are directed to unmodified pages from A in the data cache.

Consequently when the application validates the application code through data reads (such as when guards read their input), it accesses A, while the actual instructions that would execute on native hardware are fetched from A0. This technique also allows an adversary to quickly identify loads from the text segment and potentially locate and remove checksumming code.

Once deployed, the software is susceptible to attack. An adversary can use various tools such as debuggers, simulators, and emulators to run, modify, and observe the program in a number of ways.

Even the operating system can be modified to return inaccurate information [20]. Consequently, we consider all software on the machine as potentially malicious, and the entire application created at the trusted development site (including any virtual machines distributed with said software) as potentially vulnerable to attack.

Furthermore, even hardware devices in the entire system cannot be trusted, as the application may be running within a simulator or emulator which can arbitrarily return forged results to the application. In essence, this is a white-box attack on the application [21]. The adversary can inspect, modify, or forge any information in the system.

Given enough time and resources, the adversary can always succeed in manually inspecting and making modifications to the program [22]. However, human adversaries have difficulty directly solving problems involving large data sets. As such, they rely on algorithmic solutions in an attempt to disable security features in software. Typically, adversaries use automated tools to perform various analyzes on application packages, including determining instruction locations, disassembling the program, and capturing the control-flow or call graphs, to name a few. The goal of this research is to make such tasks harder to accomplish.

1.4 Limitations of Current Approaches

Current tamper-resistance techniques suffer from a variety of drawbacks.

Most techniques have targeted making the application hard to analyze statically [23, 24, 10, 25]. For example, an opaque predicate is a binary expression (usually true or false) that is hard to analyze statically, but several runs in a simulator can provide the adversary with information required to defeat the protections. Static encryption techniques have been used to prevent static disassembly of applications [12]. Unfortunately, once loaded into memory, decryption occurs at a coarse level of granularity.

Finally, a number of schemes have been proposed recently, which attempt to improve the run-time protection of applications, primarily using virtualization [11, 34]. A major contribution of this research is presentation of strong evidence through demonstration that such schemes are not fully mature, and are susceptible to attacks. Part 8 discusses these attacks.

Given these limitations, there is an urgent need for new techniques that protect software. This research presents a detailed exploration of the applicability of process-level virtualization to software tamper resistance.

1.5 Software Virtualization

Software Virtualization is a versatile technique that involves the addition of a layer of software between an application (often called the guest) and the underlying platform (often called the host). This addition is done to enhance different properties of the application (e.g., security or flexibility). This layer of software, called the virtual machine, encapsulates a single process (a process-level virtual machine (PVM), or an entire operating system (a system-level virtual machine)). This research focuses exclusively on utilizing PVMs for program protection.

Figure 2:
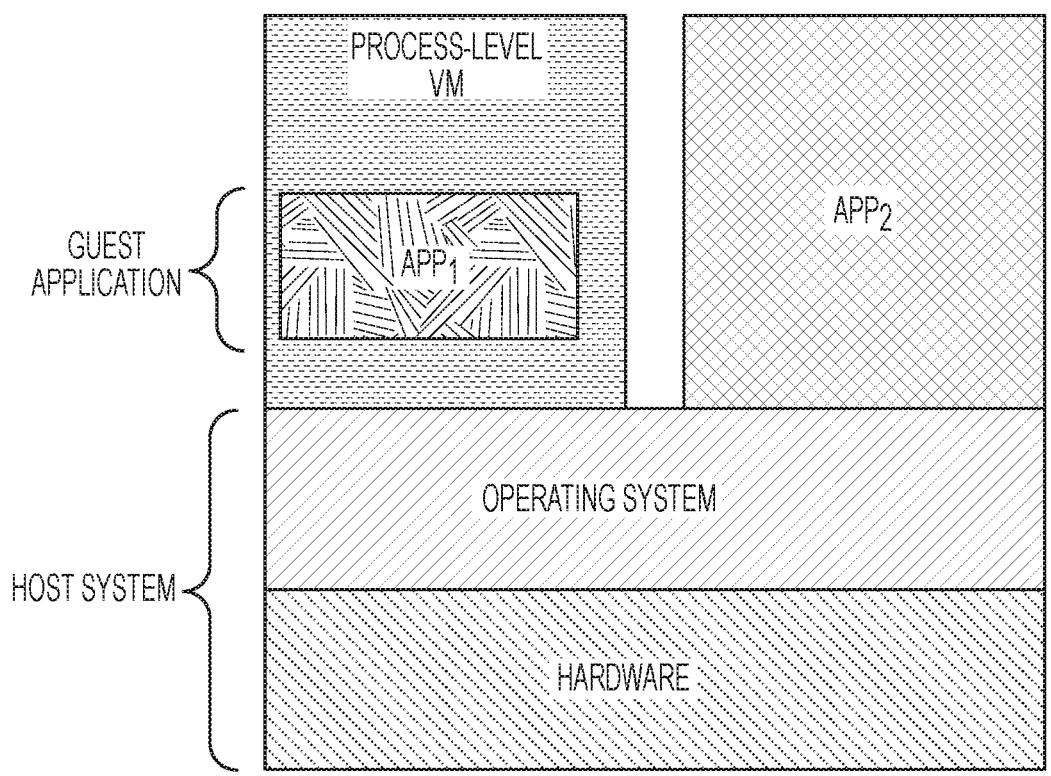
FIG. 2 shows an illustrative high-level drawing of process-level virtualization.

FIG. 2 shows a high-level illustration of process-level virtualization. In particular, FIG. 2 illustrates two applications running on a computing system (the host). Application $App_2$ is a process that runs natively on the system. $App_1$ runs via a PVM. On startup of $App_1$, the PVM assumes control and starts emulating the instructions of $App_1$ on the host.

1.6 Thesis

Set in the context described in Section 1.4, it can be recognized that new techniques are required to thwart an adversary's goals of subverting critical software and exploiting them for their own malicious goals. This research investigates the aptness of process-level virtualization for software tamper resistance.

The thesis of this dissertation is that composing applications with process-level virtual machines can effectively hamper reverse engineering and tamper attacks on software.

In the context of this research, composing an application is defined as creating a PVM-protected application in a holistic manner. Previous attempts in virtualization-based software protections have approached the design of the application and the PVM in isolation. This research demonstrates that designing the applications and the PVM in close harmony leads to a more robust execution environment. The protection mechanisms reinforce each other, instead of acting in and of themselves.

Figure 3:
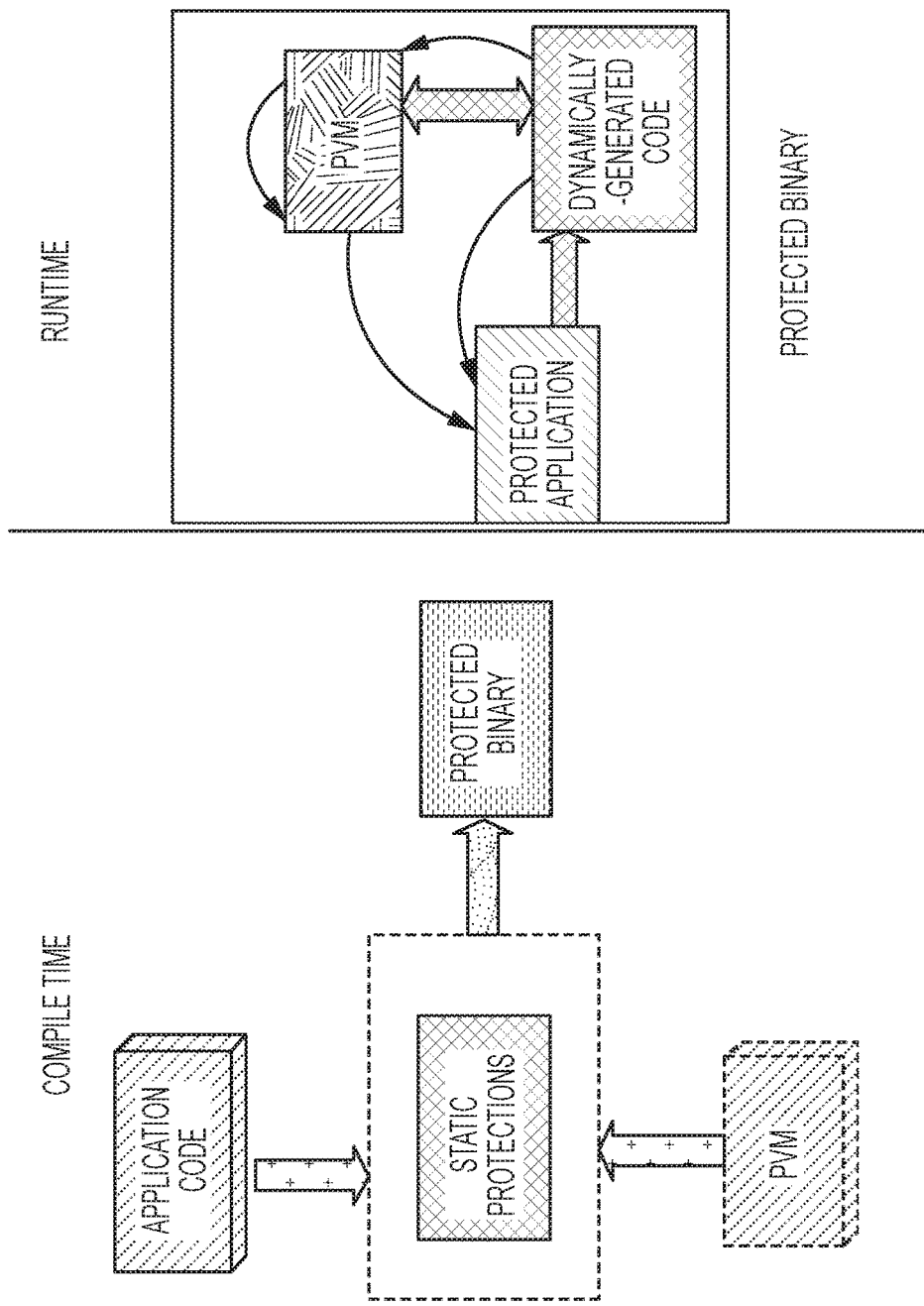
FIG. 3 shows an illustrative high-level overview of a protection process.

FIG. 3 shows a high-level overview of the protection process. During application creation, the application is co-located with a protective PVM. At run time, the PVM takes control of execution and runs the application in a protective environment.

In particular, FIG. 3 illustrates the creation and application of protection techniques using the proposed approach. During software creation the application is combined with a protective PVM. Then, the consolidated package is protected using static techniques.

At run time, the PVM gains controls and proceeds to create a protective execution environment. The execution pattern of the PVM is intertwined closely with that of the application. Throughout the execution process, several protection techniques are applied that mutually reinforce each other and thwart dynamic attacks. Composing applications with PVMs also reduces the leakage of useful information at run time. Thus, this technique provides a robust environment for thwarting tamper attacks during application execution.

Process-level virtualization provides a platform for enhanced run-time security. Attackers are increasingly using dynamic techniques to attack software (e.g., running applications under a debugger or a simulator) [19]. Virtualization allows run-time monitoring and checking of the code being executed, making them an excellent tool for applying dynamic protection schemes [42]. The virtual machine can also mutate the application code as it is running (e.g., changing code and data locations, replacing instructions with semantically equivalent instructions), hampering iterative attacks [34].

It is advantageous to have the protection techniques closely integrated with the application, yet keep the implementations separate. This modular approach enables easier testing and debugging of the system, and it allows legacy systems to be retrofitted with new protections without the need for modification and recompilation or to change the software development process. These properties are particularly expedient in a situation where the software developer and the software defender are not the same. The developer can create and test the application. Once assured that the application meets the required specifications, they can then transfer the binary to the defender for processing. VMs can be used to provide such a flexible capability.

Static protection schemes can be strengthened when the application is virtualized. For example, encryption is a useful technique that hampers static analysis of programs. Because the encrypted code cannot be run directly on commodity processors, the software decryption of the application code becomes a point of vulnerability. For example, schemes which decrypt the application in bulk are susceptible to dynamic analysis techniques [19], whereas decryption at a lower granularity (e.g., functions) can suffer from high overhead [12, 30]. In contrast, executing encrypted applications under the control of a VM has been shown to have a better performance-security trade-off [43]. Virtualization incurs low information leakage, with the addition of a small performance overhead [34]. Another example is the improvement of the robustness of integrity checks that are located in the application. When run under a VM, these integrity checks never execute from their original location, instead, they can be invoked from randomized locations in memory [34]. This randomization makes it harder for the attacker to locate and disable the checks.

Virtualization at both the process level [37, 36], and the system level [35], has been shown to be effective at thwarting reverse engineering. In fact, many protection techniques are oblivious to the underlying implementation (e.g., both [35] and [34] use on-demand decryption of code to thwart reverse engineering).

A computing system is a collection of several resources, including (but not limited to) an ALU, registers, memory and I/O devices. Each computing system has a specific Instruction Set Architecture (ISA) that controls operations. Software applications are sequences of these instructions which facilitates the computation of complex problems on these computing systems. Computing systems have evolved in complexity considerably since the Intel 8086 microprocessors. Currently, multiple ALUs interconnect and combine with several I/O devices and networking infrastructure to provide a base platform. Consequently, even simple software applications that run on such platforms consist of millions of instructions. The key to managing such complexity, and to increasing flexibility, involves dividing the system into levels of abstraction. Traditionally, each abstraction layer encapsulates and addresses different parts of the requirements of the system, reducing overall complexity compared to monolithic architectures. The layers of abstraction are arranged in a hierarchy, with the lower layers implemented in hardware, and the upper layers in software. Each layer has a well-defined interface, allowing design tasks to be decoupled. The top of this hierarchy provides the interface through which software applications interact with the system.

Figure 4:
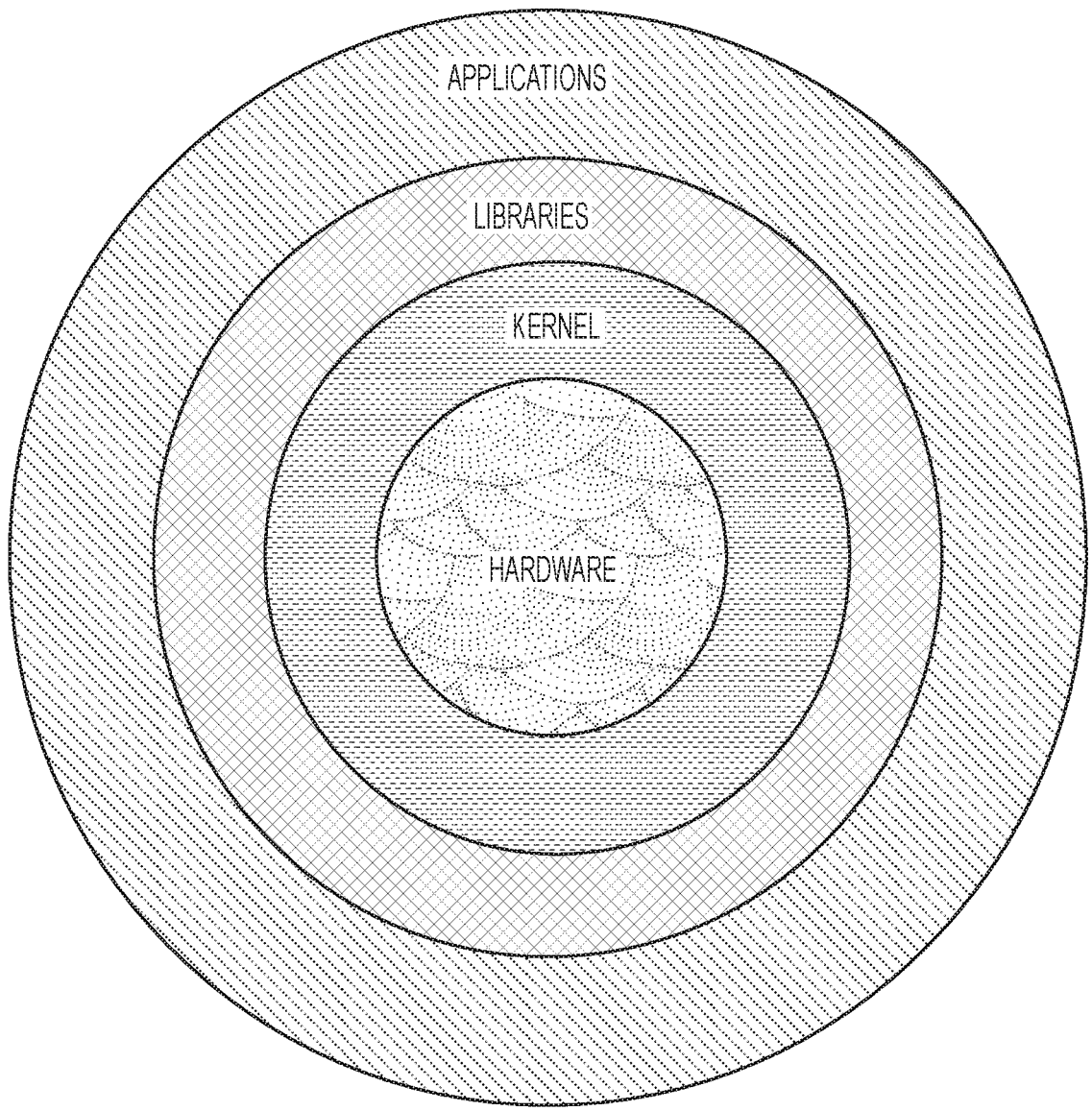
FIG. 4 shows an illustrative high-level overview illustrating computing systems designed using layers of abstraction.

The operating system (OS) kernel software, application libraries and networking software implement various aspects of these layers. FIG. 4 give a high-level overview of the design.

As shown in FIG. 4, computing systems are designed using layers of abstraction. These layers typically manage different aspects of the system that pertain to the implementation. In this particular design, the system has been partitioned into the hardware, the OS kernel, the system libraries, and finally, the applications that run on the system.

Virtualization involves the addition of an extra software layer, between the application and the underlying platform. It has been used to overcome the barriers imposed by new hardware [44, 45], or to improve security [46, 47, 40]. Formally, Popek and Goldberg defined virtualization as the construction of an isomorphism that maps the resources of a virtual system (called the guest) onto the resources of the native system (called the host) [44]. It is the responsibility of the virtual machine to run the application compiled for the guest (called the guest application) on the host system, as the resources of the guest might not be the same as the host. Some of the necessary tasks include converting the guest application's instructions to run on the host, and mediating communication between the application and the host platform. Virtualization can be implemented at the system level, or at the process level. A system-level virtual machine (SVM) provides a complete system environment. This environment enables a single hardware platform to support multiple OSes, each running several user processes. Each guest OS can access the underlying hardware resources, including network interfaces, disk interfaces, displays, etc.

Process-level virtual machine (PVM) refers to the software layer around a solitary guest application. The guest application runs under the mediation of the PVM, giving the appearance of a native process to the underlying host. Although PVMs are complex systems, they are all variations of the fetch-decode-dispatch method [48], which forms the basis for a standard multiple-stage pipelined processor [49].

Figure 5:
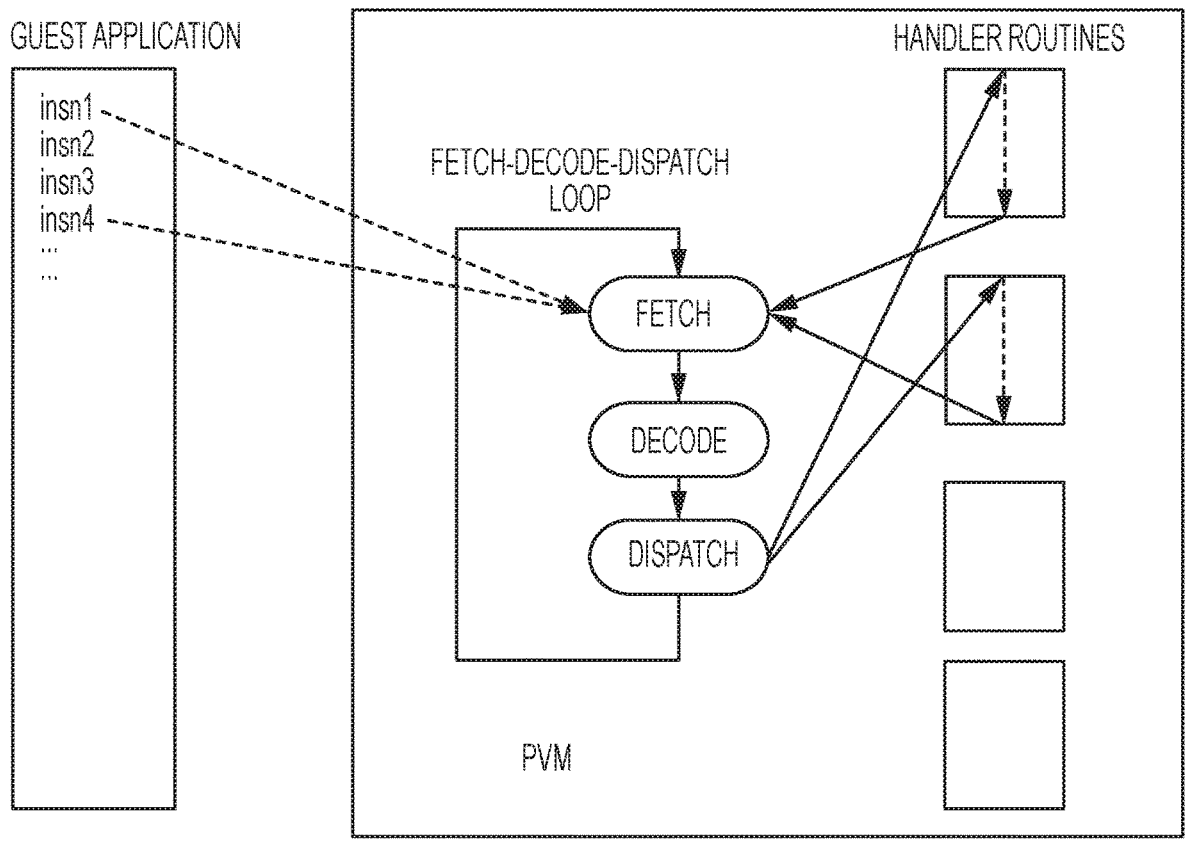
FIG. 5 shows an illustrative high-level overview of a fetch-decode-dispatch mechanism that forms the basis for PVMs.

FIG. 5 shows a high-level overview of the fetch-decode-dispatch mechanism that forms the basis for PVMs. The guest application instructions are decoded, one at a time and dispatched to appropriate handling functions, which execute according to the semantics of the instructions. In particular, FIG. 5 gives a high-level overview of this scheme. PVMs based on this method consist of a central loop, which steps through the guest application, one instruction at a time, and modifies resources on the host according to the instruction. The loop consists of three main phases: the decode phase, which fetches one instruction, based on program order, and decodes that instruction. Based on the decoding, the dispatch phase invokes an appropriate handling routine. Finally, the execute phase utilizes the relevant operands to execute the semantics of the instruction on the host platform.

In and of themselves, PVMs based on decode-dispatch-execute are inefficient. Such PVMs execute each instruction of the guest application using several instructions on the host machine. To enable adoption of program protection techniques based on PVMs, performance overhead needs to be reduced. As such, several optimization techniques have been designed to improve the run-time performance of PVMs.

The threaded approach improves performance by removing the central decode-dispatch loop [50]. The decoding and dispatching logic is appended to the execution semantics by duplicating code to the end of each handling routine. Although this technique increases code size, it improves performance on processors that have branch prediction.

Binary translation is one of the most efficient methods of virtualization. This techniques involves conversion of the guest application code block into instructions that can be directly executed on the host machines (called translation). The translated blocks can also cached in software to amortize the overhead of virtualization over the entire course of execution. This technique is known as Software Dynamic Translation, and PVMs implementing this technique are referred to as software dynamic translators (SDTs). The PVM only translates those code blocks that are scheduled to be executed [51].

Numerous other techniques have also been proposed for reducing performance overhead of binary translators [52, 53, 54, 55]. The protective PVM in our case study is implemented using the Strata binary translator [51, 56].

Figure 6:
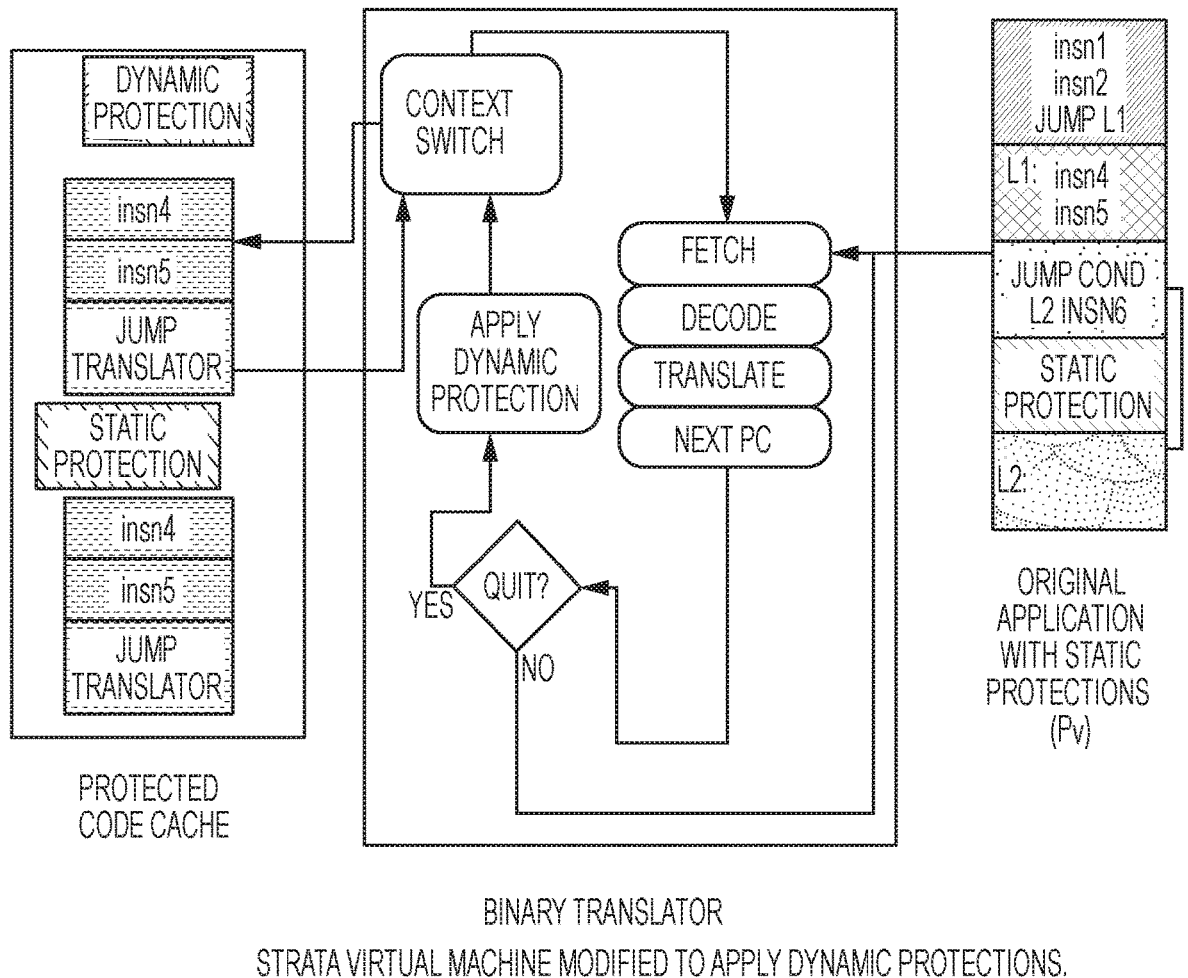
FIG. 6 shows an illustrative diagram of a mechanism of Strata, modified to apply protection techniques.

FIG. 6 illustrates the mechanism of Strata, modified to apply protection techniques. At program start up, Strata gains control of execution, saves the current execution context (i.e., current PC, register values, conditional codes, etc.), and starts fetching, decoding and translating instructions from the application's start address. This process continues until an end-of-translation condition is satisfied. At this point, Strata appends a code sequence to the block that will return control back to Strata. This code sequence is termed as a trampoline. Each trampoline is associated with an application address, containing the instruction to be executed. Consequently, Strata restores context and proceeds to transfer control to the newly translated block. After the block completes execution, control transfers back to Strata via the trampoline, and the next instruction to be scheduled for execution is translated.

During this process of translation, Strata can apply various protection techniques to the newly translated blocks. This dynamic nature of code creation in SDT libraries facilitates new mechanism to dynamically thwart analysis and reverse engineering, which are missing from current state-of-the-art techniques.

The translated code blocks, instead of being disposed of after execution, are cached in a region in memory (called the software cache or software cache) [46]. Strata initially searches the cache before attempting translation. If the block is found, control will be directed to the cached block.

When an application instruction is translated and cached, Strata overwrites all trampolines, that are associated with this application instruction, with direct transfers to the translated counterpart. This overwriting is known as patching. Each patch connects a block, previously using a trampoline to transfer control to the SDT, to the translated instruction. Therefore, the context switch to and from the SDT is no longer performed, resulting in reduction in overhead.

This process of caching significantly reduces the cost of translation. The figure also depicts the ways in which protection techniques can be applied by Strata. Any mechanism that is part of the original application, get translated on to a new location in the code cache. During translation itself, Strata can apply dynamic protection schemes that thwart reverse engineering and tamper.

Part 2—Point-ISA: Binding the Application to the PVM

Chapters 5 and 6 in the above-referenced Provisional Application No. 62/090,556 incorporated herein by reference above illustrated the effectiveness of PVMs in improving the tamper detection and code obfuscation of applications. In particular, instantiation and temporal polymorphism can make it hard for the adversary to successfully reverse engineer the application. Consequently, any attack on the application has a higher chance of success if the protective PVM can be disabled.

This Part investigates an attack methodology that targets applications protected using process level virtualization. The basic premise behind this attack strategy is that the PVM is not tightly bound to the application, and can be replaced by the adversary. Using a replacement attack, the attacker can effectively remove any dynamic protection technique provided by process-level virtualization and proceed to analyze the application. After presenting a thorough investigation of this attack methodology, we present a novel approach to counter replacement attacks. The basic premise behind this solution is to create a unique relationship between the application and the protective PVM instance, based on the semantics of certain instructions. This relationship facilitates the detection of any attempt to execute the application without mediation by the protective PVM.

Some of the major contributions of this Part are listed below.

Design of a novel attack methodology, called replacement attacks, targeted towards virtualized applications (i.e., applications that run under the mediation of a process-level virtual machine), that seeks to render the protective PVM ineffective [103]. A replacement attack can be used against any application that is run under the mediation of a process-level virtual machine. The goal of a replacement attack is the circumvention of the dynamic protections driven by PVMs, thereby making dynamic analysis easier.

Demonstration that existing protection schemes, such as software checksumming guards fail to adequately protect virtualized applications from replacement attacks. Thus, a novel solution is required to thwart this class of attacks.

Use of a comprehensive, two-part case study that describes in detail, the replacement attack methodology. The first part of this study describes the creation of a protected, virtualized application, and then how an attacker can replace the protective PVM. We describe two prototypes of the replacement attack using easily available, free-to-use tools. The first involves replacing the protective PVM with an attack PVM (i.e., a PVM without any protections). The second prototype involves running the application on a modified simulator which circumvents the protective PVM and simulates the application directly. These examples demonstrate the feasibility and effectiveness of replacement attacks on non-trivial applications. We then discuss the implications of the replacement attack in the second part of our case study. It involves examining dynamic attacks on unprotected applications, PVM-protected applications, and applications subjected to the replacement attack. Our results show that the replacement attack renders the application completely vulnerable to run-time analysis and subsequent tamper.

Design of a novel solution that thwarts replacement attacks. This solution, termed Point-ISA seeks to bind the application to its associated protective PVM instance. This novel relationship is achieved by inserting instructions into the application, whose semantics have been modified for this particular context (application and protective PVM instance). Any other interpreter attempting to execute the application will interpret these instructions according to their original semantics and can be detected.

Design of a prototype that implements our ideas. Using this prototype, we have performed extensive analysis on various issues related selecting instruction selection and attack response. We have also studied responses techniques in the case when a replacement attack has been detected. Our findings demonstrate that Point-ISA is effective against replacements attacks.

The organization of this Part is as follows: In Section 2.1, we define the replacement attack methodology and give a formal description using our model. Section 2.2 describes two implementations of this attack. In Section 2.3, we analyze the effects of this attack on applications protected using the PVM-based techniques described in Chapters 5 and 6 of the above-referenced Provisional Application No. 62/090,556 incorporated herein by reference above. Section 2.4 presents some techniques that an adversary can exploit to gain information before launching such attacks. The second portion of this Part deals with a solution strategy against replacement attacks. Section 2.5 describes this strategy, called Point-ISA, and defines it in terms of the formal model. In Section 2.6, we address some of the design decisions related to Point-ISA. Section 2.7 explains the creation of a prototype of this solution scheme, and evaluates its effectiveness. Section 2.8 provides a detail security discussion of this scheme. Finally, our results are summarized in Section 2.9.

2.1 Replacement Attack

The first portion of this Part explores the loose connection between the application and the protective PVM instance. The only requirement on the part of the PVM involves the ability to interpret the semantics of the application's instruction sequence. This weak binding stems from the need to make applications platform-independent, which was one of the major goals behind virtualization.

The application is compiled once, and should be runnable on many platforms. This adaptability is facilitated by the virtual machine, which is implemented according to the specifics of the native platform. In this paradigm (exemplified by Java), it is essential that the application and the PVM be unbound.

We demonstrate that such adaptability leads to a serious weakness when PVMs are utilized in program protection. An able adversary can replace the protective PVM instance with a benign VM, and proceed to analyze the application unhindered. We define such attacks as replacement attacks, targeting software application packages protected by process-level virtualization. Once the PVM and its associated protection mechanisms are replaced, an adversary can apply standard reverse engineering techniques to study the application. In the next section, we proceed to describe this attack methodology. This description is facilitated by extending the equational model introduced in Chapter 3 of the above-referenced Provisional Application No. 62/090,556 incorporated herein by reference above.

2.1.1 Modeling the Attack

The main motive behind designing the model was to facilitate the description of various defenses and attacks involving PVM-protected applications. In this section, we extend the equations introduced in Section 3.1 of the above-referenced Provisional Application No. 62/090,556 incorporated herein by reference above, to represent the replacement attack methodology. We consider a generic software application that has been compiled to run on the Intel x86 platform. Equation 7.1 describes such an application.

$$P_{APP} = <I_{APP}^{x86}, IN_{APP}, OUT_{APP}, ASSETS_{APP}> \quad (7.1)$$

Recall that $I_{APP}^{x86}$ refers to refers to its instruction sequence in the x86 ISA. $IN_{APP}$ and $OUT_{APP}$ refer to its input and output set, respectively. Finally, $ASSETS_{APP}$ refers to its assets. $IN_{APP}$ contains a subset of inputs, denoted by LP that confirms that validity of application execution (i.e., all the established rules for application execution have been met).

The software defender applies several transformations that are designed to protect the application. These transformations are represented by the operator, TR, which can be applied to an application. Equation 7.2 describes the protected application.

$$P_{TR(APP)} = <I_{TR(APP)}^{x86}, IN_{APP}, OUT_{APP}, ASSETS_{APP}> \quad (7.2)$$

$I_{TR(APP)}^{x86}$ refers to the transformed instruction sequence. The rest of the variables have the same meaning as in Equation 7.1. In our research, an example of a transformation could be to encrypt the instruction sequence, which is then decrypted at run time by Strata.

Next, we model the protective PVM (in this case, Strata), which runs the protected application. We assume that the hardware platform is an instance of the Intel x86 architecture. Equation 7.3 describes the Strata PVM.

$$P_{strata} = <I_{strata}^{x86}, IN_{strata}, OUT_{strata}, ASSETS_{strata}> \quad (7.3)$$

$I_{strata}^{x86}$ represents the instruction sequence of Strata in the x86 ISA. The input set for Strata is a subset of $\rho_{APP} \Delta IN_{APP} \times C_{strata}$, where $\rho_{APP}$ refers to all applications. In this example, we assume that the applications have been compiled for the Intel x86 architecture and subsequently protected. $IN_{APP}$ represents the input set to the applications. Finally, $C_{strata}$ refers to the configurations for Strata, to enable executing the application. Similarly, the output set for Strata, $OUT_{strata}$, consists of $OUT_{APP} \times O_{strata}$, where $OUT_{APP}$ refers to the outputs generated by the application, and $O_{strata}$ represents the outputs generated by Strata. $ASSETS_{strata}$ refers to the assets of the PVM.

We now focus on the run time. This application is interpreted by Strata, which applies dynamic protections techniques, similar to those described in Chapters 5 and 6 of the above-referenced Provisional Application No. 62/090, 556 incorporated herein by reference above. Referring to Equation 3.11 of said Provisional Application No. 62/090, 556 incorporated herein by reference above, the interpretation by Strata can be modeled as:

$$\phi_{strata}(P_{TR(APP)}, in_{APP}, m_{strata}^{in}) \rightarrow <out_{APP}, m_{strata}^{out}> \quad (7.4)$$

In Equation 7.4, $\phi_{strata}$ refers to the interpretation operation under Strata. $P_{TR(APP)}$ refers to the protected application, the operation TR( ) indicating that the application can also be protected by techniques independent of Strata (e.g., static protections). The input variable, $\text{in}_{APP}$ consists of the application inputs. $m_{strata}^{in}$ represents the initial memory state. At the conclusion of interpretation, $\text{out}_{APP}$ is generated, and the final memory state is denoted by $m_{strata}^{out}$.

The Strata PVM is, itself a software application that is interpreted by the x86 platform. As described in Section 3.1 of the above-referenced Provisional Application No. 62/090,556 incorporated herein by reference above, this framework can model nested interpretation. Equation 7.5 represents the interpretation of Strata on the Intel x86 platform.

$$\phi_{x86}(P_{strata}, \text{in}_{strata}, m_{x86}^{in}) \rightarrow <\text{out}_{strata}, m_{x86}^{out}> \quad (7.5)$$

The x86 interpreter takes as input the Strata software application, $P_{strata}$, and an input, $\text{in}_{strata}$, while generating output $\text{out}_{strata}$. The memory state is transformed from $m_{x86}^{in}$ to $m_{x86}^{out}$.

Expanding the variables in Equation 7.5 to include the representation of the protected application, $P_{TR(APP)}$, we obtain Equation 7.6, which illustrates the full nested interpretation.

$$\phi_{x86}(P_{strata}, <P_{TR(APP)}, \text{in}_{APP}, c_{strata}>, m_{x86}^{in}) \rightarrow$$
$$<<\text{out}_{APP}, o_{strata}>, m_{x86}^{out}> \quad (7.6)$$

The input to the interpreter is composed of a tuple, comprising the protected software application TR($P_{APP}$), the input to the original application, $\text{in}_{APP}$, and $c_{strata}$, the configuration settings for Strata to run the application. For example, if the application is encrypted, $c_{strata}$ can represent the decryption key. The memory is in its initial state, which can be broken down into the memory state for Strata, $(m_{x86}^{in})^{strata}$, and the state for the application, $(m_{x86}^{in})^{APP}$. On successful completion, the output, $\text{out}_{APP}$ is generated, and memory reaches its final state, denoted by $m_{x86}^{out})^{strata}$ and $(m_{x86}^{out})^{APP}$.

Next, we describe the replacement attack using our model. To remove PVM-enabled obfuscations, and to execute and analyze the application unhindered, the adversary replaces the protective PVM with a benign instance. We refer to such a PVM instance as the attack PVM. This PVM can also interpret any application that has been compiled to run on Strata, but enables the adversary to perform any analysis. The attack PVM can be represented by:

$$P_{attack} = <I_{attack}^{x86}, \text{IN}_{strata}, \text{OUT}_{strata}, \text{ASSETS}_{attack}> \quad (7.7)$$

Comparing Equations 7.3 and 7.7, we observe that the attack VM has the same input set, and generates the same output set as Strata. $I_{attack}^{x86}$ denotes the instruction sequence for the attack PVM on x86 machines. Finally, $\text{ASSETS}_{attack}$ represents the assets of the attack PVM. We now proceed to model the attack, by modifying Equation 7.6.

$$\phi_{x86}(P_{attack}, <P_{TR(APP)}, \text{in}_{APP}, c_{attack}>, m_{x86}^{in}) \rightarrow$$
$$<<\text{out}_{APP}, o_{attack}>, m_{x86}^{out}> \quad (7.8)$$

Equation 7.8 illustrates the replacement attack. The x86 interpreter operates on the attack PVM, $P_{attack}$. The inputs consist of a 3-tuple comprised of the protected application, $P_{TR(APP)}$, the input to the application, $\text{in}_{APP}$, and a configuration setting for the PVM, $c_{attack}$. During interpretation, the memory state is transformed from $m_{x86}^{in}$ to $m_{x86}^{out}$. On conclusion, the interpreter outputs a tuple consisting of $\text{out}_{APP}$, which is the output of the application, and $o_{attack}$, which is the output specific to the attack PVM. The adversary can configure the attack PVM to generate additional information that could facilitate analysis. An example of $o_{attack}$ could be the run-time trace of the application, which enables dynamic control flow analysis.

Thus, the replacement attack enables the adversary to remove any dynamic protections, and study the application unobfuscated. With the formal model in place, we proceed to describe the details of this attack against a PVM-protected application.

2.1.2 Description of the Attack

The replacement attack methodology targets the surface of the application that is most vulnerable to attack (i.e., when protections are at their weakest). More specifically, this attack methodology targets the application just after start up (when static protections are not as effective), but before the PVM assumes control and begins applying protections to the application. If successful, the attack disengages the protective PVM and disables the run-time protections.

To craft a successful replacement attack against PVM-protected applications, certain requirements need to be met:

The attacker must be able to locate the entry function (EP) of the protective PVM in TR(P). The entry function is defined as the function of the PVM which initiates software virtualization. The entry function often takes the starting address location of P's code as an argument.

The attacker must be aware of the guest application's instruction set architecture. The code of the guest application P, is typically obscured using a secret ISA or encryption. To analyze and run P after the protective PVM has been disabled, the attacker needs to be cognizant of the ISA, which involves either analyzing and understanding the secret ISA, or extracting the key from the binary.

Section 2.8 discusses these requirements in more detail, including heuristics that the attacker can employ to obtain the required information.

The attack occurs in two stages. In the first stage, the attack PVM has to be extended to decode the protected application, which involves understanding the guest ISA. If the ISA is encrypted, the decryption keys and algorithms must also be obtained and used to further extend the attack PVM by including the decryption algorithm and keys. Details on deciphering the guest application's ISA are given in Section 2.4.2.

FIG. 7 shows steps illustrating the attack methodology on virtualized applications. In particular, FIG. 7 illustrates the second stage of the attack on TR(P). In FIG. 7(a), the attacker invokes TR(P), under a code introspection framework CIF observing instructions as they execute. Well known examples of CIFs include Pin [82] and QEMU [104]. The attacker modifies the CIF to locate the call to the entry function of the protective PVM.

The initialization routine then proceeds to prepare the PVM's internal structures. As the entry function of the protective PVM is invoked, the CIF intercepts this call and extracts the start address, depicted in FIG. 7(b). Details on identifying the PVM's entry function are given in Section 2.4.1.

Figure 7A:
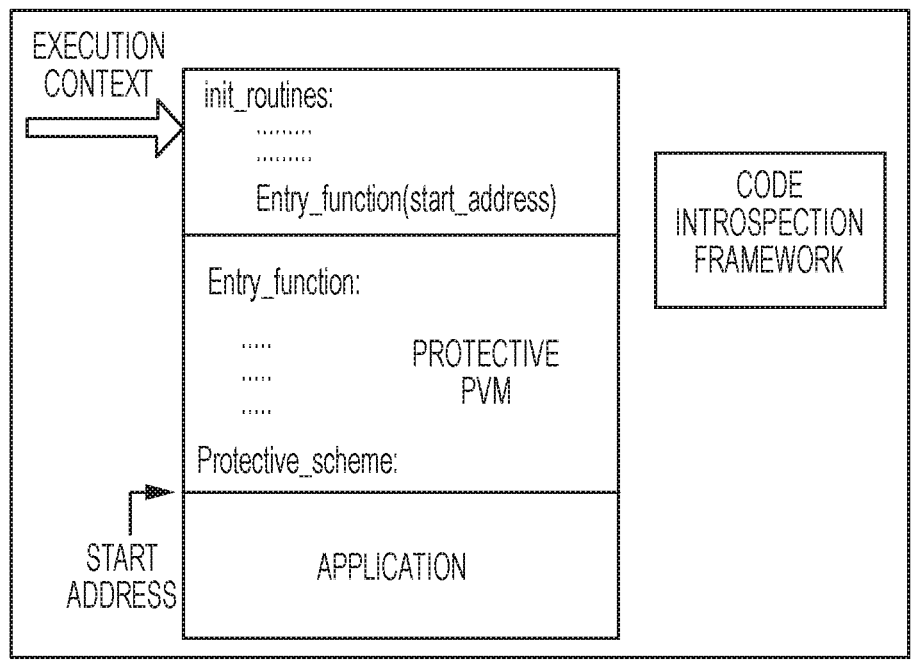
FIG. 7 shows steps illustrating an attack methodology on virtualized applications.
Figure 7B:
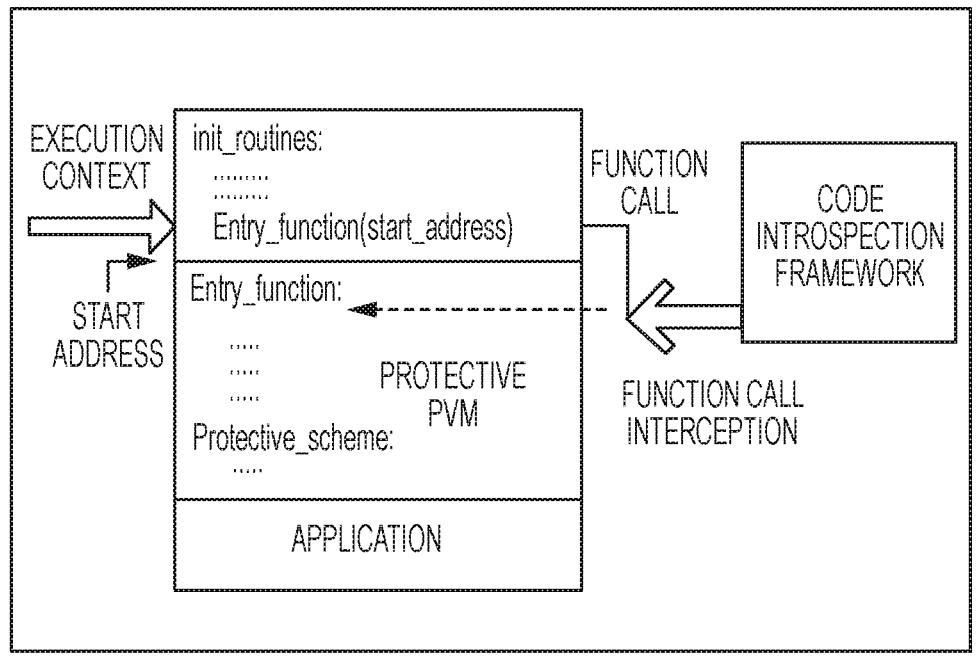
Figure 7C:
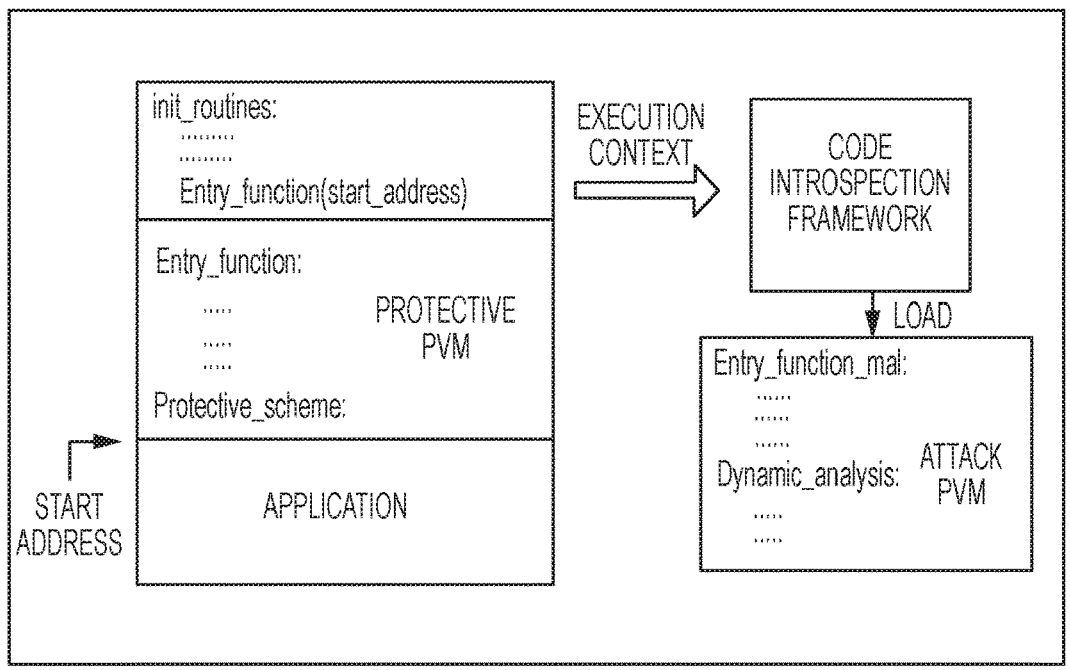

The CIF then proceeds to load and initialize the attack PVM, shown in FIG. 7(c). The CIF then invokes this attack PVM with P's start address which has been extracted from the initial call.

Figure 7D:
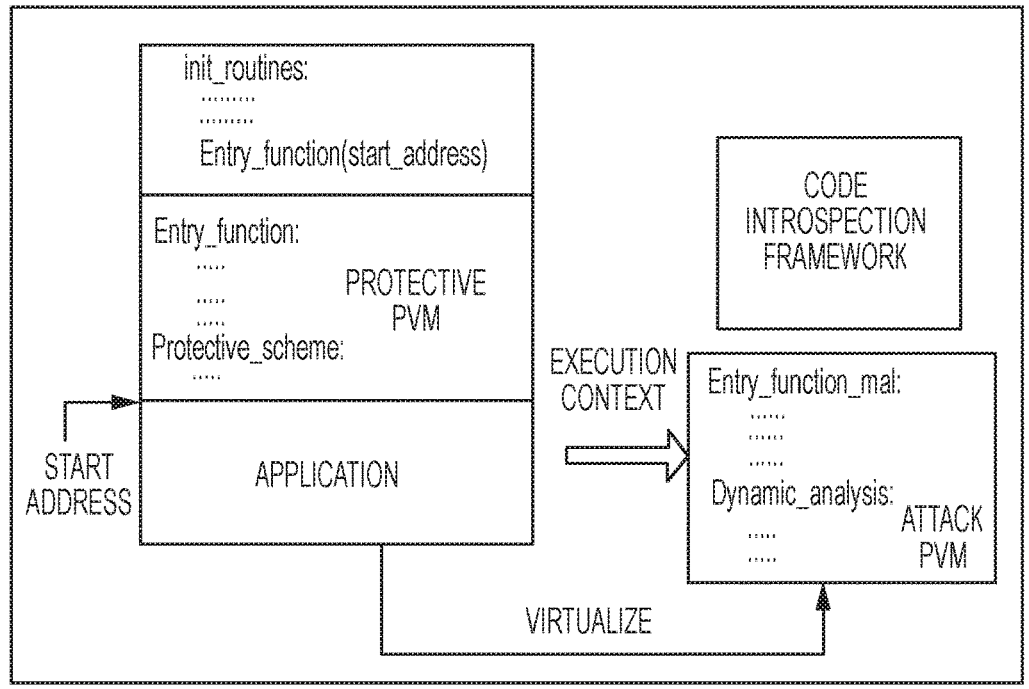

Thus, P now runs under the mediation of the attack PVM (shown in FIG. 7(d)). The protective PVM is circumvented and fails to provide dynamic protection to P. The attack PVM can be used to perform tasks that helps the attacker understand P (e.g., dump information, identify function locations, trace instructions, etc.).

In Section 2.2, we describe two proof-of-concept implementations that use the approach just described. The first prototype makes use of a widely used CIF, Pin, to replace the protective PVM with an attack PVM and execute the guest application. The second uses a modified architectural simulator, which performs code introspection as well as virtualization.

2.2 Use Cases

This section provides a comprehensive case study of the replacement attack methodology. It describes, Strata, the protective virtual machine, and the creation of the protected application, TR(P). The target application was chosen from the integer benchmarks of the SPEC CPU2000 suite [105]. The benchmarks were selected as examples of typical applications and they are commonly used to measure run-time performance. These benchmarks range from a few thousands lines of code to hundreds of thousands of lines, and perform various tasks. Thus, these benchmarks present a wide range of code size and functionality to validate our ideas. For the purposes of this discussion, we focus on the 256·bzip2 benchmark as the target guest application, P. 256·bzip2 is a modified version of the bzip compression program. All our tests were carried out on the Intel x86 32-bit platform running Linux OS. All the components were initially compiled using gcc.

2.2.1 Attack Implementations

This section describes two implementations of the attack methodology that renders the application, P, vulnerable to analysis and subsequent attack based on information obtained from that analysis.

The first proof-of-concept uses a dynamic instrumentation framework (Pin) to replace Strata with an attack PVM (built using HDTrans [52] that we extended to perform AES decryption). The second implementation uses an architectural simulator, PTLsim [83], as both the code introspection framework and the attack PVM. While we use these particular tools to demonstrate the methodology, any similar tools would suffice.

Attack Using a Dynamic Binary Translator

This prototype uses Intel's run-time binary instrumentation framework, Pin [82], to replace Strata with another binary translator, HDTrans. Pin offers a rich API to dynamically inspect and modify the instrumented application's original instructions. The instrumentation functionality is implemented in a module called a Pintool. At run time, the Pin framework takes as input the Pintool and the target software, and performs the necessary instrumentation.

Because the protected application is encrypted, we must first locate the decryption routine in the protective PVM and extend the attack VM to use the same algorithm. The cryptographic primitives are located in the PVM which is not as strongly protected as the application, enabling easier analysis. Techniques have been proposed which can automatically infer these cryptographic primitives from binary code [106, 107, 108]. These schemes involve profiling the virtualized application and analyzing the trace to locate the cryptographic primitives. We successfully used Gröbert's technique to identify the underlying algorithm (AES) and extracted the key [106]. HDTrans was subsequently modified to use AES decryption on the application code blocks prior to translation. Section 2.4.2 describes techniques that can be used to obtain cryptographic information in greater detail.

The Pintool, which implements the attack, operates as follows: It starts by loading and starting execution of the protected application. As execution proceeds, the Pintool watches for the entry point function of the protective PVM. In the case of Strata, the call to entry point function is preceded by the following code sequence:

7.2: Listing of x86 assembly code snippet preceding the entry point into Strata.

```
pop %eax
sub 0x1c, %esp
pusha
pushf
push %eax        ; contains application start address
push <address>   ; return address
jmp <address>    ; jump to entry point function
```

When the entry point function is invoked, the Pintool extracts the application's start address from its argument list. It then dynamically loads the extended HDTrans, proceeds to initialize HDTrans, and transfers the application start address to HDTrans. Thus, HDTrans takes control of the protected application and Strata never executes. The application can now be analyzed in any number of ways. We modified HDTrans to write the execution trace to disk. The attack essentially disables checksumming guards from verifying code integrity. Guards located in Strata are never invoked, whereas guards present in P continue to verify the integrity of P and Strata which remain unchanged. At this point, P's code is available for analysis.

Attack Using an Architectural Simulator

The second prototype for the attack uses the PTLSim architectural simulator [83]. In this implementation, PTLSim acts as the instrumentation framework as well as the attack PVM.

PTLsim models a modern superscalar Intel x86 compatible processor core along with the complete cache hierarchy, memory subsystem and supporting hardware devices. It models all the major components of a modern out-of-order processor, including the various pipeline stages, functional units and register set. PTLsim supports the full x86-64 instruction set along with all the extensions (SSE, SSSE, etc.). More details of the simulator can be found in the user's manual.

The Intel x86 ISA is a two-operand CISC ISA, however PTLSim does not simulate these instructions directly. Instead, each x86 instruction is first translated into a series of RISC-like micro-operations (uops). To further improve efficiency, PTLSim maintains a local cache containing the program ordered translated uop sequence for the previously decoded basic blocks in the program.

The attack proceeds as follows: The cryptographic primitives are obtained as in Section 2.2.1, and PTLSim is extended to decrypt instructions after fetching them from memory. At load time, PTLSim initializes its internal data structures and reads in TR(P)'s binary file. The fetch stage of PTLSim accesses instructions from the memory address pointed to by its program counter, called the Virtual Program Counter (VPC). We modified the fetch stage to check for the instruction sequence (illustrated previously in Section 2.2.1) denoting Strata's entry function. Once the fetch stage recognizes the entry function, the simulator retrieves its arguments, which contain the start address of the application code. The simulator then discards its current instruction, waits for the pipeline to empty, and then proceeds to fetch instructions from the retrieved application start address. The simulator decrypts the instruction using the extracted key before decoding it into its constituent uops. In this way, Strata never executes and PTLSim is able to fetch and simulate P's instruction directly.

As with the previous prototype, checksumming guards fail to provide adequate protection. The guards only check the original code, which is never executed. We can analyze P in PTLSim's local cache and modify it, if desired.

2.3 Implications of the Attack

In section 6.4.2 of the above-referenced Provisional Application No. 62/090,556 incorporated herein by reference above, we presented a use case to illustrate the obfuscation properties of the PVM. Continuing with the same example, we show that the replacement attack effectively reduces the run-time execution environment of the protected application to that of an unprotected instance. To study the effects of the attacks, we applied the profiling techniques of Section 6.4 to an additional run-time scenario:

The protected application that has been subjected to a PVM-replacement attack, (i.e., the application is running under the control of a compromised PVM (Attack)).

The dynamic blocks in this third scenario were collected as before, i.e, by instrumenting the applications and identifying blocks based on their memory address.

FIG. 8 shows execution frequencies for the application blocks under the three run-time scenarios (Noprotection, Protected, and Attack). The periodic ushing and retranslation of the application's code blocks by the protective VM drastically changes the execution frequency characteristics. Under the control of the VM, blocks no longer execute at very high frequencies ($10^7$), instead substantially more blocks execute at intermediate rates ($10^3$ and $10^5$), forcing the attacker to expand their search space. Replacing the protective VM restores the original execution characteristics.

In particular, FIG. 8 is the extension of FIG. 6.4, of the above-referenced Provisional Application No. 62/090,556 incorporated herein by reference above, displaying the execution frequency of all three cases. An adversary attempting to analyze the protected application directly, will encounter a much larger space for exploration. As discussed in Section 6.4 of the above-referenced Provisional Application No. 62/090,556 incorporated herein by reference above, temporal and instantiation polymorphism lead to a large increase in the dynamic instruction and consequently, basic block counts. FIG. 8 shows that replacing the protective PVM yields much more successful results. The attack reveals the original execution frequency of the application, which had previously been obfuscated by the PVM.

For example, in the case study, the number of dynamic code blocks increased from around 3.7K for the unprotected run, to more than 160K when the application was subjected to PVM protection. Similarly, the number of distinct CFG edges rose from 6.4K to 290K. Once the protective PVM is replaced, the number of dynamic blocks and edges exposed return to their original values. Launching a successful replacement attack reduces the search space for the adversary by a considerable amount.

Replacing the PVM enables the adversary to obtain correct information about the application run time. Column 1 of Table 7.1 shows the top-ten most frequently executing blocks when the application is run without any protections. Column 2 displays the ranking of these blocks when the application is run under the control of the PVM. Finally, Column 3 reveals the ranking after the successful completion of the replacement attack. The PVM is able to reorder the blocks based on execution frequency. We observed similar reordering when rankings were based on the in-degree of the code blocks. Such a reordering can seriously affect analysis performed by the adversary. Replacing the protective PVM enables the original block rankings to be determined. Table 7.2 shows the list of the ten most frequently executed blocks when the application is run under the protection of the PVM along with their corresponding ranks in the unprotected run. This study shows that replacing the PVM enables the use of frequency analysis to uncover critical information about the application.

The replacement attack methodology is pivotal to the success of reverse engineering PVM protected applications. Once the protective PVM has been replaced, the application can be analyzed and its true characteristics studied without any obstruction.

TABLE 7.1

Original application addresses of the top ten most frequently executing blocks in the unprotected run, with their corresponding rank when run under the protection of a PVM. The standard deviation for these blocks in the protected run comes to 239, indicating a very high degree of variability. Consequently, more effort will be required to locate the blocks. A successful replacement attack restores the rankings.

| Application Address | Rank (No Protection) | Rank (Protected) | Rank (Attack) |
| --- | --- | --- | --- |
| 0x8048830 | 1 | 121 | 1 |
| 0x804ac3c | 2 | 45 | 2 |
| 0x804ac1b | 3 | 13 | 3 |
| 0x80507d4 | 4 | 9 | 4 |
| 0x80507d9 | 5 | 173 | 5 |
| 0x80507c0 | 6 | 18 | 6 |
| 0x80507fa | 7 | 29 | 7 |
| 0x805082c | 8 | 351 | 8 |
| 0x8050810 | 9 | 139 | 9 |
| 0x804a750 | 10 | 779 | 10 |

TABLE 7.2

Original application addresses of the top 10 most frequently executing blocks when the application is run under the protection of the PVM, along with their corresponding rank when the application runs unprotected, and when it is subjected to the replacement attack.

| Application Address | Rank (No Protection) | Rank (Protected) | Rank (Attack) |
| --- | --- | --- | --- |
| 0x804bcc0 | 162 | 1 | 162 |
| 0x804ac21 | 17 | 2 | 17 |
| 0x804ac74 | 36 | 3 | 36 |
| 0x804bcd3 | 21 | 4 | 21 |
| 0x804a7a0 | 42 | 5 | 42 |
| 0x804abaf | 164 | 6 | 164 |
| 0x804a81a | 88 | 7 | 88 |
| 0x804a99b | 126 | 8 | 126 |
| 0x80507d4 | 4 | 9 | 4 |
| 0x804a7ca | 63 | 10 | 63 |

2.4 Attack Discussion

Section 2.2 described two implementations of an attack that seeks to remove the protective PVM from a virtualized application, TR(P). Both implementations were crafted using freely-available tools and resulted in the guest application, P, running with the added protections disabled. Checksumming guards inserted into TR(P) failed to prevent the replacement. To successfully orchestrate the attack, some prior information about TR(P) is required. In this section, we discuss some heuristics the attacker can use to determine this information.

2.4.1 Determining PVM Entry Function

To launch a successful attack, the location of the entry function (EP) to the protective PVM must be determined. The attack PVM intercepts any calls to this function, as one of the arguments consists of the start address to P. To obtain this location, the attacker can inspect TR(P) for distinctive instruction sequences that indicate the location of the entry function.

For example, prior to initialization, the PVM saves the current application's context. Upon initialization, the PVM restores the application's context. On 32-bit Intel x86 platforms, the instructions pusha and pushf are commonly used by dynamic translators to save state. Section 2.2.1 displayed the instruction sequence used by Strata to save state, which contains these two instructions. Dynamo-RIO, HDTrans and Pin also use these instructions to store register and flag values prior to initiating translation. Investigation into the C benchmarks of the SPEC CPU2000 suite, compiled using standard flags, revealed that none of the application binaries contained these instructions. Consequently, an adversary can use the presence of these instructions to help identify potential entry points into the PVM. Because of the unique actions of the PVM, simple examination of these potential entry points can determine the actual entry point.

The attacker can also use information flow analysis to determine the entry point of a PVM. Most compilers place code and data in separate sections in the binary file. Data-read accesses into the code section are likely to be from the PVM. Thus, using taint analysis on this data and backtracing where the data location was determined will enable the attacker to determine the entry function of the PVM. Since the PVM initialization typically occurs very early, the attacker will only have to analyze a smaller amount of code to determine the entry function. This code is not subjected to any dynamism making analysis easier.

2.4.2 Determining the ISA of the Guest Application

Another requirement to use a replacement attack is the identification of the ISA of the guest application, P. Traditionally, P's code has been protected by obscurity [36, 11] or encryption [34]. The attacker has to analyze the on-disk binary to obtain information required for determining the ISA, which is then used to configure the attack PVM. This section discusses some heuristics that the attacker can utilize to obtain the relevant information.

Rolles et al. have done extensive work in investigating ISAs used by obfuscation tools such as VMProtect and Themida [41]. The semantics of the ISA are not released to the public providing security through obscurity. At the time protections are applied, P's instructions are converted to a custom ISA chosen from a set of template ISAs, which is then interpreted at run time by a PVM designed specifically for that ISA. These ISAs are RISC-like, lacking many of the complex features of traditional ISAs like Intel x86. Since these tools derive the final ISA from a template, the instruction sequences of two different protected binaries will have many similarities. This fact makes the analysis of the syntax and semantics more tractable. Further, parts of the x86 instruction set such as the SIMD instructions are not virtualized by VMProtect. The guest ISA can also be protected via encryption. Manually analyzing and reverse-engineering cryptographic keys and routines can be an arduous task. Recently, researchers have designed techniques that facilitate automatic identification and extraction of cryptographic routines. Gröbert et al. have presented a novel approach to identify cryptographic routines and keys in an encrypted program [106]. Their techniques involve profiling the application and applying heuristics to detect the cryptographic operations. Some of the heuristics proposed by the authors include excessive use of arithmetic functions, loops and investigating the data flow between intermediate variables across multiple runs. This technique is able to identify common encryption algorithms, such as AES and DES, and extracts the key as well.

Even if the application is protected by a proprietary encryption algorithm, researchers have devised techniques to isolate and extract this information from the binary. Caballero et al. have designed a technique to automatically identify code fragments from executable files, so that they are self-contained and can be reused by external code (called binary code reutilization) [108]. They successfully applied this technique to identify and extract cryptographic routines from a set of malware files. Similarly, Leder, et al. examined data in-flow and out-flow in memory buffers to isolate cryptographic functions [107]. Therefore, such identification techniques can be applied to the protective PVM to obtain the decryption routines, and consequently, used to configure the attack PVM.

Decryption key management is also an issue for the protective PVM. The attacker can use dynamic analysis techniques to extract the decryption key. Halderman et al. point out that modern DRAMS retain their contents for a significant amount of time and an attacker could locate and exploit these keys to analyze encrypted data [64]. Skype is a popular VoIP tool which uses encryption as a tool to hamper static analysis. Biondi et al. were able to decipher Skype's code by obtaining its decryption key from memory [19]. Techniques, such as white-box cryptography, were proposed to improve key management in encrypted systems [21]. However, researchers have since developed solutions to extract the key from such systems [67]. Once the key is available, deciphering the encrypted ISA is straightforward regardless of the strength of the encryption algorithm.

Therefore, obscuring the ISA fails to adequately protect the guest application from analysis. Previous work has shown that the attacker can analyze such ISAs using reasonable time and effort [19, 41]. Once the ISA is known, the attacker can successfully replace the protective PVM.

2.5 Point-ISA: Using Homographic Instructions to Semantically Bind the Application and the PVM The replacement attack succeeds due to the fact that the application can be virtualized by any PVM that can interpret the ISA of P. This section proposes a solution that thwarts replacement attacks, by semantically binding P with a specific instance of the protective PVM (i.e., P can only be interpreted by a unique PVM instance).

This protection scheme is facilitated by the implementation of a property adopted from the field of classical linguistics, called homography [109]. Homography refers to the property of words with identical representation, but different semantics. For example, bark has two meanings in the English language; the noise made by a dog, and the outer covering of a tree. The appropriate meaning conveyed by this word depends on the containing sentence.

We apply this property in the context of software virtualization to ensure that the protective PVM is not replaced. Traditionally, each instruction of an ISA possesses a unique semantics. In our proposed solution, certain instructions are selected from the ISA of the application, P. We refer to this set as $I^{HG}$, and each individual member of this set by $i^{HG}$. These instructions are inserted into the application at appropriate locations. Consequently, the PVM is configured to handle these instructions uniquely as follows: At run time, when the protective PVM encounters any of these select instructions, it interprets them in a custom manner, different from the semantics specified by the platform documentation, i.e., the protective PVM instance will interpret homographic instructions using customized semantics, whereas all other interpreter instances will interpret it in the conventional manner (according to the platform documentation). When run under the protective PVM, the transformed application should generate outputs which are identical to the unprotected version, for any input combination.

The set of homographic instructions is not unique, but varies for each application. Implemented correctly, a replacement attack and subsequent interpretation on a generic interpreter will cause the application to behave in an undefined manner, and either lead to failure, or trigger appropriate response mechanisms. Thus, the replacement attack will fail in its objective of successfully executing the application without the protective PVM.

This solution methodology is termed as Point-ISA. Point-ISA has been derived from the term, point functions in cryptography. Point functions return true for only one input, and false otherwise. In our case, $i^{HG}$ corresponds to its correct value (i.e., $f^{-1}$) in only one context (i.e., when it's interpreted by the associated PVM instance). In all other contexts, $i^{HG}$ is interpreted according to the architectural ISA.

There are several components of this solution that need to be investigated, before a successful prototype can be implemented. Some of the primary areas of research include identifying the set $I^{HG}$, and designing seamless responses to a replacement attack. Care must also be taken to ensure that the transformed application running on the PVM instance generates outputs that are identical to those of the original application. The next few sections discuss these issues in detail.

Before exploring the various issues, we formalize this protection technique using our model.

2.5.1 Formalizing Point-ISA

In Section 2.1, we used our model to describe replacement attacks. We now extend this model to characterize the Point-ISA scheme. We recall Equation 7.5, which describes the execution of the protected application on Strata. Strata itself is running on an Intel x86 hardware machine.

$$\phi_{x86}(P_{strata}, <P_{TR(APP)}, in_{APP}, c_{strata}>, m_{x86}^{in}) \rightarrow <<out_{APP}, o_{strata}>, m_{x86}^{out}> \quad (7.9)$$

In Equation 7.9, the input to the interpreter is composed of a tuple, comprising the protected software application $P_{TR(APP)}$, the input to the original application, $in_{APP}$, and $c_{strata}$, the configuration settings for Strata to run the application. For example, if the application is encrypted, $c_{strata}$ can represent the decryption key. The memory is in its initial state, which can be broken down into the memory state for Strata, $(m_{x86}^{in})^{strata}$, and the state for the application, $(m_{x86}^{in})^{APP}$. On successful completion, the output, $out_{APP}$ is generated, and memory reaches its final state, denoted by $(m_{x86}^{out})^{strata}$, and $(m_{x86}^{out})^{APP}$.

The replacement attack results in the substitution of the protective PVM with an attack PVM, which can then be used to analyze the application without any hindrance. Recalling Equation 7.8, $$\phi_{x86}(P_{attack}, <P_{TR(APP)}, in_{APP}, c_{attack}>, m_{x86}^{in}) \rightarrow <<out_{APP}, o_{attack}>, m_{x86}^{out}> \quad (7.10)$$

The x86 interpreter operates on the attack PVM, $P_{attack}$. The inputs consist of a 3-tuple comprised of the protected application, $P_{TR(APP)}$, the input to the application, $in_{APP}$, and a configuration setting for the PVM, $c_{attack}$. During interpretation, the memory state is transformed from to $m_{x86}^{in}$ to $m_{x86}^{out}$. On conclusion, the interpreter outputs a tuple consisting of $out_{APP}$, which is the output of the application, and $o_{attack}$, which is the output specific to the attack PVM. The adversary can configure the attack PVM to generate additional information that could facilitate analysis.

We now introduce the $\Psi$ operator, which represents the Point-ISA protection scheme. This operator is applied to the software application, and results in a transformed application, $\Psi(TR(P_{APP}))$. Now, the application can only be successfully executed under the mediation of its associated protective PVM, $strata_{APP}$. This protection scheme is orthogonal to other protection schemes, allowing it to be used in conjunction with other techniques.

Equation 7.11 describes the interpretation of a Point-ISA protected application on the native platform.

$$\phi_{x86}(P_{strata}^{app}, <\Psi TR(P_{APP})), in_{APP}, c_{strata}^{APP}>, m_{x86}^{in}) \rightarrow <<out_{APP}, o_{strata}>, m_{x86}^{out}> \quad (7.11)$$

The application has a unique PVM associated with it, denoted by $strata^{APP}$. The interpreter function, $\phi_{x86}$ operates on the PVM application $P_{strata}^{APP}$. The inputs consist of the protected application, $\Psi(TR(P_{APP}))$, the application input $in_{APP}$, and the configuration setting for the PVM $c_{strata}^{APP}$. The outputs consists of the output from the application $out_{APP}$, and the output from the PVM itself, $o_{strata}$ The memory state changes from $m_{x86}^{in}$ to $m_{x86}^{out}$.

The interpretation of this Point-ISA protected application on the associated protective PVM is identical to the interpretation of the original application (represented by Equation 7.9). However, if this application is subjected to a replacement attack, the interpretation fails. This scenario is represented by the following equation.

$$\phi_{x86}(P_{attack}, <\Psi TR(P_{APP})), in_{APP}, c_{attack}>, m_{x86}^{in}) \rightarrow <<(out_{APP})^{error}, o_{strata}>, m_{x86}^{out}> \quad (7.12)$$

In Equation 7.12, the x86 interpreter ($\phi_{x86}$) operates on the attack PVM, $P_{attack}$. The inputs to the attack PVM consist of the protected application, $\Psi(TR(P_{APP}))$, the application input $in_{APP}$, and the configuration for the PVM $c_{attack}$. In this case, the application fails to execute correctly, and an error message is generated $((out_{APP})^{error})$, along with any output from the attack PVM, $o_{attack}$. The memory state changes from $m_{x86}^{in}$ to $m_{x86}^{out}$.

Modeling Homographic Instructions

The previous set of equations described the solution methodology at a conceptual level. We now proceed to expand our model, to describe Point-ISA at a finer level of granularity. To begin, we need to represent the interpretation of a sequence of instructions on the host machine via our model. Described in a simple form, interpreting an instruction (or a sequence of instructions) implies transforming memory of the computing machine from one state to another. To express this action in our model, we introduce a new operation, $\Phi_H$. We describe the interpretation of a sequence of instructions in Equation 7.13.

$$\Phi_H(i_1^H, i_2^H, i_3^H, \ldots, m_H^{in}) \rightarrow <m_H^{out}> \quad (7.13)$$

The operator, $\Phi_H$ denotes the interpretation of an instruction sequence on the host H. The sequence is denoted by $i_1^H$, $i_2^H$, $i_3^H$ .... The initial memory state is denoted by $m_H^{in}$, and the final state by $m_H^{out}$. We can now utilize Equation 7.13 to represent homographic instructions. As we described, the semantics of the homographic instruction depend on the instance of the interpreter. We consider an instruction belonging to the x86 ISA, and its interpretation by a standard x86 interpreter, and the Strata protective PVM running on an x86 platform. Equation 7.14 describes these two scenarios.

$$\Phi_{x86}(i_{x86}^{HG}, m_{x86}^1) \rightarrow <m_{x86}^2> \quad (7.14)$$

$$\Phi_{strata}(i_{x86}^{HG}, m_{x86}^1) \rightarrow <m_{x86}^3> \quad (7.14)$$

When the instruction, $i_{x86}^{HG}$, is interpreted by a generic x86 interpreter, the memory state is transformed from $m_{x86}^1$ to $m_{x86}^2$. When that same instruction is interpreted by the strata instance, the memory state is transformed from $m_{x86}^1$ to $m_{x86}^3$. The premise behind Point-ISA is that this homographic behavior of $i_{x86}^{HG}$ (which leads to memory states $m_{x86}^2$ and $m_{x86}^3$) can be differentiated programmatically enabling detection of the replacement attack.

We are now ready to design the Point-ISA solution. For this purpose, we utilize two functions $f$ and $f^{-1}$, which are defined as follows.

$$f(m) \to n \quad (7.16)$$

$$f^{-1}(n) \to m \quad (7.17)$$

As Equation 7.16 represents, the function $f$ takes an input m and transforms it to n, while the function $f^{-1}$ transforms n back to m (i.e., the pair are the inverse of each other).

Consequently, these functions are inserted into the application. The function, $f$ is implemented via a sequence of instructions. The function $f^{-1}$ is implemented via a homographic instruction $i_{x86}^{HG}$. The PVM is configured such that, when it encounters $i_{x86}^{HG}$ at run time, it implements the semantics of $f^{-1}$. Equations 7.18 and 7.19 illustrate these scenarios.

$$\Phi_{strata}((f=\{i_{x86}^1, i_{x86}^2 \ldots i_{x86}^k\})|, m_{x86}^1) \to <m_{x86}^2> \quad (7.18)$$

$$\Phi_{strata}(i_{x86}^{HG}, m_{x86}^2)) \to <m_{x86}^3> \quad (7.19)$$

During software creation, the instruction sequence implementing $f$ (i.e., $i_{x86}^1, i_{x86}^2 \ldots i_{x86}^k$), is inserted at a suitable location in the application's CFG, followed by the insertion of $i_{x86}^{HG}$ at a second location. The two locations are chosen such that both of them are guaranteed to be reached during program execution. In our prototype these components are aligned sequentially in program order. Dominator analysis can be used to make the arrangement less predictable. The protective PVM instance is configured such that $i_{x86}^{HG}$ interpreted according to the semantics of $f^{-1}$.

Under normal circumstances, this arrangement guarantees that the protected application produces outputs identical to those of the original application, for the identical set of inputs (we define this scenario as output equality). If a replacement attack occurs, the execution of a homographic instruction will leaves memory in an undefined state.

For example, the following illustrates the use of a homographic instruction. First, scan a program and look for uses of sub rsp. Second, find that they all occur immediately after a push instruction, since they are all part of function prologues. Next, change the semantics of sub rsp such that it uses register rax if it is not immediately after a push instruction. That is: sub rsp, K means rsp=rsp-k if the previous instruction is a push. Otherwise it means rax=rax-k. Scan the program for sub rax instructions, and convert them to sub rsp instructions if they are not after a push. The PVM (i.e., Strata) does the special checking for sub rsp instructions, and then executes the necessary code. Unless an attacker knows about the homographic nature of sub rsp, they would transform or analyze the program incorrectly.

We now proceed to describe appropriate response mechanisms to an attack.

Response to Replacement Attacks

During application execution, after instructions representing Equations 7.18 and 7.19 have been interpreted, m1 and m3 should be equal. This scenario is necessary for Point-ISA to maintain output equality. If the protective PVM instance is replaced, the attack interpreter will interpret $i_{x86}^{HG}$ according to the ISA specifications, and not the semantics of $f^{-1}$. Consequently, output equality will no longer be achieved. We can respond to this event in two ways.

The first response mechanism, termed the Value Modification mechanism, involves letting the application continue execution. Since the memory values of the application are no longer in a predictable state (due to the execution of the actual semantics of $i_{x86}^{HG}$, as opposed to $f^{-1}$), there is a probability that the program will go down an incorrect path and fail. Such a failure is likely to be obscure due to the fact that the path taken is not predictable. The downside to this technique is that the modification may be ineffectual, resulting in normal program execution on the replacement PVM.

As such, the second response technique, termed the Auditor mechanism, involves the use of a guarding mechanism which checks to ensure that output equality has been maintained. If the checks detect that output equality has been broken, appropriate measures are taken. The downside to this scheme is that a knowledgeable adversary might be able to detect these checks and disable them. Therefore, to obtain a robust defense mechanism, a probabilistic mix of both schemes should suffice. Equation 7.20 describes functionality of the auditor function, which checks the memory, and triggers an attack response if they are not equal.

$$f_{audit} \to \begin{cases} \text{if } m^3 \equiv m^1 \text{ continue execution} \\ \text{if } m^3 \neq m^1 \text{ respond to attack} \end{cases} \quad (7.20)$$

Here, $m^1$ denotes the state of memory prior to execution of the Point-ISA solution. $m^3$ denotes the state of memory after Point-ISA has successfully executed. If the two states are equal, it indicates that the execution has proceeded as expected. If the states are not equal, it signifies an attack, and an appropriate response is generated.

For the rest of this discussion, the components represented by Equations 7.18, 7.19, and the optional part, 7.20, are referred to as the components of the Point-ISA methodology. In the next section, we describe the implementation of these components in greater detail.

2.6 Designing Point-ISA

There are several factors that can determine the effectiveness of Point-ISA. We address these issues in this section.

2.6.1 Identification of Homographic Instructions

The protective PVM instance interprets the redefined semantics of selected instructions. To enable such custom interpretation, the PVM must be able to distinguish the homographic instructions, $I_H$, from regular instructions that form part of the application. A straightforward manner to obtain such classification is to analyze the original, unprotected application, and choose an instruction that is not a constituent.

$$i_H \notin I_P \quad (7.21)$$

Consequently, the protective PVM instance is modified such that, on encountering $i_H$, it implements the semantics of $f^{-1}$. Each application to be protected via a PVM will possess its own $I_H$.

An adversary may be able to perform frequency analysis on the application, and decipher which instructions form part of $I_H$. To thwart such analyses, instead of a unique instruction, a unique combination of opcode and operands can be chosen. The opcode may be present in the original application, but the combination of the opcode and its operands is not. In this case, the protective PVM instance will have to decode the instruction completely (opcode and operands) before deciding whether to trigger the semantics of $f^{-1}$.

The next design issue involves devising techniques to insert the various Point-ISA components into the application such that they are executed in the correct order.

2.6.2 Insertion of Point-ISA Components

To recall, our semantic-binding scheme involves the insertion of a function, $f$, and a homographic instruction, $i_H$, into the control flow of the application, such that the output of the transformed application matches the original version, for all inputs (output equality). To achieve this property, $i_H$ is interpreted by the protective PVM instance as $f^{-1}$. To implement Point-ISA, the control flow of the application needs to be adjusted such that, when its components are scheduled for execution in correct order. For the purposes of our proof-of-concept, we inserted the Point-ISA components in sequential order at appropriate locations in the application. We describe our prototype in greater detail in Section 2.7.1

Maintaining output equality of the components is essential for correct functioning of Point-ISA. Reducing performance overhead is also critical, because a large increase is undesirable and makes the protection scheme impractical. To reduce excessive overhead, the point of insertion must not be on a frequently-executing path. This issue is similar to the issue of placement of checkers, discussed in Chapter 5 of the above-referenced Provisional Application No. 62/090,556 incorporated herein by reference above. In the case of checkers, we needed to establish a balanced trade-off between checker execution and overhead, to maintain constant protection. As such, we devised predicated triggers. In the case of Point-ISA, we feel that the rate of execution of its components is not as relevant, since any one of them can trigger a response in the event of an attack. As such, we proceeded with utilizing profile information to guide the insertion process (i.e., the application was run in profiled mode to obtain frequently-executing paths. Then, components are inserted based on a probability which is inversely proportional to path's frequency of execution).

2.6.3 Response to a Replacement Attack

If an adversary attempts to replace the protective PVM instance and execute the application on a different interpreter (software or hardware), the semantics of the $i_H$ will revert to its original, and this event can be detected. We have devised two mechanisms to respond to such an attack.

Auditor Mechanism

In the first case, we employ the use of an auditor to detect the attack and take appropriate action. Recalling Section 2.5.1, the function, $f$ updates a memory location's from, $m^1$, to $m^2$, whereas the protective PVM interprets $i_H$ such that the memory location's value reverts back to $m^1$. The auditor is placed further along the same program path, and checks that the value of the memory location is indeed m1. In case there is a mismatch, the auditor will trigger a response (e.g., stopping application execution, or taking control along an incorrect path). Assuming that all the components ($f$, $i_H$, and the auditor) run correctly and in order, this technique guarantees that replacing the protective PVM instance will cause the application to fail.

Value Modification Mechanism

The use of an auditor leads to the creation of another point of attack. If the adversary is able to disable the auditor (e.g., by replacing it with no-op instructions), a replacement attack will not be detected. To obfuscate Point-ISA, we modify the function, $f$ to update a value belonging to the application (e.g., modify a register). The protective PVM instance is also updated such that the interpretation of $i_H$ reverts the value of the variable.

The basic premise behind this response scheme is that, if the application is run under an attack PVM, f will be invoked as usual, but the interpretation of $i_H$ will not revert the program variable. Further along this program path, the update caused by $f$ could lead to program failure, although the final result is non-deterministic.

We have described two schemes that, although individually vulnerable to specific attacks, can mutually reinforce each other, to provide a robust protection for the protective PVM. Next, we evaluate the Point-ISA methodology, and describe the results in detail.

2.7 Evaluating Point-ISA

This section discusses the creation of a prototype implementing Point-ISA. Some of the design decision included techniques to select candidate instructions, identifying locations in the application control flow graph where the homographic instruction could be inserted, and appropriate response mechanisms to tamper.

2.7.1 Designing the Prototype

The Point-ISA implementation depends on the complementary functions $f$ and $f^{-1}$. Any number of such functions can be designed. For the purposes of our implementation, we defined $f$ and $f^{-1}$ in two ways, corresponding to the Value Modification and the Auditor mechanisms. Equation 7.22 describes the semantics of the functions in the case of the Value Modification Mechanism:

$$f, f^{-1} : \sim \text{reg} \rightarrow \text{reg} \qquad (7.22)$$

In this scheme, $f$ modifies an application value residing in a hardware register. Here, reg can be any standard hardware register (eax, ebx, etc., on the Intel x86 platform).

Equation 7.23 describes the semantics of the functions in the case of the Auditor mechanism:

$$[MEM_1] = INIT \qquad (7.23)$$
$$f, f^{-1} : \sim [MEM_1] \rightarrow [MEM_1]$$
$$f_{audit} : [MEM_1] == INIT = \begin{cases} \text{do nothing} & \text{if true} \\ \text{respond to tamper} & \text{if false} \end{cases}$$

In this scheme, the memory location, $[MEM_1]$ refers to the contents of a global memory variable that is created during the software protection process (i.e., this location is not a part of the original application). This variable is initialized to a randomly selected value. $f$ and $f^{-1}$ consist of negating this variable. Finally, the audit function, $f_{audit}$, checks whether the value of the variable has been reverted. For the sake of simplicity, we have provided only one version of $f$ and $f^{-1}$. A robust implementation of Point-ISA should possess several different versions of these functions.

In both these equations, negation (~) is the primary logical operator. This operator was chosen because:

On the 32-bit Intel x86 platform, the negation operator does not change any processor flags. As such, the flag register does not need to be preserved, which is beneficial for reducing overhead.

The negation operator possesses the property of involution [110] (i.e., the function is its own inverse, making the implementation of $f$ and $f^{-1}$ identical).

The prototype is created using the link-time optimizer, Diablo. The inputs to Diablo consist of the original, unprotected application P, a set of homographic instructions (selection criteria for these instructions is described in Section 2.7.2) $I_H$, and an instance of the protective PVM (in this case, Strata). The logic of the protective PVM has been modified such that, during execution, when it encounters a homographic instruction, it implements the semantics off $f^{-1}$.

During software creation, we use Diablo to generate a flow graph of P. The nodes in this flow graph consist of basic blocks data structures (i.e., sequence of instructions with a single entry point and a single exit point). The edges in this graph correspond to control flow branches (direct jumps, conditional jumps, calls, etc.). An edge typically connects a predecessor block (i.e., the source block of the control transfer) to a successor block (i.e., the destination block of the transfer) [111].

Once the flow graph information is obtained, Point-ISA is ready to be implemented. First, we consider the Value Modification mechanism, specifically Equation 7.22. Based on a selection criteria (described in Section 2.7.2), a target basic block $X_P$, belonging to P is identified. This block is subjected to liveness analysis in isolation [111], and registers are identified that contain live values exiting this block. An instruction sequence negating one of these registers, (i.e., $f$) is inserted into a basic block data structure, $BB_f$. Next, an instruction is randomly selected from $I_H$ and inserted into another basic block structure, $BB_{I_H}$. The protective PVM is modified such that it interprets $i_H$ as $f^{-1}$. The CFG is then modified such that $X_P$ becomes the new direct predecessor of $BB_f$, and $BB_f$ becomes the new direct predecessor of $BB_{I_H}$. All the previous successors of $X_P$ become the new successors of $BB_{I_H}$. This modification ensures that any program path that contains $X_P$ is guaranteed to execute $BB_f$ and $BB_{I_H}$, enabling the Value Modification scheme.

Thus, if $N_{succ}$ is the set of successors of $X_P$, the relationship is denoted by:

$$X_P \xrightarrow{pred} \{N_{succ}\}$$

We modify the CFG such that:

$$X_P \xrightarrow{pred} BB_f \xrightarrow{pred} BB_H \xrightarrow{pred} \{N_{succ}\} \quad (7.24)$$

The Auditor mechanism can also be implemented in a similar way, however the function $audit_F$, in Equation 7.23, needs to be handled as well. The instructions corresponding to $audit_F$ are stored in a new basic block, $BB_{audit}$. $BB_{audit}$ is inserted into the CFG such that it becomes the new immediate successor of $BB_{I_H}$, and the new predecessor of all the original successors of $X_P$. Thus, the modified CFG would look as follows:

$$X_P \xrightarrow{pred} BB_f \xrightarrow{pred} BB_{I_H} \xrightarrow{pred} BB_{audit} \xrightarrow{pred} \{N_{succ}\} \quad (7.25)$$

Where $\{N_{succ}\}$ is the set of successors to $X_P$ in the original application, P.

Both these schemes are applied multiple times to blocks selected based on profiled information to obtain a distributed protection mechanism.

2.7.2 Selection Criteria for Homographic Instructions

Selecting the set $I_H$ is crucial to the success of Point-ISA. These instructions should belong to the set of commonly used instructions of most applications. Such unobtrusiveness provides a natural cover from techniques such as frequency analysis. For our prototype, we created the set $I_H$, based on unique instruction opcodes. We statically analyzed a collection of applications binaries (SPEC CPU2000 and binutils package), and stored their instruction opcodes in a database. Let this set be denoted by $I_D$. Subsequently, while processing a benchmark b, its unique opcodes are collated. This set is denoted by $I_b$. The set of homographic instructions can be obtained by calculating the set difference between $I_D$ and $I_b$. This equation can be represented as follows:

$$I_H = I_D \setminus I_b := \{x \in I_D, x \notin I_b\}$$

where \ denotes the set difference operation. Any opcode in the database that does not occur in b, can be used to form $I_H$. Once $I_H$ has been identified for a particular application, an instance of the protective PVM is created that handles each member instruction, $i_H$ accordingly.

Figure 9A:
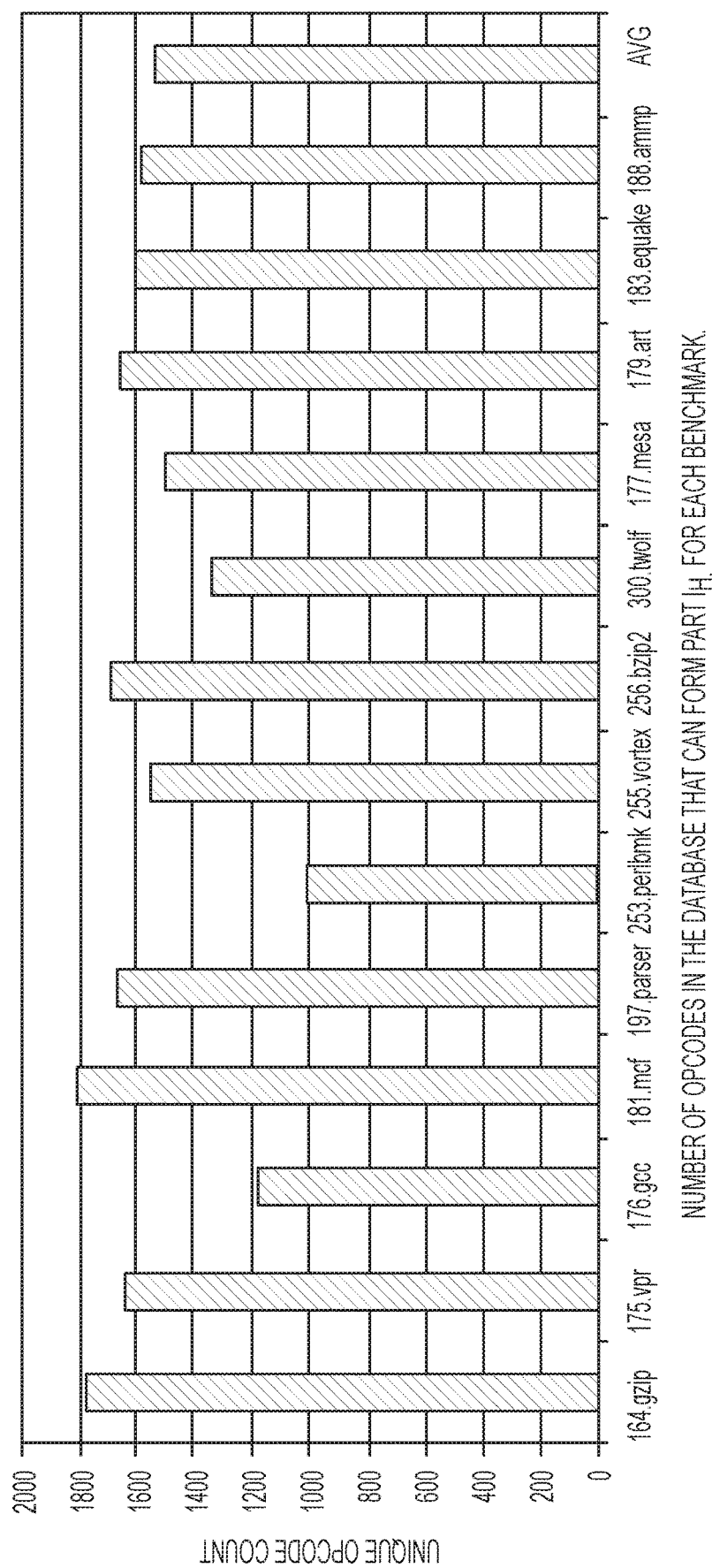
FIG. 9A is an illustrative graph of the number of opcodes in the database that can form part of $I_H$, for each benchmark.

FIG. 9A shows a number of opcodes in the database that can form part of $I_H$, for each benchmark. In particular, FIG. 9A displays the number of opcodes that can be used to form the set I H, for each benchmark of the SPEC CPU2000 suite. As the figure illustrates, each benchmark has several options. Because all these opcodes occur in standard applications, their presence in the protected application should be well camouflaged. The options for I H can be further increased by considering instruction operands in addition to the opcodes. In this case, the number of options increased by several orders of magnitude.

During the software creation process, Diablo selects one instruction at a time using a random scheme. This instruction is then inserted in basic block B, and the process continues as described in Section 2.7.1.

2.7.3 Performance

As with any other protection scheme, low overhead is an important factor in the design of Point-ISA. High overhead may limit the adoption of this technique.

The selection of block $X_P$ is directly related to the overhead associated with Point-ISA. Since all the inserted blocks are predecessors of this particular node, a high execution frequency for this node will translate into a high execution frequency for the newly inserted nodes. A high frequency adds to the overhead. Therefore, we need a judicious arrangement to select $X_P$. In Chapter 5 of the above-referenced Provisional Application No. 62/090,556 incorporated herein by reference above, one of the schemes designed to insert checkers into the application involved generating probabilities of basic blocks that was inversely proportional to their execution frequency. The downside of such a scheme is that, in certain applications, the standard deviation of the checker frequency can be inordinately high. This disadvantage is not quite so bothersome in Point-ISA. As long as the Point-ISA components execute, protection will be achieved. The relative spread of their execution times is not relevant.

Therefore, we utilize the inverse-frequency scheme to generate probabilities for each basic block of P. During software creation, the selection of $X_P$ depends on its assigned probability.

Figure 9B:
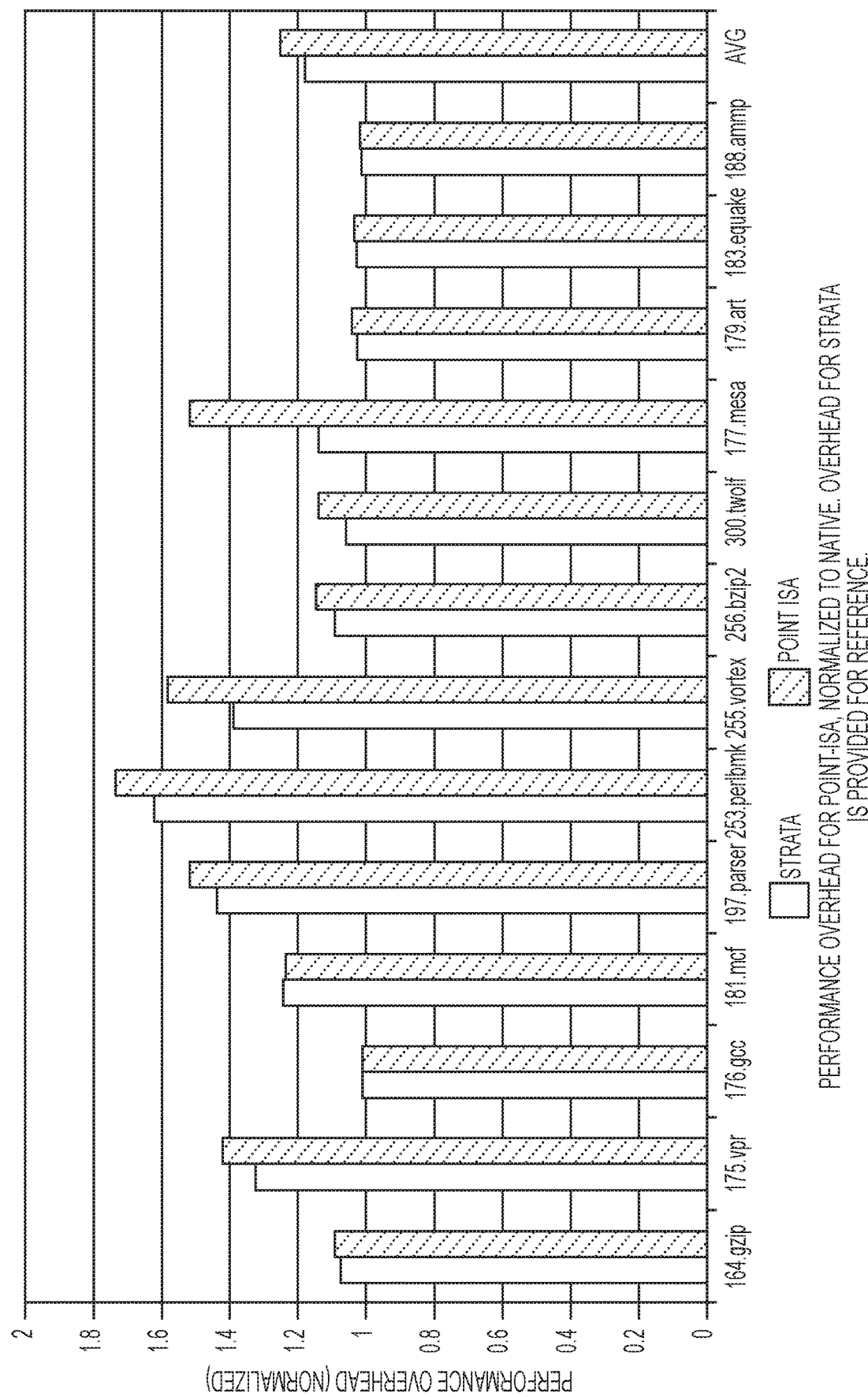
FIG. 9B is an illustrative graph of performance overhead for Point-ISA, normalized to native.

FIG. 9B shows performance overhead for Point-ISA, normalized to native. Overhead for Strata is provided for reference. In particular, FIG. 9B shows the overall performance overhead for the SPEC CPU2000 benchmarks. On average, this technique adds an overhead of 5% over Strata. Since the placement method is probabilistic, there is a non-zero chance that the Point-ISA components will be placed in a hot path (e.g., 177.mesa). In such a case, it is judicious to rerun the software creation process to get a more favorable binary.

Figure 9C:
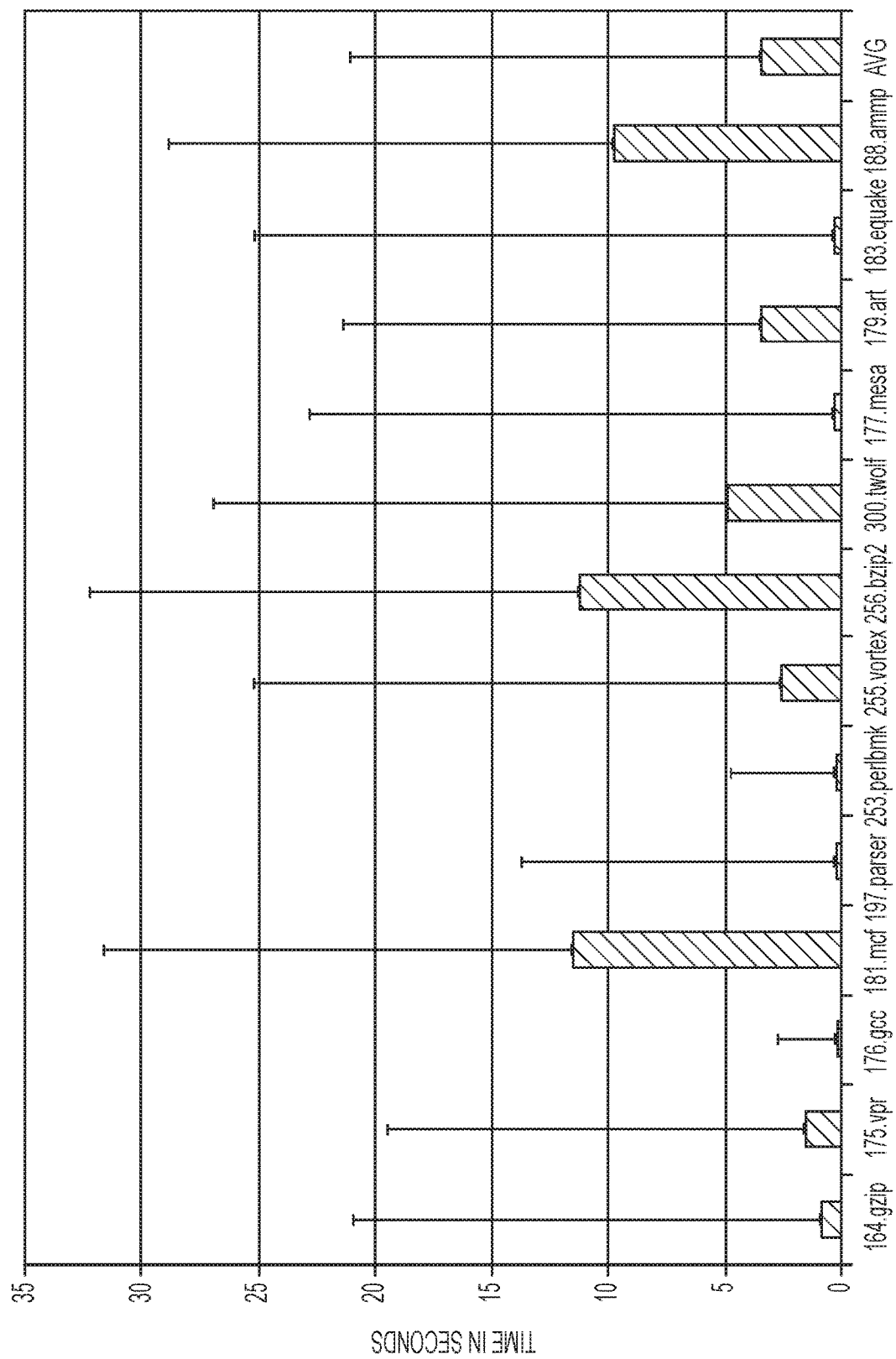
FIG. 9C is an illustrative graph of the average delay between the invocations of two Point-ISA components.

FIG. 9C shows the average time delay between two successive execution of the Point-ISA components. The error bars correspond to the standard deviation. The high standard deviation in benchmarks such as 181.mcf and 254.gap indicate that the components execute in intermittently in groups, rather than periodically. As we mentioned previously, the rate of execution of these components is not as relevant to the protection offered.

2.8 Security Discussion

This section discusses the impact of Point-ISA on program protection. Specifically, we consider the robustness of this scheme against particular attack methodologies. We also examine the presence of any weaknesses that an adversary might exploit and offer alternate schemes.

2.8.1 Effectiveness Against Replacement Attacks

Point-ISA was designed specifically to thwart replacement attacks. Therefore, its effectiveness against such attacks is paramount. We applied the process described in Section 2.7.1 to several benchmarks, and subjected them to replacement attacks. All the protected benchmarks were able to repel the attacks. Most of the benchmarks exited with a message generated by the auditor. However, some benchmarks generated the SIGSEGV faults, which indicate that the Value Modification mechanism had been triggered and led to the corruption of the application.

2.8.2 Effectiveness Against Reverse Engineering

In Section 2.7.1, we presented a straightforward mechanism to implement Point-ISA, which consisted of inserting the Point-ISA components in a predictable order into the CFG of P. Such a naïve implementation can be disabled by a knowledgeable adversary.

Data-flow analyses can be used to make Point-ISA more robust against reverse-engineering attacks. use-def is commonly-used analysis technique which identifies instructions that define and use the variables in an application. The sequence of instructions that mark the definition and use of a variable are termed chains. In the Value Modification Scheme, the use of def-use chains can be used to identify multiple locations to insert the Point-ISA components. Blocks $BB_f$ and $BB_{I_H}$ can be inserted randomly at any site within the confines of the use-def chain associated with the live value being modified. This additional entropy makes it harder for the adversary to identify and disable these Point-ISA components. The amount of entropy will vary depending on the variable chosen. Applying this scheme multiple times should give a good spread.

To increase the robustness of the Auditor mechanism, we utilize dominator analysis [111]. In any directed graph (e.g., the CFG of an application), a node d is called the dominator of node e if all paths from the graph entry point (i.e., program entry point) toe pass through d) [111]. Similarly, the node e post-dominates d if the paths from d to the graph exit point pass through e. Referring to Equation 7.25, the components $BB_f$ and $BB_{I_H}$, and $BB_{audit}$ can be placed on the post-dominator path of $X_P$ to application exits. Care must be taken to ensure that the components all execute the same number of times. This restriction can be enforced trivially by avoiding their placement in any loops.

$$1_P .. \xrightarrow{sdom} BB_f .. \xrightarrow{sdom} BB_{I_H} \xrightarrow{sdom} 2_P .. \xrightarrow{sdom} BB_{audit} .. \xrightarrow{sdom} X_P \quad (7.26)$$

The blocks $1_P$, $2_P$ . . . refer to basic block blocks of the original application. Equation 7.26 implies that the components are inserted at random locations in the dominance tree of $X_P$. Thus, this scheme makes Point-ISA more unpredictable and consequently, harder to reverse engineer.

2.8.3 Tampering with the Protective PVM

A knowledgeable adversary can attempt to uncover the special semantics of the homographic instructions by investigating the instruction handling logic of the protective PVM instance, and comparing with the ISA manual. Instruction handling is one of the most complicated components of any PVM implementation. Applying traditional program protection techniques to the PVM can make reverse engineering even harder. Thus, while it is theoretically possible to analyze the PVM and discover the homographic instructions, we do not see a trivial way to achieve this task. The adversary will have to manually investigate the handling of each possible instruction. By expanding the domain of homographic instructions to include instruction operands as well, this task can be made still harder.

2.8.4 Synopsis of Overall Protection

Point-ISA is designed to be used in conjunction with static protections and a protective PVM. The static protections safeguard the application and the PVM binary from analysis and tamper. At run time, the associated PVM instance continuously applies tamper-resistance techniques, making dynamic analysis harder. Point-ISA ensures that this protective PVM instance is not replaced by a benign PVM instance by an adversary attempting to obviate security measures. Thus, taken together, such a protective configuration lays the foundation for a robust tamper resistance execution environment.

2.8.5 Co-Designing Applications and Protective PVMs

The use of homographic instructions can be extended, to co-design applications with protective PVMs. During software creation, large sequences of code (e.g., a function block) of the application can be replaced by a homographic instruction. At run time, when the PVM encounter this instruction, it will interpret it according to the semantics of the replaced block.

Part 3—Establishing a Data Dependence Between the Application and the PVM

At this point, we recap software protections from the view of the application's state. Prior to application execution, static techniques protect the binary from reverse engineering. This area of protection has been thoroughly studied, and several robust mechanisms have been proposed [9, 5, 6, 81]. Chapter 4, of the above-referenced Provisional Application No. 62/090,556 incorporated herein by reference above, proposes new techniques that protect virtualized applications from analysis. Thus, these mechanisms perform effectively at thwarting static attacks.

During execution, protection is provided by the associated PVM. Chapters 5 and 6, of the above-referenced Provisional Application No. 62/090,556 incorporated herein by reference above, describe effective schemes that obfuscate the run time of the application, repelling reverse engineering attacks. Part 2 (above) illustrated a weakness in current PVM-based protection technology, and proposed a solution that establishes a semantic relationship between the protective PVM instance and the application. Incorporating these techniques into the application provides a robust tamper-resistant environment at run time.

The question remains whether it is possible for an adversary to extract critical information after execution has concluded. For example, the adversary might be able to obtain a protected copy of the software application and proceed to run it to completion under the control of an analysis tool (e.g., an instrumentation framework, or a modified OS). The question we are addressing is, whether the adversary can extract the application's assets from any post-execution analysis. Examining the susceptibility of PVM-based protections against such exploitation is the focus of this Part. As previous research uncovers, it is indeed possible to inspect software, and extract critical information using such post-execution analyses (i.e., by examining the application trace, which refers to the sequence of executed instructions) [57]. Such attacks consist of isolating unique application attributes (e.g., system calls) from the trace, and performing a data flow analysis. In traditional PVM systems, the data access patterns of the application, and those of the PVM are distinct. As such, examining the flow of data could reveal all the relevant information about the original application.

This Part deals with the investigation of such dataflow attacks on PVM-protected applications.

An implementation of this attack methodology was first realized by Coogan, Lu and Debray [57]. The authors termed this attack methodology as Value-based Dependence Analysis (VDA). Their scheme consists of identifying instructions that perform arithmetic and logical operations directly on application data, neglecting other operations (e.g., address calculation, conditional jumps, etc.). Inherently, VDA is similar to a well-known security technique, taint checking. In taint checking, program variables that are susceptible to malicious data (e.g., program inputs) are identified, and the flow of their data values is tracked throughout application execution. The major difference between VDA and taint checking is that, tainting is a forward flow analysis (the data values are tracked in program order), whereas VDA is a backward flow analysis (the data values are tracked from application attribute to program entry).

Applying this methodology to a virtualized application's trace reveals those instructions that implement the core functionality of the application. VDA can be classified as a search-space reduction technique.

In this Part, we thoroughly investigate this attack methodology. We begin by formally defining the attack methodology using our model. We demonstrate that Coogan, et al.'s implementation can be easily defeated by binary translators, and propose a more robust attack that targets all types of PVMs. Next, we describe a novel scheme that thwarts this attack. This solution mechanism, called DataMeld, involves establishing a relationship between the data values of the PVM and the protected application. Our evaluation reveals that our solution significantly reduces the amount of relevant information that can be extracted by the adversary, post execution. The major contributions of this Part can be summarized as follows:

Description of a class of data-analysis attacks on PVM-protected applications, called Valuebased Dependence Analysis (VDA). Initially, it was thought that PVMs were effective at obfuscating the execution trace of the application. However, Coogan, et al., demonstrated that it is relatively straightforward to extract the relevant information from the trace [57]. We represent this attack in our model to facilitate a better understanding.

Design of a run-time solution that thwarts Coogan's attack implementation, called dynamic address-mode transformation. We demonstrate that the original VDA scheme can be thwarted by changing the addressing modes of instructions. We employ this scheme via a software dynamic translator. We use a case study to demonstrate that this solution can defeat Coogan, et al.'s implementation.

Design of a more robust implementation of the VDA methodology. The new scheme, called modified VDA (MVDA), has more overhead (in terms of redundant information extracted) than Coogan, et al.'s implementation, but is effective against addressing-mode changes. We extend our case study to demonstrate that MVDA is able to extract critical information from the PVM-protected trace.

Conception of a novel scheme that consists of blending the data of the PVM and the protected application, called DataMeld. This scheme operates by modifying the data values of the application using the values of the PVM in a semantically-neutral manner. The basic premise behind this solution is to obfuscate the dynamic data flow of the application by using the PVM.

Introduction of a metric for calculating the memory coverage of variables, called instruction coverage for variables (ICV). ICV values facilitate the selection of PVM variables for binding with the application.

Finally, the design of a robust prototype for evaluating these ideas. We demonstrate that DataMeld increases the obfuscation in the trace of the PVM-protected application. Thus, dataflow attacks like VDA have a reduced chance of success.

The rest of the Part is organized as follows: in Section 8.1, we explore the concept of data-based attacks on the PVM-protected trace. We discuss the attack devised by Coogan, et al. in this section. In Section 3.2, we demonstrate that modifying the addressing modes of instructions that perform direct register transfers can thwart VDA attacks. We employ a use case to illustrate our assertion. In Section 3.3, we describe a modified version of the VDA attack, that can withstand addressing mode transformations. Section 3.4 describes a robust solution to the VDA methodology that obfuscates the dataflow of the application by blending it with the data flow of the PVM. Section 3.5 presents a concept of instruction coverage for variables, to facilitate selection, and describes the design of a tool to calculate this metric. Section 3.6 we review past work that has investigated extracting data structure information from binaries. We utilize this work for implementing DataMeld, which is described in Section 3.7. In Section 3.8, we present an evaluation of this obfuscation, by calculating the amount of information leakage. Finally, we summarize the Part in Section 3.9.

3.1 Value-Based Dependence Analysis (VDA) Attacks

Software applications modify data values during processing. Any non-trivial application will apply a myriad of operations on many different data values during the course of its execution. Because most modern processors have a finite set of hardware registers, these values are temporarily stored in memory locations while other values are being computed. Dataflow analysis investigates the transfer of data between memory locations and hardware registers on the native machine, and by extension, the instructions that access such data values.

The introduction of a virtualization layer in an application changes the dynamic execution environment. Within the context of data flow, the PVM and the application are two separate software entities, each with their own set of data values, which do not intersect. This dichotomy forms the premise behind the VDA attack methodology by Coogan, Lu, and Debray [57]. The critical aspect of their analysis is the identification of an attribute that belongs exclusively to the application. The authors decided on utilizing system calls as the attribute, since most PVMs use a limited set of system calls (usually related to file I/O, such as open, read, etc.). Because the system call arguments and return values are standardized for every platform, it is easy to identify them. Once these values are recognized, VDA operates by tracking their flow through the instruction trace. In this manner, all the critical instructions (i.e., those belonging to the application) can be identified. The instructions belonging to the PVM in the dynamic trace will be ignored. Results have indicated that this scheme can aid reverse engineering by reducing the search space by orders of magnitude [57].

The VDA attack methodology can be elegantly represented in our formal model. Recalling Equation 7.6, which describes execution of a an application on a software interpreter, which in turn, is running on an Intel x86 hardware platform.

$$\phi_{x86}(P_{strata}, <P_{TR(APP)}, in_{APP}, c_{strata}>, m1_{x86}) \rightarrow <<out_{APP}, o_{strata}>, m2_{x86}> \quad (8.1)$$

In Equation 8.1, the hardware interpreter operates on the Strata application, $P_{strata}$. The inputs to Strata comprise of a tuple, comprising the protected software application $P_{TR(APP)}$, the input to the original application, $in_{APP}$. The configuration settings for Strata are also given as input, $c_{strata}$. On completion, output $out_{APP}$ is generated, along with any outputs from Strata, $o_{strata}$.

The memory of the host machine is transformed from $m1_{x86}$ to $m2_{x86}$.

Next, we analyze the memory used by the interpreter. As we have described, these can be broken down into two separate components, one belongs to the application, and the other to Strata. Consequently, in Equation 8.1, the memory state at the beginning of interpretation, $m1_{x86}$ can be split into $m1_{x86}^{strata}$, and $m1_{x86}^{APP}$, represented in Equation 8.2.

$$m1_{x86} = m1_{x86}^{APP} \cup m1_{x86}^{strata} \quad (8.2)$$

Similarly, the output memory can also be split in to $m2_{x86}^{strata}$, and $m2_{x86}^{APP}$, represented by Equation 8.3.

$$m2_{x86} = m2_{x86}^{APP} \cup m2_{x86}^{strata} \quad (8.2)$$

Rewriting Equation 8.1 with these changes, we have:

$$\phi_{x86}(P_{strata}, <P_{TR(APP)}, in_{APP}, c_{strata}>, m1_{x86}^{APP} \cup m1_{x86}^{strata}) \rightarrow <<out_{APP}, o_{strata}>, m2_{x86}^{APP} \cup m2_{x86}^{strata}> \quad (8.4)$$

Equation 8.4 illustrates the interpretation of a PVM-protected application, with the distinct memory components. The inputs to Strata comprise of a tuple as before, comprising of $P_{TR(APP)}$, the input to the original application, $in_{APP}$, and the configuration settings for Strata, $c_{strata}$. On completion, output $out_{APP}$ is generated, along with any outputs from Strata, $o_{strata}$. In this case, the memory components have been split. The input memory can be described as the union of the memory state of the application and the PVM. The same case applies to the memory state at the end of interpretation. The basic premise behind this attack methodology is that the memory components are mutually exclusive. Thus, for the input components, we represent this situation in Equation 8.5.

$$m1_{x86}^{APP} \cap m1_{x86}^{strata} = 0 \quad (8.5)$$

The same scenario holds for the output memory components, represented in Equation 8.6.

$$m2_{x86}^{APP} \cap m2_{x86}^{strata} = 0 \quad (8.6)$$

To summarize, the sets of data values accessed by the application and the protective PVM are distinct.

Given Equations 8.5 and 8.6, if an adversary is able to identify a member of the application's data value set, and iteratively analyze the flow of the value, it could reveal other relevant values that belong to the application, and the instructions that access them (Relevance implies that the value is a partial product that is pertinent to the eventual computation). Once the application's instruction sequence is obtained in this manner, the adversary can apply any number of known reverse-engineering techniques to obtain its representation at a higher level of abstraction and analyze its functionality.

Now that we have established the main concepts behind the VDA methodology, we describe the implementation by Coogan, et al.

3.1.1 Coogan, et al.'s Implementation of VDA

The domain of Coogan, et al.'s investigations involved malware protected by software interpreters, such as VMProtect [36] and CodeVirtualizer [37]. This point is pertinent, because malware is minuscule in size, compared to generic applications this research is attempting to protect. When their methodology is applied to generic software, the amount of protection offered is reduced. But, the general principle still holds.

Their implementation consists of two steps. The first step involves data analysis of the trace to recognize instructions that belong to the original application. The second step involves performing control flow analyses on the instructions identified to generate program structures (e.g., call-return pair, jumps, etc.) such that the representation is at a higher level of abstraction. The control-flow analyses are not specific to reverse engineering virtual machines, but can be applied to attack any generic obfuscation technique. As such, we focus on the first part of the attack, (i.e. the data-flow analysis).

To initiate the attack, a run-time trace of the interpreted application is generated and recorded. The next step involves identifying system calls that belongs to the original application. System calls belonging to the interpreter can be easily identified by generating the execution trace of two different PVM-protected applications and matching the common system call invocations.

Once the system calls are identified, the data path of their arguments are investigated. As we have established, the goal of this analysis is to identify all data values and, by extension, instructions that directly or indirectly access these values. The direction of this analysis is reverse to execution order, (i.e., from the system call back to the next system call or the first instruction executed). The analysis terminates when another system call is encountered or the first instruction of the trace is reached.

A notable feature of their VDA implementation is that it essentially focuses on the flow of values and neglects non-essential computations, such as address calculation. As such, the extracted information deals almost entirely with the algorithms that have been implemented in the application. By ignoring such non-essential constructs, this feature simplifies the adversary's work load.

Listing 8.1 (shown in the Listing section below) shows a value-based Dependence Analysis of PVM-protected applications, as defined by Coogan et al. [57]. In particular, Listing 8.1 illustrates the VDA algorithm together with the modified definitions for use and def. The analysis begins at a system call invocation known to be part of the application. For each such system call, the Application Binary Interface (ABI) information is used to identify its arguments. At the onset, a set S is initialized with the locations containing these arguments. Then the trace is scanned in reverse, and each instruction is processed as follows: if I defines a location l∈S, I is marked relevant, l is removed from S, and the set of locations used by I is added to S. This scan continues until S is empty, the beginning of the trace is reached, or another system call belonging to the application is reached. If the terminal condition is another relevant system call, this process is repeated. The definition of use and def has been modified from the classical definition, to focus on the values (registers and addresses), rather than the locations of these values. This modification reduces the amount of information extracted, because address computations are ignored. Therefore, only the instructions dealing with core computation are identified.

We apply Listing 8.1 to an example code snippet obtained from the trace of a PVM-protected application, displayed in Listing 8.2 in static single assignment (SSA) form. (For reference, SSA is a representation technique in which each assignment denotes a new variable [111]. New variables are typically denoted by a subscript on the name of their container. Thus, $eax_1$, and $eax_2$ refers to different variables that reside in eax.) We then study the effects of VDA on this snippet. The system call, print, has been identified as part of the application. The application of VDA to Listing 8.2 works as follows:

- $I_{11}$: invokes the system call. ABI information reveals that system call, print takes one argument, which is placed in register ebx. So, this instruction is tagged, and the set S is initialized with register ebx, i.e., S={ebx}
- $I_{10}$: moves the system call to the register eax. This instruction is tagged. S remains unchanged, i.e., S={eax}
- $I_9$: moves a value from register eax to ebx. Since ebx is a member of S, we add eax to S, and remove ebx, i.e., S={ebx}. This instruction is tagged.
- $I_8$: adds eax and ebx, and stores it in eax. This instruction is tagged. Thus, S={eax, ebx}.
- $I_7$: stores an immediate value in ebx. Since ebx is in S, we remove it from the set, S={eax} and we tag this instruction.
- $I_6$: stores a value from memory location, ($ecx_1$+0x1000) to eax. Thus, S={$ecx_1$+0x1000)}. Note that ecx is not included in S because it deals with address calculation.
- $I_5$: stores an immediate value in ecx. Since ecx is not in S, this instruction is ignored. S={($ecx_1$+0x1000)}.
- $I_4$: makes an indirect jump off the stack. This instruction is ignored.
- $I_3$; $I_2$; $I_1$; $I_0$ perform processing which does not involve memory location ($ecx_1$+0x1000). Hence, these instructions are ignored.

Thus, VDA tags the following instructions as belonging to the application:

$$\{I_6, I_7, I_8, I_9, I_{10}, I_{11}\} \qquad (8.7)$$

Applied iteratively on the instruction trace, VDA is able to identify all the application instructions that are used for core computation. Thus, one of the major protections offered by the PVM is successfully removed.

In the next section, we provide a solution to Coogan, et al.'s implementation of VDA. This solution is based on software binary translators, and exploits the fact that their implementation ignores instructions that perform address calculation.

3.2 Effectiveness of VDA on Binary Translation Systems

The VDA implementation designed by Coogan et al., addresses software interpreters, although the basic theory is applicable to any PVM technology. An optimization devised by the authors involved ignoring any instructions that deal with address calculation, and only focusing on memory and registers contents, containing partial computation products. We describe a scheme that thwarts Coogan, et al.'s design by transforming the addressing modes of application instructions at run time.

3.2.1 Dynamic Transformation of Addressing Modes (DTAM)

DTAM operates by transforming addressing modes. It has been designed specifically for software dynamic translators (SDT) as these translators are able to generate and modify code at run time. The main premise behind this solution involves changing direct data transfer to indirect transfers. Making this transformation on the application is relatively straightforward using SDTs. We validate this claim using Strata.

Our DTAM implementation is targeted towards PVM-protected application running on 32-bit Linux platform. We assume that the size of an int variable is 4 bytes. At application start up, the PVM allocates a chunk of contiguous memory, $M_{base}$ of size n*4, located at address base. Then, this memory is initialized, such that the offset 4*i contains the value i.

$$[base+index*4]=index \qquad (8.8)$$

During execution, whenever the PVM encounters application instructions containing direct register transfers, it translates such transfers into based indexed indirect transfers [112]. Consider the simple transfer listed in Equation 8.3. In this regard, Listing 8.3 shows direct register transfer.

Strata translates this instruction into the sequence listed in Listing 8.4. In this regard, Listing 8.4 shows indirect data transfer, created by Strata at run time.

The register that is used to store the base address of the memory block, in this case, ecx, can be any register that is not being used as an operand in the direct transfer. Because Coogan, et al.'s implementation ignores instructions dealing with address calculation, it will fail to track the flow of data through the base and index registers (ecx and ebx in Listing 8.4, affecting the effectiveness of VDA.

We apply dynamic address-mode transformation to the code snippet presented in Listing 8.2. Listing 8.5 illustrates the modified snippet, as generated by Strata. In particular, Listing 8.5 shows example assembly code using based, indexed indirect transfers.

Strata adds a function, init_array, to initialize the block of memory. Applying the VDA scheme to this code snippet yields:

- $I_{15}$: invokes the system call. ABI information reveals that system call, print takes one argument, which is placed in register ebx. So, this instruction is tagged, and the set S is initialized with ebx, (i.e., S={ebx}).
- $I_{14}$: moves the system call to register eax. This instruction is tagged.
- $I_{13}$: moves a value to register ebx. As ebx is in set S, we remove it, and add eax, i.e., S={eax}. This instruction is tagged, and S={eax}.
- $I_{12}$: restores a value to register edx, which is not in S. This instruction is ignored.

$I_{11}$: moves a value from memory to register eax. As eax is in S, we remove it from the set, and add the memory location. This instruction is tagged, and S={(eax$_2$+edx$_2$)}.

$I_{10}$: loads the start address of the memory buffer into edx. This instruction is ignored.

$I_9$: saves edx on the stack. This instruction is ignored.

$I_8$: adds the value of eax and ebx. As eax is no longer in S, this instruction is ignored.

$I_7$: loads a value in ebx. This instruction is ignored.

$I_6$: loads a value from memory into eax. This instruction is ignored.

$I_4$ through $I_0$: are all ignored by Coogan, et al.'s implementation VDA, as none of them write to any of the contents of the set, S.

This analysis will eventually tag the instructions of the function init_array, completely ignoring the instructions that actually implement the core functionality. Thus, in the original code snippet of Listing 8.2, Coogan, et al.'s analysis only identifies the following instructions as belonging to the application.

$$\{I_{11}, I_{13}, I_{14}, I_{15}\} \quad (8.9)$$

The instructions performing core computations ($I_5$ through $I_8$) are ignored. As our investigation illustrates, this scheme significantly reduces the effectiveness of VDA attacks. In particular, arithmetic and logical operations are ignored. As such, the adversary will be unable to identify the majority of instructions that form the original application.

Caveats

Although this solution is effective at thwarting VDA attacks, there are a couple of points that should be recognized.

A point of concern involves the size of the MBASE (i.e., n). Theoretically, it should be equal the maximum possible value that can be stored in a variable of type int. However, such a value would lead to a prohibitively high memory overhead. To reduce overhead, n should be set to a reasonable value. At run time, the protective PVM will transform the addressing mode only if the value being transferred using register direct mode is less than n.

We also acknowledge that this technique has a high performance overhead, because it replaces a simple register-to-register transfer with instructions that access memory. If the instruction to be replaced exists on a frequently-executed path, the overhead implications could be severe. As we have already seen in Chapter 5 of the above-referenced Provisional Application No. 62/090,556 incorporated herein by reference above, profiling the application provides a simple technique to identify basic blocks (and instructions) that are on hot paths. When applying this protection scheme, the application should be profiled, and only those direct transfers targeted for replacement, that do not lie on such paths.

In the next section, we modify Coogan, et al.'s original design of VDA to be effective in the presence of DTAM.

3.3 Modified Value-Based Dependence Analysis (MVDA): An Example of White-Hat Attack The area of program protections is attritional by nature. The adversary designs techniques to steal assets from applications. The software defender develops mechanisms to protect applications from such attacks. Then, the adversary constructs schemes to disable the protections, and so forth. Aware of this cyclical nature of protections, most security researchers often attempt to break their own protection techniques, as a measure of robustness. This technique, called 'white hat' or ethical hacking, offers the security provider a view of the protections from the perspective of the adversary.

Such schemes often lead to discovery of weaknesses and loopholes, that may not be clear initially (such as the attack on Skype [19]).

In this section, we switch our viewpoint to that of an adversary. In the last section, we demonstrated that Coogan, et al.'s implementation of the VDA attack is relatively straightforward to overcome, specially using a PVM based on binary translation that can perform code manipulations at run time. Rather than wait for an adversary, it would be prudent to attempt to design the next step in the evolution of the VDA methodology. The results of such an analysis could be used to make protections more robust.

The DTAM scheme operates by modifying address transformations. We opted to attack this aspect of the solution. Thus, we modify VDA to include the operands used in address calculation in its analysis as well. That is, the analysis of the dataflow should include the address generation operands as well.

Applying this modification to our definition of VDA in Listing 8.1 yields the modified definition displayed in Listing 8.6. Here, Listing 8.6 shows modified definitions of def and use, to thwart trivial solution.

In this listing, the function use, is modified to return any registers that were used to generate the address. For example, on a Intel x86 platform, applying use to the instruction in Listing 8.7 returns ebp, esi, and the address pointed to by (ebp+esi), as illustrated by Listing 8.7. In this regards, Listing 8.7 (shown in the Listings section below) shows an example of address calculation in an instruction mov eax, [ebp+esi].

We now apply this modified VDA algorithm to the code snippet presented in Listing 8.5. This analysis yields:

$I_{15}$: invokes the system call. ABI information reveals that system call, print takes one argument, which is placed in register ebx. So, at the onset, the set S is initialized with ebx, i.e., S={ebx, eax}.

$I_{14}$: moves the system call number to register eax. This instruction is tagged, and S={ebx}.

$I_{13}$: moves a value to register ebx. Since ebx is in set S, we remove it, and add eax, i.e., S={eax}.

$I_{12}$: restores a value into edx. Since this register is not in S, we ignore this instruction.

$I_{11}$: stores a value into eax, which is present in S. This instruction exemplifies our modification. Now, we replace eax in S with edx, eax, and the memory address (eax+edx), i.e., S={eax, edx, (eax+edx)}. This instruction is tagged.

$I_{10}$: moves an immediate value into edx, which is present in S. Hence, edx is removed, and this instruction is tagged, i.e., S={eax, eax+edx)}.

$I_9$: stores the value in edx. This instruction is ignored.

$I_8$: stores a value in eax, which is in S. Hence, eax is removed, and the operands, ebx, and eax are inserted. This instruction is tagged, and S={eax, ebx, (eax+edx)}.

$I_7$: moves an immediate into ebx. This instruction is tagged, and S={eax, (eax+edx)}.

$I_6$: moves a value from memory to eax, which is in S. Hence, this instruction is tagged, and the memory location, b is added. The register used in address calculation is also added to S, resulting in S={(eax+edx), (ecx+0x1000), ecx}.

$I_5$: moves an immediate value to ecx. This instruction is tagged. S={(eax+edx), (ecx+0x1000)}.

$I_4$ through $I_0$: are ignored, since they do not involve writing to locations a and b.

This analysis results in the following instructions being tagged:

$$\{I_5, I_6, I_7, I_8, I_9, I_{10}, I_{11}, I_{12}, I_{13}\} \quad (8.10)$$

Comparing Equation 8.7, Equation 8.9 and Equation 8.10, we observe that MVDA does output more instructions than Coogan et al.'s implementation, but less than the actual trace size. All the core instructions are present in the output of MVDA.

This running example illustrated the effects of the VDA methodology over a small code snippet. We now expand the scope of the analysis, to include the whole application trace, and evaluate the effects of VDA. The next section describes our results.

3.3.1 Evaluation

To judge the effectiveness of both VDA and MVDA techniques, we decided to compare the dynamic instruction count (DIC) obtained by applying these techniques to run-time traces generated under different scenarios. We performed our experiments on a subset of the SPEC 2000 benchmarks under different scenarios. The count in each scenario is normalized with respect to the DIC in the original, unprotected application. The first scenario under consideration involves calculating the DIC of a PVM-protected application. Next, we display the DIC obtained from applying VDA to the PVM-protected application. The third scenario consists of the DIC obtained from applying VDA to a DTAM-protected application. The last scenario involves obtaining the DIC from applying MVDA on an application protected via DTAM. FIG. 9D illustrates the results. In particular, FIG. 9D shows dynamic instruction counts, normalized to the original application. The four scenarios include running the PVM-protected application, the count of the instructions obtained when VDA is applied to the PVM-protected application, the instruction count when VDA is applied to an application protected with dynamic address-mode transformation, and finally, MVDA applied to an application protected with dynamic address-mode translation.

From the perspective of the adversary, the optimal condition is represented by the scenario where VDA is applied to a trace of a standard PVM-protected application. As we have previously described, VDA only focuses on instructions that perform the core computation for the application. It ignores all superfluous instructions (such as address computations, and those instructions that belong to the PVM). Any technique that outputs information greater than this case has likely extracted some of the superfluous instructions. Any technique that outputs information less than this case has likely ignored some of the instructions dealing with core computations. Therefore, both these cases are worse.

As the figure illustrates, on average, the PVM introduces 40% more instructions to the benchmark. Since applications have DIC in the order of billions, this overhead represents a significant increase on the part of the adversary. Analysis of second scenario reveals that VDA reduces DIC by more than half, compared to the first scenario. This result indicates that more than half of the dynamic instructions of the PVM-protected application consist of the PVM or address-calculation instructions. The remaining instructions form the core of the application (about 70% on average), and are of the most value to the adversary.

The third scenario reveals that DTAM removes most of the relevant instructions. On average, applying VDA on this protection scheme uncovers only 25% of the original instructions. As we demonstrated via an example in Section 3.2, most of the instructions obtained in this scenario consist only of the data transfers. The arithmetic and logical instructions that form the bulk of any complex application, are completely missed by VDA in the presence of DTAM protections.

Finally, MVDA is able to render DTAM protections ineffective, uncovering close to 90% of the original application. This figure is slightly higher than the result obtained from Coogan, et al.'s analysis (Scenario 2), which we assume to be optimum, but is still better than Scenario 3. Although this change to VDA increases the amount of information to be processed, it makes VDA more effective at disabling all PVM technologies. To effectively defeat this modified version of VDA, a more robust solution is required. In the next section, we present such a solution that involves the protective PVM modifying data that belongs to the application.

3.4 DataMeld: Blending Data Between the Application and the PVM

Now, we revert back to our original viewpoint, that of the software defender. The goal now is to design a solution to the robust version of VDA methodology introduced in Section 3.3. In this section, we present a revolutionary approach to virtualization that thwarts VDA attacks, by removing the separation between the application and the PVM data sets. The basic idea involves inserting the PVM data into the data flow of the application, without affecting functionality. In the presence of this obfuscation scheme, data-based analyses, such as VDA, will be unable to discern the individual components (the PVM and the original application). VDA will track instructions belonging to the PVM as well. Consequently, the effectiveness of VDA will be reduced, nullifying it as a search-space reduction technique.

We call this scheme DataMeld, because it obfuscates the application by blending its data flow with that of the PVM. To achieve optimum protection, all the data values of the protective PVM should affect the application's data values. However, extracting this information from the PVM can be an onerous task. Thus, part of the research involves the creation of a tool that analyzes memory usage patterns of the PVM and outputs those variables that provide the maximum coverage in terms of the PVM code. The software defender can then proceed to blend the dataflow of the two components. We explain this process in greater detail in the next section.

DataMeld is achieved by applying arithmetic and logical operations on application values using PVM data as operands, and vice versa. However, these operations cannot be applied arbitrarily. Care must be taken to ensure that this manipulation does not affect the outputs of the application. Thus, these data manipulations should have no effect over the course of the application lifetime. We achieve this effect by applying a series of operations on the data values of the application, and then, applying the inverse of these operations, using PVM data values as operands. This action occurs at different points in the run time of the PVM-protected application.

One such convenient point is when the PVM obtains control and translates the application. When control is transferred to the PVM, the application data values can be extracted and modified. After the PVM completes translation, the values are reverted and control is transferred to the translated code. The data values of the application can be accessed easily by the PVM. Prior to transferring control, the application's context is stored on the software stack. As both the application and the PVM share this stack, the PVM can scan the stack, and read the values. These values are subsequently modified using different PVM variables and stored back in their original locations on the stack. After the translation of the current block is completed, the PVM will revert the modifications and store the values in their original location on the stack. In this manner, dataflow of the application is transformed to include data from the PVM as well.

As we mentioned previously, these modifications should have no net semantic effect, so that the transformed application generates the same outputs as the original version, for all inputs. A knowledgeable adversary can attempt to locate these operations based on this premise. To make this scheme more robust, the modifying operations can utilize techniques, such as pointer aliasing [23, 8], and branch functions [81]. These techniques make it harder for the adversary to analyze the trace.

For example, modifying the data values of the protected application using the values of the execution environment in a semantically-neutral manner or modifying the data values of the execution environment using the values of the protected application in a semantically-neutral manner. Preferably, the execution environment comprises any combination of a process-level virtual machine, a system-level virtual machine, a hypervisor, a simulator, an emulator, or a just-in-time compilation system.

In essence, the effect of this scheme is to bind the data flow of the application with that of the PVM. To maximize this binding (i.e., maximize obfuscation), the chosen PVM variables must be affected by as many PVM instructions as possible. We define the number of instructions that affect the value of a variable as instruction coverage for variables (ICV). This metric can serve as an indicator of the strength of the protection against VDA. Variables with a higher ICV value will generate more obfuscation comparable to variables with lower values. One of the contributions of our research is a tool that calculates the ICV values for the variables in a software application.

Figure 9E:
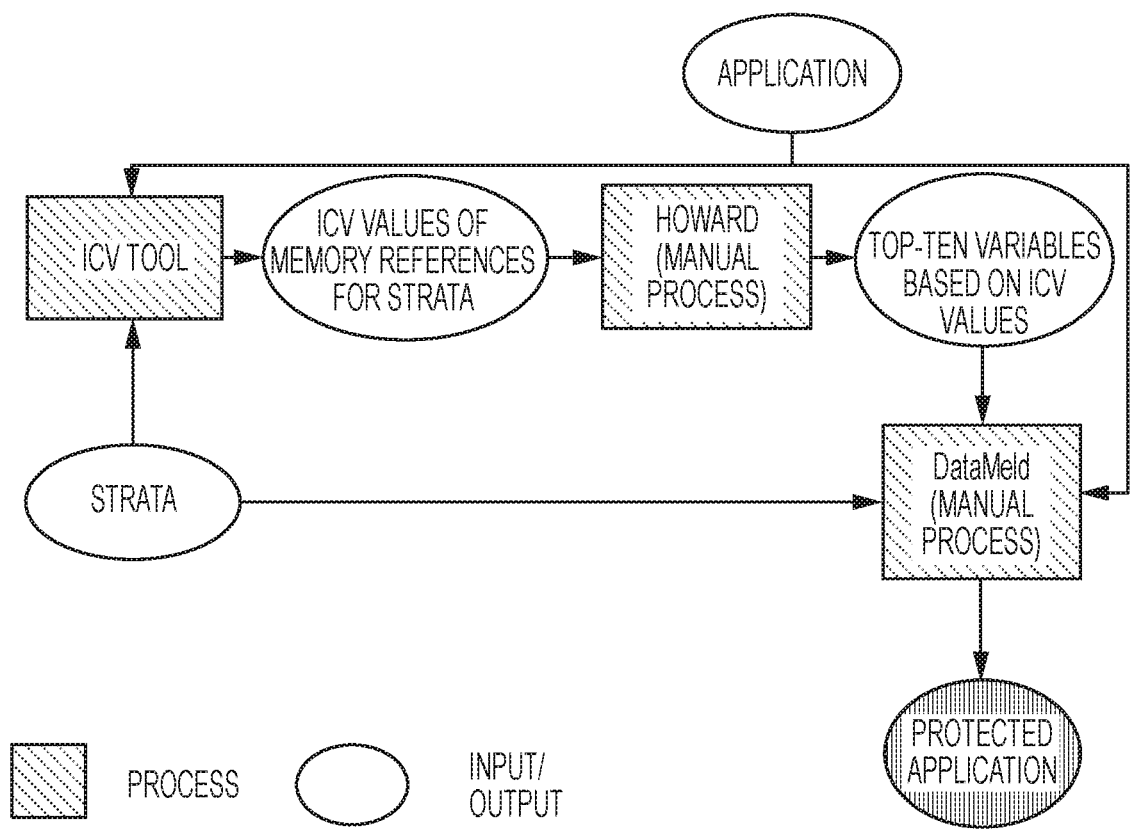
FIG. 9E is an illustrative flow diagram of the workflow for an application protection process via DataMeld according to some embodiments.

FIG. 9E illustrates the workflow for protecting an application via DataMeld. In particular, FIG. 9E shows the workflow for the application protection process via DataMeld. First, the memory references with most instruction coverage are calculated. Subsequently, the variables in source code that correspond to these references are identified. Finally, DataMeld is implemented using Strata.

The steps of the workflow are as follows:

1. The application is packaged with Strata, and subjected to the ICV tool, described in Section 8.5. This tool generates the ICV values for the memory references used by Strata. The top-ten memory references are chosen, according to decreasing ICV values.

2. Previously-derived heuristics (HOWARD) [113] are utilized to identify the variables that correspond to the memory references generated in Step 1. The heuristics facilitate identifying data structures from the source code. This step is performed manually. This part of the workflow is described in greater detail in Section 3.6.

3. The source code of Strata is manually modified such that at run time, Strata can extract and modify application values from the stack, using the variables identified in Step 2. Subsequently, the PVM-protected application package is created, as in previous cases.

We now proceed to explain the ICV calculation in detail.

3.5 A Tool to Calculate ICV

ICV calculation is based on dataflow analysis (DFA), which tracks the flow of data throughout execution, and has been used in software security techniques, such as taint analysis of software programs [114, 115, 116]. ICV basically computes the number of instructions that have affected the value of a particular variable. The goal is to obtain the ICV value for all the data variables in the PVM. The PVM variables with higher ICVs can then be used as candidates in the implementation of DataMeld.

Our tool has been designed to work on PVM-protected applications. We are only interested in the dataflow of the PVM, hence the analysis phase ignores data flow of the original application. Our tool calculates dynamic ICV for the PVM (i.e., the number of dynamic instructions affecting the data variable).

The tool analyzes the run-time of the application. It operates on a per-function basis. On startup, each data memory location in the application is assigned with an ICV counter, initialized to zero. Whenever a memory write instruction is encountered, the ICV of the destination operand is updated based on the ICV counter of its source operands, plus the current instruction. The rules for calculating the updated value are described in Section 3.5.1. On most systems, general-purpose registers are used to perform arithmetic and transfer operations, as such, each general-purpose register is also assigned with a ICV counter. After the application exits, each memory reference is collated and ordered based on the counter value.

In the next section, we describe the rules that guide ICV calculation.

3.5.1 Rules Regulating ICV Calculation

This section describes the rules for calculating the ICV of application memory locations. These rules have been extended from the DFA rules proposed by Kemerlis et al. [117]. In the following discussion the term dst refers to the destination operand, whereas src* refers to the source operands.

The rules are based on the type of opcode of the instruction.

ALU: These operations typically consist of 1 or 2 source operands writing to a destination operand. Examples of such instruction include sub, add, and mul. For such instructions, the ICV for the destination operand can be calculated as follows.

$ICV_{dst}=ICV_{src1}+ICV_{src2}+1$

All literal values have an ICV of zero.

XFER: These operations consist of data transfers from the source to the destination. Both the source and the destination can be a register or a memory location. The rule for such instructions is as follows:

$ICV_{dst}=ICV_{src}+1$

As before, literal values have an ICV of zero.

CLR: Examples of such instructions include cpuid, setxx, etc. Zeroing out operations are also included in this category (e.g., xor eax, eax). The ICV for such locations is:

$ICV_{dst}=1$

SPECIAL: This class contains instructions that cannot be handled appropriately by the above primitives. Examples of such instructions include xchg, cmpxchg, lea, etc.

The tool ignores all other instructions, such as FPU, MMX.

Next, we apply these rules to a small code snippet, and calculate the ICV values for the variables in that example.

Listing 8.8 shows an example code to illustrate Instruction Coverage for Variables. Note that the implementation actually works at the binary level. In particular, Listing 8.8 displays the snippet. Initially, the ICV for the variables datum1, datum2, and datum3 is zero. In Line 1, datum1 is written, therefore, its ICV is set to 1. Similarly, in Line 2, the ICV for datum2 is set to 1. Finally, in Line 3, the ICV for datum3 is set to the ICV of its operands plus the current instruction, (i.e., 3).

We have created a tool that calculates ICVs based on these rules, using Intel's Pin instrumentation framework. This pintool analyzes PVM-protected applications, and calculates ICV values based on the above rules. For our prototype, we used Strata as the protective PVM. Since this tool only calculates ICV for variables in Strata, a technique is required to trigger the pintool when Strata obtains control (to continue analysis), and when it relinquishes control (to pause analysis). We achieve this trigger by instrumenting the strata_build_main (which indicates control has been transferred to Strata), and the targ_exec (which indicates that control has been transferred to the translated block) functions. Whenever a write occurs, the ICV of the destination operand is updated by applying one of the rules to the ICV values of the source operands. The tool maintains the ICV values in a map data structure, indexed by memory address. At the end of execution, this map contains the ICV values of all the memory addresses accessed by the PVM.

3.6 Mapping Memory References to Variables in Source Code

The pintool generates ICV values for memory references of Strata. We need a technique to ascertain the variables in source code that correspond to these references, as the DataMeld is implemented at the source code level. This information can be extracted from heuristics that recover data structures from binary code. Extensive research has already been performed in this area, such as the CodeSurfer project designed by Balakrishnan and Reps [118, 119, 120]. Others research of note include Laika [121], and Rewards [122]. In light of the established body of research, we proceeded with reusing some of these techniques for our goals.

3.7 Implementing DataMeld

For our purposes, we adopted the techniques for dynamic data structure excavation from the Howard system [123, 113]. Howard has been designed to extract data structures from generic binaries. This information is extracted by running the application, and analyzing the data usage pattern. Since we are only interested in applying these techniques to protective PVMs like Strata, we simplified them accordingly. For our initial study, we have restricted our analysis to local function variables.

During execution, whenever a call instruction is encountered, it signifies a new function is to be analyzed. A ret instruction signifies the end of analysis for the current function. The frame pointer (ebp), or the stack pointer (esp) is typically used in operations on local variables. Local variables and arguments are accessed via positive or negative offsets off of these registers.

While processing a function, if an operation that is relevant to ICV calculation occurs, and one of the operands is a memory location accessed via the stack or frame pointer, its offset is recorded, along with the ICV calculations. When the entire analysis terminates, we collate this per-function data and attempt to match the offsets with the variables from source code manually. Although this method is not precise, we were able to obtain sufficient information to facilitate implementation of DataMeld.

In the next section, we describe the creation of the DataMeld system.

3.7 Implementing DataMeld

Once the variables are recognized, Strata is modified to extract and the applications values on the stack. The main code modifications occur in the builder function of Strata, strata_build_main.

The prototype of this function is as follows:

Listing 8.9 shows a function prototype of strata_build_main, which is shown as fcache_iaddr_t_strata_build_main(app_iaddr_t to_PC, strata_fragment*from_frag).

This function is invoked when a new application block has to be translated. Prior to invoking this call, the application's context (i.e., all the register values, as well as status flags) are pushed on to the program stack. Once this function is invoked, these values can be accessed via its function arguments. An example code snippet that performs this operation is as follows:

Listing 8.10 shows a strata code snippet to access the locations where application values are stored.
eax_address=(int*)(((char*)& from_frag)+36);
ecx_address=(int*)(((char*)& from_frag)+32);
edx_address=(int*)(((char*)& from_frag)+28);
ebx_address=(int*)(((char*)& from_frag)+24);

In Listing 8.10, the variable eax_address contains the address of the stack location containing the eax values of the application prior to context switch. Similarly, the eb_address contains the address of the location storing ebx' values, and so on.

Once these locations are extracted, code can be added in strata_build_main to modify these values. An example follows:

Listing 8.11 shows strata code modifying the applications values
(eax_address)+=frag->fPC;

In particular, Listing 8.11 illustrates the modification of the application's eax values by a variable of Strata, frag->fPC.

Prior to strata_build_main returning control to the newly translated block, the above mentioned change must be reverted. This modification is illustrated in Listing 8.12.

In particular, Listing 8.12 shows Strata code reverting the applications values
(eax_address)-=frag->fPC;

In this manner, the application's values can be tainted by the PVM values. These examples perform simple calculations, but any complex calculations can be performed, as long as the values on the stack prior to strata build main returning control are identical to the values at the point of invocation of this function. Applying VDA to such a protected application will lead to a large portion of the PVM appearing in the results, thwarting analysis. In the next section, we present some of the results of our evaluation.

3.8 Evaluation

We successfully prototyped the DataMeld system, using Strata, and performed analysis on its protection properties. We summarize our efforts in this section.

3.8.1 ICV Tool Output

As before, we utilized Strata as the prototype for the protective PVM. Initially, we ran the ICV tool on a simple PVM-protected application, and obtained 10 variables that had the highest ICV counts. We then manually modified the Strata source code, such that when Strata was in control, it would extract the application values from the stack and modify its contents, using these variables as operands.

Table 8.1 (shown below) displays the ten variables with the highest values of ICV. For the prototype, we used simple arithmetic operations to modify the data values of the application, using these variables. The operations that are performed on the application variables are not static, but selected at random. Care must be taken to ensure that these operations are reverted when control returns to the translated code.

TABLE 8.1

Table displaying the top-10 variables in terms of ICV values. These variables are used for creating the DataMeld system.

| Rank | File name | Function name | Variable name |
|---|---|---|---|
| 1 | targ-build.c | targ_classify | insn |
| 2 | targ-build.c | targ_classify | opcode |
| 3 | targ-build.c | targ_normal | insn |
| 4 | targ-build.c | targ_normal | frag |
| 5 | targ-build.c | targ_normal | class |
| 6 | targ-build.c | targ_pcrel_branch | insn |
| 7 | build.c | strata_build_main | frag |
| 8 | targ-build.c | targ_create_trampoline | tramplist |
| 9 | build.c | strata_build_main | to_PC |
| 10 | build.c | strata_create_trampoline | patch |

3.8.2 Measuring Obfuscation

To measure obfuscation caused by DataMeld, we added an additional scenario to the analysis performed in Section 3.3.1. This additional scenario comprises of calculating the DIC obtained by applying the MVDA analysis on a DataMeld-protected application.

FIG. 9F shows dynamic instruction counts, normalized to the original application across all the five scenarios. To recap, these scenarios include running the PVM-protected application as is, the DIC obtained when VDA is applied to the PVM-protected application, the DIC when VDA is applied to an application protected with DTAM, the DIC obtained when MVDA is applied to an application protected with DTAM, and finally, the DIC when MVDA is applied to an application protected via DataMeld.

In particular, FIG. 9F displays the DIC for a few benchmarks, together with the DICs obtained from the previous four scenarios described in Section 3.3.1. As the figure illustrates, DataMeld increases the amount of superfluous instructions obtained by MVDA, thereby thwarting the attack. On average, the DIC for DataMeld-protected applications is 25% more than that of an unprotected application. Recalling Section 3.3.1, the optimum scenario for the adversary comprises of applying VDA to a PVM-protected application, which resulted in a DIC that was 30% less than that of an unprotected application. As such, our results indicate that DataMeld does increase the amount of obfuscation in the trace. These experiments on DataMeld were performed by using the top ten variables in terms of ICV values. By increasing the number of values, DataMeld can provide more obfuscation. Each additional variable will likely result in VDA generating more instructions (i.e., those instructions that interact with the additional variable).

These investigations reveal that DataMeld can improve the robustness of the protective PVM, against dataflow-based attacks like VDA. Employing this scheme removes another weakness that could potentially be exploited by an adversary, preventing them from removing protections and acquiring the application's assets in an unauthorized manner.

3.9 Summary

In this Part, we presented our investigation into the flow of data between the application and the protective PVM. We began the discussion by describing the work of Coogan, et al., in designing an attack on PVM-protected applications by obtaining the trace and performing dataflow analysis, called Value-based Dependence Analysis (VDA). We modeled this attack methodology within our framework. We then proceeded to extend the attack to binary translation systems. The original version of VDA could be defeated by software dynamic translators, but we demonstrated a modified version of VDA that is effective at disabling any PVM technology. Finally, we designed a robust solution, DataMeld, that offers protection by conflating the dataflow of the PVM with that of the application. Our results show that DataMeld is effective at thwarting dataflow-based attacks on PVM-protected applications.

Illustrative Systems for Implementing Embodiments of the Present Invention

Figure 10:
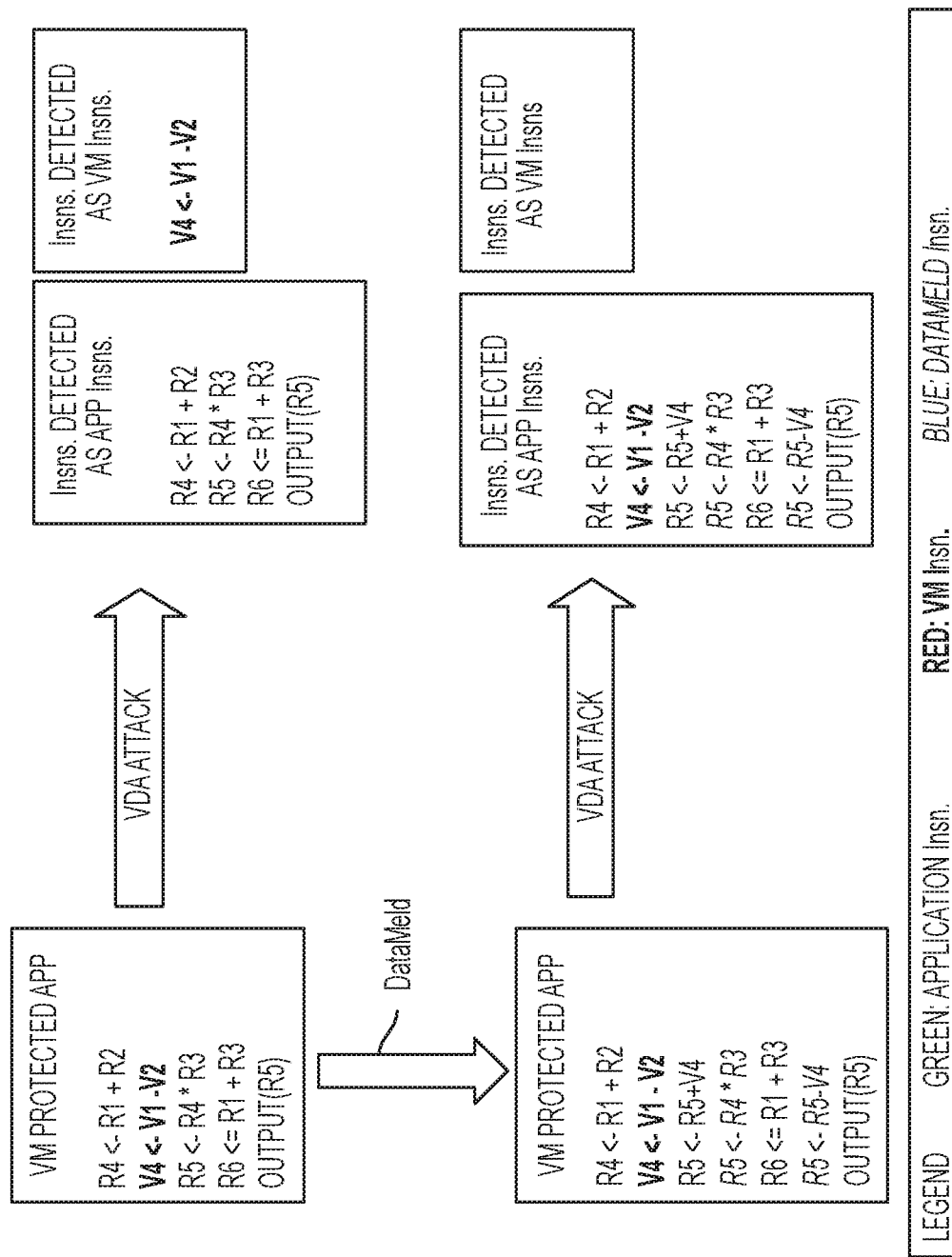
FIG. 10 provides a schematic diagram illustrating an aspect of an embodiment of the present invention.

FIG. 10 illustrates an embodiment of the present invention which compares a VM protected application that is subjected to a VDA attack and a DataMeld VM protected application that is also subject to the VDA attack.

For the VM protected application, the VDA attack is able to detect and separate the VM instruction, V4<-V1-V2 (shown in red) from the remaining instructions that are detected as application instructions (shown in green).

In contrast, for DataMeld VM protected application, the VDA attack is unable to detect any of the instructions as VM instructions, since the VDA attack is unable to discern the individual components of the VM from those of the application. That is, as shown in FIG. 10, the VM variable V4 is inserted into the data flow of the application without affecting the functionality of the application. As discussed previously, the data values of the application can be accessed easily by the PVM, since prior to transferring control, the application's context is stored on the software stack, and as both the application and the PVM share this stack, the PVM can scan the stack, and read the values. Then, DataMeld is achieved by applying arithmetic and logical operations on application values using PVM data as operands. Specifically, as shown in FIG. 10, the PVM reads the value R5 from the application modifies it with the PM variable V4 as an operand and applies a first DataMeld instruction R5<R5+V4 (shown in blue).

After the translation of the current block is completed, the PVM will revert the modifications and store the values in their original location on the stack. That is, as shown in FIG. 10, a second DataMeld instruction is applied R5<R5−V4 (shown in blue), which is the inverse of the first DataMeld instruction R5<R5+V4. Thus, the data values of the application are modified using the values of the PM in a semantically-neutral manner. That is, as shown in FIG. 10, both VM protected application and the DataMeld VM protected application output the same data value (R5).

Thus, since the DataMeld VM protection application 110 blends or interleaves the PVM data into the data flow of the application, without affecting functionality, DataMeld presents an obfuscation scheme that data-based analyses, such as VDA, will be unable to discern the individual components (the PVM and the original application). For example, as shown in FIG. 10 the VDA attack is unable to detect any of the VM instructions in the DataMeld VM protection application and instead track instructions belonging to the PVM as well as the application. Consequently, the effectiveness of VDA is substantially reduced.

FIG. 11 shows a comparison of the Dataflow Graph of Output Values without DetaMeld to the Dataflow Graph of Output Values with DataMeld. Of course, while there is an increase in the number of instruction with DataMeld, as shown in FIG. 11, clearly the added obfuscation provided by DataMeld against a VDA attack out weight the slight increase in instruction count.

Figure 12:
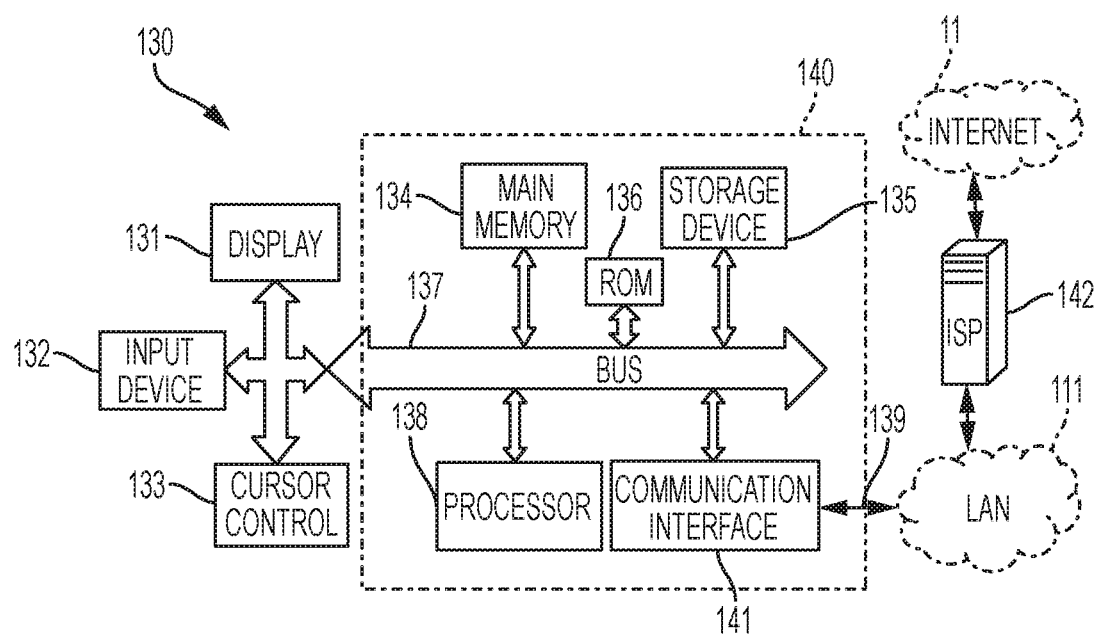
FIG. 12 is a block diagram that illustrates a system 130 including a computer system 140 and the associated Internet 11 connection upon which an embodiment, or a portion thereof, may be implemented.

FIG. 12 is a block diagram that illustrates a system 130 including a computer system 140 and the associated Internet 11 connection upon which an embodiment, or a portion thereof, may be implemented. Such configuration is typically used for computers (hosts) connected to the Internet 11 and executing a server or a client (or a combination) software. A source computer such as laptop, an ultimate destination computer and relay servers, for example, as well as any computer or processor described herein, may use the computer system configuration and the Internet connection shown in FIG. 12. The system 140 may be used as a portable electronic device such as a notebook/laptop computer, a media player (e.g., MP3 based or video player), a cellular phone, a Personal Digital Assistant (PDA), an image processing device (e.g., a digital camera or video recorder), and/or any other handheld computing devices, or a combination of any of these devices. Note that while FIG. 12 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used. The computer system of FIG. 12 may, for example, be an Apple Macintosh computer or Power Book, or an IBM compatible PC. Computer system 140 includes a bus 137, an interconnect, or other communication mechanism for communicating information, and a processor 138, commonly in the form of an integrated circuit, coupled with bus 137 for processing information and for executing the computer executable instructions. Computer system 140 also includes a main memory 134, such as a Random Access Memory (RAM) or other dynamic storage device, coupled to bus 137 for storing information and instructions to be executed by processor 138.

Main memory 134 also may be used for storing temporary variables or other intermediate information during execution of instructions to be executed by processor 138. Computer system 140 further includes a Read Only Memory (ROM) 136 (or other non-transitory non-volatile memory) or other non-transitory static storage device coupled to bus 137 for storing static information and instructions for processor 138. A storage device 135, such as a magnetic disk or optical disk, a hard disk drive for reading from and writing to a hard disk, a magnetic disk drive for reading from and writing to a magnetic disk, and/or an optical disk drive (such as DVD) for reading from and writing to a removable optical disk, is coupled to bus 137 for storing information and instructions. The hard disk drive, magnetic disk drive, and optical disk drive may be connected to the system bus by a hard disk drive interface, a magnetic disk drive interface, and an optical disk drive interface, respectively. The drives and their associated computer-readable media provide non-volatile storage of computer readable instructions, data structures, program modules and other data for the general purpose computing devices. Typically computer system 140 includes an Operating System (OS) stored in a non-volatile storage for managing the computer resources and provides the applications and programs with an access to the computer resources and interfaces. An operating system commonly processes system data and user input, and responds by allocating and managing tasks and internal system resources, such as controlling and allocating memory, prioritizing system requests, controlling input and output devices, facilitating networking and managing files. Non-limiting examples of operating systems are Microsoft Windows, Mac OS X, and Linux.

The term "processor" is meant to include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Furthermore, various functional aspects of the processor may be implemented solely as software or firmware associated with the processor.

Computer system 140 may be coupled via bus 137 to a display 131, such as a Cathode Ray Tube (CRT), a Liquid Crystal Display (LCD), a flat screen monitor, a touch screen monitor or similar means for displaying text and graphical data to a user. The display may be connected via a video adapter for supporting the display. The display allows a user to view, enter, and/or edit information that is relevant to the operation of the system. An input device 132, including alphanumeric and other keys, is coupled to bus 137 for communicating information and command selections to processor 138. Another type of user input device is cursor control 133, such as a mouse, a trackball, or cursor direction keys for communicating direction information and command selections to processor 138 and for controlling cursor movement on display 131. This input device typically has two degrees of freedom in two axes, a first axis (e.g., x) and a second axis (e.g., y), that allows the device to specify positions in a plane.

The computer system 140 may be used for implementing the methods and techniques described herein. According to one embodiment, those methods and techniques are performed by computer system 140 in response to processor 138 executing one or more sequences of one or more instructions contained in main memory 134. Such instructions may be read into main memory 134 from another computer-readable medium, such as storage device 135. Execution of the sequences of instructions contained in main memory 134 causes processor 138 to perform the process steps described herein. In alternative embodiments, hard-wired circuitry may be used in place of or in combination with software instructions to implement the arrangement. Thus, embodiments of the invention are not limited to any specific combination of hardware circuitry and software.

The term "computer-readable medium" (or "machine-readable medium") as used herein is an extensible term that refers to any medium or any memory, that participates in providing instructions to a processor, (such as processor 138) for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, and transmission medium. Transmission media includes coaxial cables, copper wire and fiber optics, including the wires that comprise bus 137. Transmission media can also take the form of acoustic or light waves, such as those generated during radio-wave and infrared data communications, or other form of propagated signals (e.g., carrier waves, infrared signals, digital signals, etc.). Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 138 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infra-red transmitter to convert the data to an infra-red signal. An infra-red detector can receive the data carried in the infra-red signal and appropriate circuitry can place the data on bus 137. Bus 137 carries the data to main memory 134, from which processor 138 retrieves and executes the instructions. The instructions received by main memory 134 may optionally be stored on storage device 135 either before or after execution by processor 138.

Computer system 140 also includes a communication interface 141 coupled to bus 137. Communication interface 141 provides a two-way data communication coupling to a network link 139 that is connected to a local network 111. For example, communication interface 141 may be an Integrated Services Digital Network (ISDN) card or a modem to provide a data communication connection to a corresponding type of telephone line. As another non-limiting example, communication interface 141 may be a local area network (LAN) card to provide a data communication connection to a compatible LAN. For example, Ethernet based connection based on IEEE802.3 standard may be used such as 10/100BaseT, 1000BaseT (gigabit Ethernet), 10 gigabit Ethernet (10 GE or 10 GbE or 10 GigE per IEEE Std 802.3ae-2002 as standard), 40 Gigabit Ethernet (40 GbE), or 100 Gigabit Ethernet (100 GbE as per Ethernet standard IEEE P802.3ba), as described in Cisco Systems, Inc. Publication number 1-587005-001-3 (6/99), "Internetworking Technologies Handbook", Chapter 7: "Ethernet Technologies", pages 7-1 to 7-38, which is incorporated in its entirety for all purposes as if fully set forth herein. In such a case, the communication interface 141 typically include a LAN transceiver or a modem, such as Standard Microsystems Corporation (SMSC) LAN91C111 10/100 Ethernet transceiver described in the Standard Microsystems Corporation (SMSC) data-sheet "LAN91C111 10/100 Non-PCI Ethernet Single Chip MAC+PHY" Data-Sheet, Rev. 15 (02-20-04), which is incorporated in its entirety for all purposes as if fully set forth herein.

Wireless links may also be implemented. In any such implementation, communication interface 141 sends and receives electrical, electromagnetic or optical signals that carry digital data streams representing various types of information.

Network link 139 typically provides data communication through one or more networks to other data devices. For example, network link 139 may provide a connection through local network 111 to a host computer or to data equipment operated by an Internet Service Provider (ISP) 142. ISP 142 in turn provides data communication services through the world wide packet data communication network Internet 11. Local network 111 and Internet 11 both use electrical, electromagnetic or optical signals that carry digital data streams. The signals through the various networks and the signals on the network link 139 and through the communication interface 141, which carry the digital data to and from computer system 140, are exemplary forms of carrier waves transporting the information.

A received code may be executed by processor 138 as it is received, and/or stored in storage device 135, or other non-volatile storage for later execution. In this manner, computer system 140 may obtain application code in the form of a carrier wave.

Accordingly, an aspect of an embodiment provides, but not limited thereto, a system, method and computer readable medium for software protection via composable process-level virtual machines. An aspect of an embodiment provides, but not limited thereto, a system, method and computer readable medium to set forth an application of low-overhead process-level virtualization to protect software applications from reverse engineering and tampering. In an embodiment, for example, the related approach and technique in this disclosure was evaluated using current state-of-the-art attacks to gauge its effectiveness. The results of the present inventors' investigation reveal that composable virtual machines are significantly more effective in thwarting reverse engineering and software tamper than current protection techniques. It should be appreciated that the security related system and method and the related networks, computer systems, internet, and components and functions may be implemented according to the scheme(s) disclosed herein.

Figure 13:
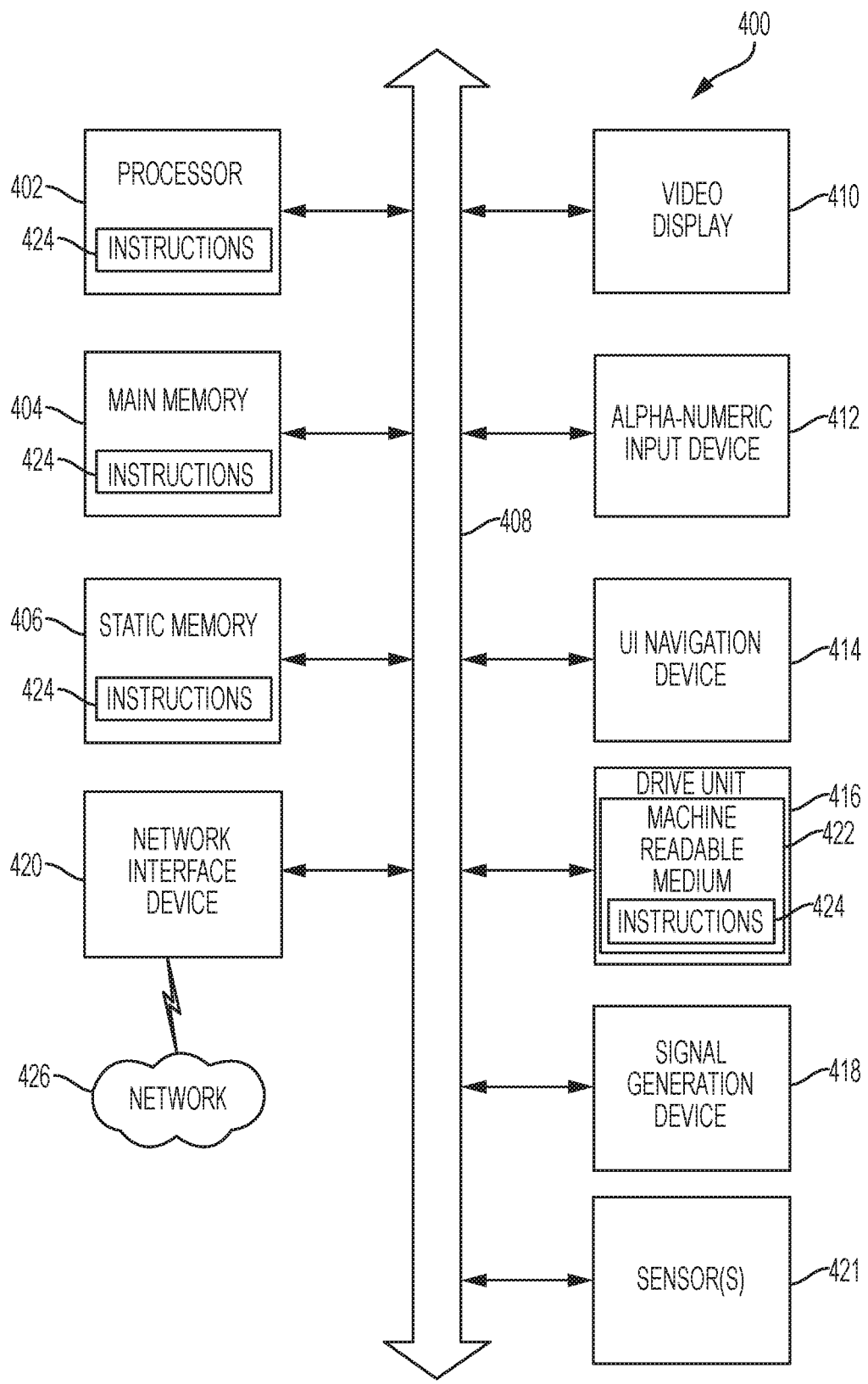
FIG. 13 is a block diagram illustrating an example of a machine upon which one or more aspects of embodiments of the present invention can be implemented.

FIG. 13 is a block diagram illustrating an example of a machine upon which one or more aspects of embodiments of the present invention can be implemented.

FIG. 13 illustrates a block diagram of an example machine 400 upon which one or more embodiments (e.g., discussed methodologies) can be implemented (e.g., run).

Examples of machine 400 can include logic, one or more components, circuits (e.g., modules), or mechanisms. Circuits are tangible entities configured to perform certain operations. In an example, circuits can be arranged (e.g., internally or with respect to external entities such as other circuits) in a specified manner. In an example, one or more computer systems (e.g., a standalone, client or server computer system) or one or more hardware processors (processors) can be configured by software (e.g., instructions, an application portion, or an application) as a circuit that operates to perform certain operations as described herein. In an example, the software can reside (1) on a non-transitory machine readable medium or (2) in a transmission signal. In an example, the software, when executed by the underlying hardware of the circuit, causes the circuit to perform the certain operations.

In an example, a circuit can be implemented mechanically or electronically. For example, a circuit can comprise dedicated circuitry or logic that is specifically configured to perform one or more techniques such as discussed above, such as including a special-purpose processor, a field programmable gate array (FPGA) or an application-specific integrated circuit (ASIC). In an example, a circuit can comprise programmable logic (e.g., circuitry, as encompassed within a general-purpose processor or other programmable processor) that can be temporarily configured (e.g., by software) to perform the certain operations. It will be appreciated that the decision to implement a circuit mechanically (e.g., in dedicated and permanently configured circuitry), or in temporarily configured circuitry (e.g., configured by software) can be driven by cost and time considerations.

Accordingly, the term "circuit" is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor, for example, to constitute a particular circuit at one instance of time and to constitute a different circuit at a different instance of time.

In an example, circuits can provide information to, and receive information from, other circuits. In this example, the circuits can be regarded as being communicatively coupled to one or more other circuits. Where multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one circuit can perform an operation and store the output of that operation in a memory device to which it is communicatively coupled. A further circuit can then, at a later time, access the memory device to retrieve and process the stored output. In an example, circuits can be configured to initiate or receive communications with input or output devices and can operate on a resource (e.g., a collection of information).

The various operations of method examples described herein can be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Similarly, the methods described herein can be at least partially processor-implemented. For example, at least some of the operations of a method can be performed by one or processors or processor-implemented circuits. The performance of certain of the operations can be distributed among the one or more processors, not only residing within a single machine, but deployed across a number of machines. In an example, the processor or processors can be located in a single location (e.g., within a home environment, an office environment or as a server farm), while in other examples the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).)

Example embodiments (e.g., apparatus, systems, or methods) can be implemented in digital electronic circuitry, in computer hardware, in firmware, in software, or in any combination thereof. Example embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

In an example, operations can be performed by one or more programmable processors executing a computer program to perform functions by operating on input data and generating output. Examples of method operations can also be performed by, and example apparatus can be implemented as, special purpose logic circuitry (e.g., a field programmable gate array (FPGA) or an application-specific integrated circuit (ASIC)).

The computing system can include clients and servers. A client and server are generally remote from each other and generally interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine 400) and software architectures that can be deployed in example embodiments.

In an example, the machine 400 can operate as a stand-alone device or the machine 400 can be connected (e.g., networked) to other machines.

In a networked deployment, the machine 400 can operate in the capacity of either a server or a client machine in server-client network environments. In an example, machine 400 can act as a peer machine in peer-to-peer (or other distributed) network environments. The machine 400 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) specifying actions to be taken (e.g., performed) by the machine 400. Further, while only a single machine 400 is illustrated, the term "machine" shall also be taken to include any collection of machines that individually or jointly execute a set (or multiple sets) of instructions to perform any one or more of the methodologies discussed herein.

Example machine (e.g., computer system) 400 can include a processor 402 (e.g., a central processing unit (CPU), a graphics processing unit (GPU) or both), a main memory 404 and a static memory 406, some or all of which can communicate with each other via a bus 408. The machine 400 can further include a display unit 410, an alphanumeric input device 412 (e.g., a keyboard), and a user interface (UI) navigation device 411 (e.g., a mouse). In an example, the display unit 410, input device 417 and UI navigation device 414 can be a touch screen display. The machine 400 can additionally include a storage device (e.g., drive unit) 416, a signal generation device 418 (e.g., a speaker), a network interface device 420, and one or more sensors 421, such as a global positioning system (GPS) sensor, compass, accelerometer, or other sensor.

The storage device 416 can include a machine readable medium 422 on which is stored one or more sets of data structures or instructions 424 (e.g., software) embodying or utilized by any one or more of the methodologies or functions described herein. The instructions 424 can also reside, completely or at least partially, within the main memory 404, within static memory 406, or within the processor 402 during execution thereof by the machine 400. In an example, one or any combination of the processor 402, the main memory 404, the static memory 406, or the storage device 416 can constitute machine readable media.

While the machine readable medium 422 is illustrated as a single medium, the term "machine readable medium" can include a single medium or multiple media (e.g., a centralized or distributed database, and/or associated caches and servers) that configured to store the one or more instructions 424. The term "machine readable medium" can also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine readable medium" can accordingly be taken to include, but not be limited to, solid-state memories, and optical and magnetic media. Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 424 can further be transmitted or received over a communications network 426 using a transmission medium via the network interface device 420 utilizing any one of a number of transfer protocols (e.g., frame relay, IP, TCP, UDP, HTTP, etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi®, IEEE 802.16 standards family known as WiMax®), peer-to-peer (P2P) networks, among others. The term "transmission medium" shall be taken to include any intangible medium that is capable of storing, encoding or carrying instructions for execution by the machine, and includes digital or analog communications signals or other intangible medium to facilitate communication of such software.

Accordingly, an aspect of an embodiment provides, but not limited thereto, a system, method and computer readable medium for software protection via composable process-level virtual machines. An aspect of an embodiment provides, but not limited thereto, a system, method and computer readable medium to set forth an application of low-overhead process-level virtualization to protect software applications from reverse engineering and tampering. In an embodiment, for example, the related approach and technique in this disclosure was evaluated using current state-of-the-art attacks to gauge its effectiveness. The results of the present inventors' investigation reveal that composable virtual machines are significantly more effective in thwarting reverse engineering and software tamper than current protection techniques. It should be appreciated that the security related system and method and the related networks, computer systems, internet, and components and functions may be implemented according to the scheme(s) disclosed herein.

Figure 14A:
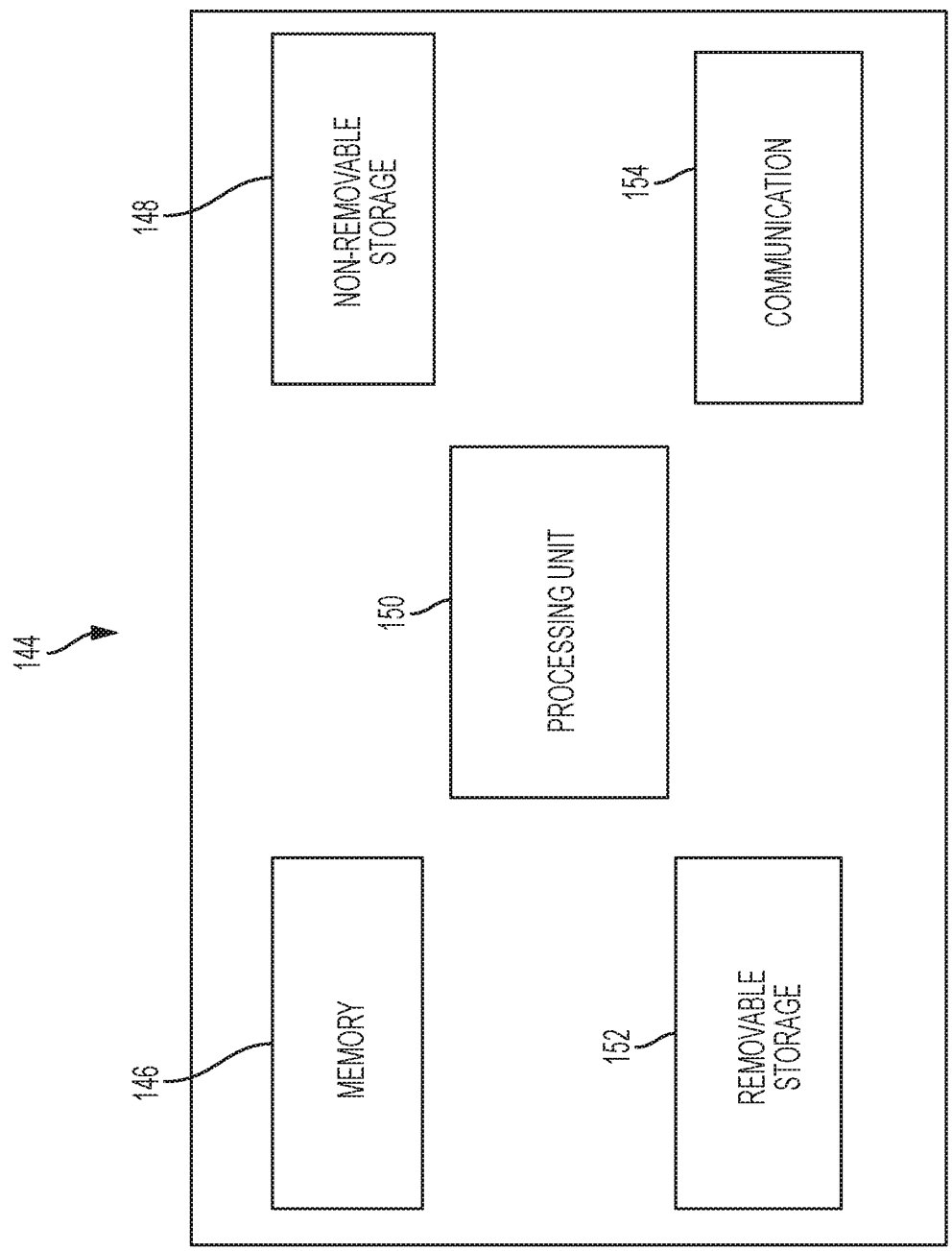
FIGS. 14A and 14B illustrate exemplary computing device(s) in which embodiments of the invention, or a portion thereof, can be implemented according to some illustrative embodiments.
Figure 14B:
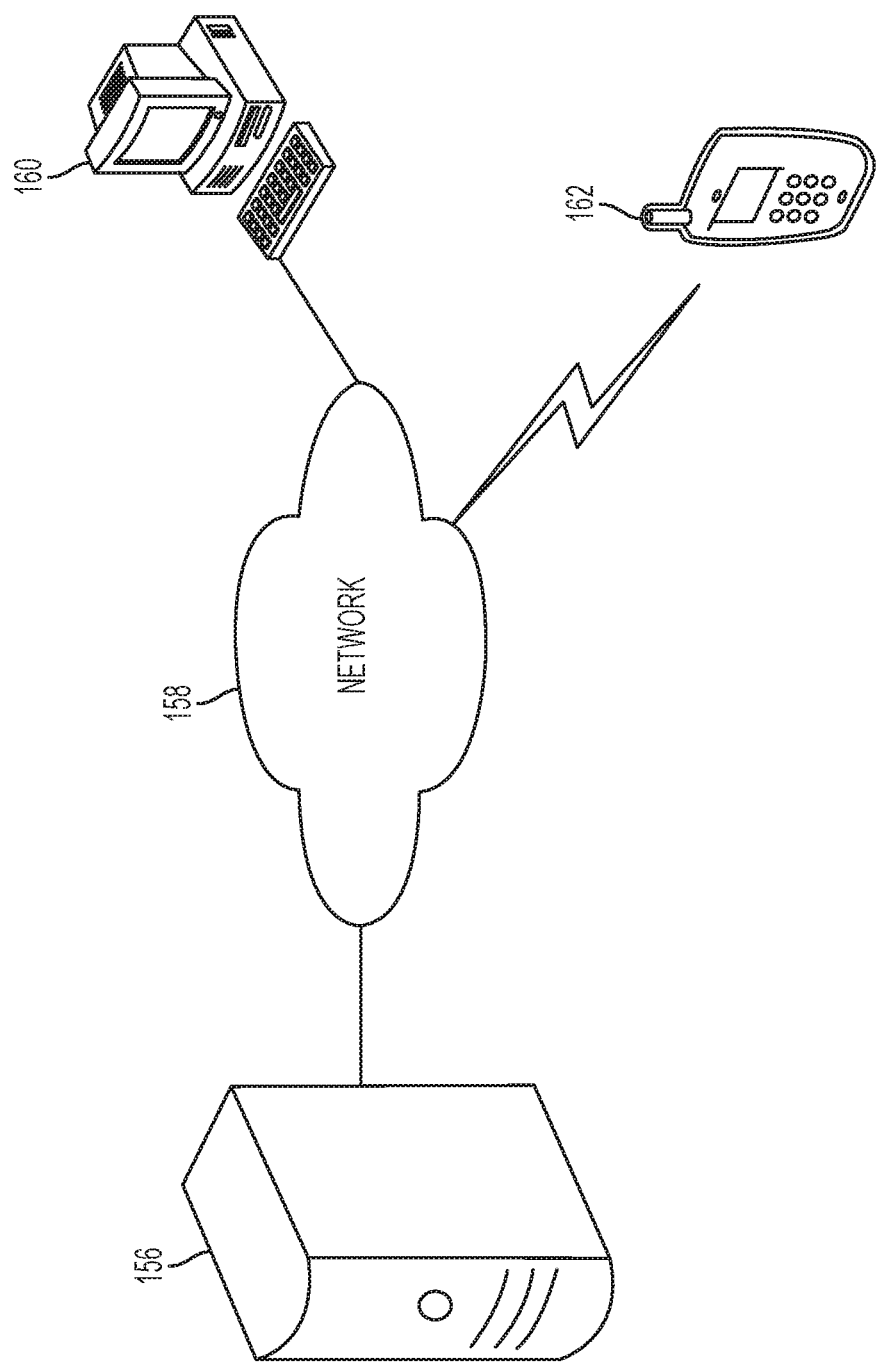

Various embodiments or aspects of the invention, for example, can be implemented as software in a computing device, or alternatively, on hardware. An exemplary computing device in which an embodiment of the invention, or a portion thereof, can be implemented is schematically illustrated in FIGS. 14A and 14B. Although some aspects may be known, a brief explanation will be provided herein for the convenience of other readers.

Referring to FIG. 14A, in its most basic configuration, computing device 144 typically includes at least one processing unit 150 and memory 146. Depending on the exact configuration and type of computing device, memory 146 can be volatile (such as RAM), non-volatile (such as ROM, flash memory, etc.) or some combination of the two.

Additionally, device 144 may also have other features and/or functionality. For example, the device could also include additional removable and/or non-removable storage including, but not limited to, magnetic or optical disks or tape, as well as writable electrical storage media. Such additional storage is the figure by removable storage 152 and non-removable storage 148. Computer storage media includes volatile and nonvolatile, removable and non-removable media implemented in any method or technology for storage of information such as computer readable instructions, data structures, program modules or other data. The memory, the removable storage and the non-removable storage are all examples of computer storage media. Computer storage media includes, but is not limited to, RAM, ROM, EEPROM, flash memory or other memory technology CDROM, digital versatile disks (DVD) or other optical storage, magnetic cassettes, magnetic tape, magnetic disk storage or other magnetic storage devices, or any other medium which can be used to store the desired information and which can accessed by the device. Any such computer storage media may be part of, or used in conjunction with, the device.

The device may also contain one or more communications connections 154 that allow the device to communicate with other devices (e.g. other computing devices). The communications connections carry information in a communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode, execute, or process information in the signal. By way of example, and not limitation, communication medium includes wired media such as a wired network or direct-wired connection, and wireless media such as radio, RF, infrared and other wireless media. As discussed above, the term computer readable media as used herein includes both storage media and communication media.

In addition to a stand-alone computing machine, embodiments of the invention can also be implemented on a network system comprising a plurality of computing devices that are in communication with a networking means, such as a network with an infrastructure or an ad hoc network. The network connection can be wired connections or wireless connections. As a way of example, FIG. 14B illustrates a network system in which embodiments of the invention can be implemented. In this example, the network system comprises computer 156 (e.g. a network server), network connection means 158 (e.g. wired and/or wireless connections), computer terminal 160, and PDA (e.g. a smart-phone) 162 (or other handheld or portable device, such as a cell phone, laptop computer, tablet computer, GPS receiver, mp3 player, handheld video player, pocket projector, etc. or handheld devices (or non portable devices) with combinations of such features). The embodiments of the invention can be implemented in anyone of the devices of the system. For example, execution of the instructions or other desired processing can be performed on the same computing device that is anyone of 156, 160, and 162. Alternatively, an embodiment of the invention can be performed on different computing devices of the network system. For example, certain desired or required processing or execution can be performed on one of the computing devices of the network (e.g. server 156), whereas other processing and execution of the instruction can be performed at another computing device (e.g. terminal 160) of the network system, or vice versa. In fact, certain processing or execution can be performed at one computing device (e.g. server 156); and the other processing or execution of the instructions can be performed at different computing devices that may or may not be networked. For example, the certain processing can be performed at terminal 160, while the other processing or instructions are passed to device 162 where the instructions are executed. This scenario may be of particular value especially when the PDA device, for example, accesses to the network through computer terminal 160 (or an access point in an ad hoc network). For another example, software to be protected can be executed, encoded or processed with one or more embodiments of the invention. The processed, encoded or executed software can then be distributed to customers. The distribution can be in a form of storage media (e.g. disk) or electronic copy.

Practice of an aspect of an embodiment (or embodiments) of the invention is presented herein for illustration only and should not be construed as limiting the invention in any way.

An approach of the present invention security related system and method may be based on the tools, programs and operating systems as discussed throughout this disclosure, such techniques can be applied to various hardware, tools, operating systems, virtual machine, PVM, or executable format.

The various embodiments of the present invention security system and method can be used in a wide variety of real-world situations to provide strong protection against attacks, as well other desired or required uses.

Listing 8.1: Value-based Dependence Analysis of PVM-protected applications, as defined by Coogan et al. [57]

```
VDA(T, C)
inputs:T Trace of PVM-protected Application, P
      :{C} Set of system calls belonging to P
S = { }
i = last instruction of T
while (i ∈ T ≠ empty)
do
            if (i ∈ C)
            then
                  S = { }
                  S = S ∪ use(i)
                  mark(i)
            endif
            if (def(i) ∈ S )
            then
                  S = S − def(i)
                  S = S ∪ use(i)
                  mark (i)
            endif
            i = prev(i)
done
use(i):
inputs:      i a read operand
             if (i reads register r)
             then
                   return r
             else if (i references memory address a )
                   return a
             endif
             return NULL
def(i):
inputs:      i a write operand
             if (i writes register r )
             then
                   return r
             else if (i writes memory address a)
                   return a
endif
return NULL
```

Listing 8.2: Example assembly code

| | | |
|---|---|---|
| /*$I_0$*/ | add $esp_1$, 8 | ;pop off two arguments of the stack |
| /*$I_1$*/ | popf | ;restore flags |
| /*$I_2$*/ | popa | ;restore registers |
| /*$I_3$*/ | lea $esp_2$, [$esp_1$ + 32] | ;pop off 32 bytes off the the stack |
| /*$I_4$*/ | jmp [$esp_2$ −24] | ;jump to address |
| /*$I_5$*/ | mov $ecx_1$, 0 x34 | ;mov 0x34 to ecx |
| /*$I_6$*/ | mov $eax_1$, [$ecx_1$ + 0 x1000] | ;move the valve of memory location a to eax |
| /*$I_7$*/ | mov $ebx_1$, 0 x124 | ;move 0x124 into ebx |
| /*$I_8$*/ | add $eax_2$, $ebx_1$ | ;add ebx to eax and store in eax |
| /*$I_9$*/ | mov $ebx_2$, $eax_2$ | ;store value in ebx, as argument for syscall |
| /*$I_{10}$*/ | mov $eax_3$, 4 | ;load syscall number into eax |
| /*$I_{11}$*/ | int 0 x80 | ;invoke system call ABI with argument |

Listing 8.3: Direct register transfer mov eax, ebx

Listing 8.4: Indirect, data transfer, created by Strata at run time.

```
push ecx
mov ecx, base
mov eax, [ecx + ebx*4]
pop ecx
```

Listing 8.5: Example assembly code using based, indexed indirect transfers

```
init_array:                              ;function to initialize the memory array
        mov ebx, 0xdeadbeef              ;load start address
L1:                                      ;start of loop
        mov ecx, 0                       ;set counter to zero
        mov [ebx], ecx                   ;set counter value at location
                                         ;start address + 4 * counter)
        add ebx, 4                       ;increment the address
        inc ecx                          ;increment counter
        xor ecx, n                       ;check for loop termination
        jnz L1                           ;iterate if loop not broken
        ...
        ...
/*I_0*/   add esp_1, 8                   ;pop off two arguments of the stack
/*I_1*/   popf                           ;restore flags
/*I_2*/   popa                           ;restore registers
/*I_3*/   lea esp_2, [esp_1 + 32]        ;pop off 32 bytes off the the stack
/*I_4*/   jmp [esp_2 -24]                ;jump to address
/*I_5*/   mov ecx_1, 0x34                ;mov 0x34 to ecx
/*I_6*/   mov eax_1, [ecx_1 + 0x1000]    ;move the value of memory location b to eax
/*I_7*/   mov ebx_1, 0x124               ;move 0x124 into ebx
/*I_8*/   add eax_2, ebx_1               ;add ebx to eax and store in eax
/*I_9*/   push edx_1                     ;save register
/*I_10*/  mov edx_2, 0xdeadbeef          ;set location of array in memory
/*I_11*/  mov eax_3, [edx_2 + eax_2]     ;load location (0xdeadbeef + eax) into eax
/*I_12*/  pop edx_3                      ;restore register
/*I_13*/  mov ebx_2, eax_3               ;store value in ebx, which acts as argument for syscall
/*I_14*/  mov eax_4, 4                   ;load syscall number into eax
/*I_15*/  int 0x80                       ;invoke system call ABI with argument
```

Listing 8.6: Modified definitions of def and use, to thwart trivial solution.

```
use(i):
    inputs:  i a read operand
        if (i reads register r)
        then
            return r
        else if (i references memory address a )
            return a and any registers used in calculation
        endif
        return NULL
def(i):
    inputs:  i a write operand
        if (i writes register r)
        then
            return r
        else if (i writes memory address a )
            return a
        endif
        return NULL
```

Listing 8.7: Example of address calculation in an instruction

```
mov eax, [ebp + esi]
```

Listing 8.8: Example code to illustrate Instruction Coverage for Variables. Note that the implementation actually works at the binary level.

```
1  int datum1 = 4; //   ICV_{datum1} = 1
2  int datum2 = 5; //   ICV_{datum2} = 1
3  int datum3 = datum1 * datum2; // ICV_{datum3} = ICV_{datum1} + ICV_{datum2} + 1
   lstsetlanguage=C,number=none,escapeinside=@@
```

Listing 8.9: Function prototype of strata_build_main

```
fcache_iaddr_t strata_build_main (app_iaddr_t to_PC, strata_fragment * from_frag)
```

Listing 8.10: Strata code snippet to access the
locations where application values are stored

```
eax_address = (int *)( ((char *)& from_frag) + 36);
ecx_address = (int *)( ((char *)& from_frag) + 32);
edx_address = (int *)( ((char *)& from_frag) + 28);
ebx_address = (int *)( ((char *)& from_frag) + 24);
```

Listing 8.11: Strain code modifying the applications values

```
*(eax_address) += frag -> fPC;
```

Listing 8.12: Strata code reverting the applications values

```
*(eax_address) -= frag -> fPC;
```

Terminology

Checker—Sequence of instructions that verify the integrity of code.
Composable virtualization—Multiple virtualization layers applied to different partitions of an application, to protect it from attacks.
Guard—Sequence of instructions that verify the integrity of statically-generated code.
Knot—Sequence of dynamically-generated instructions that verify the integrity of PVM generated code.
Output equality—A transformed version of an application is said to possess output equality, if it produces the same output as the original version, for any set of inputs.
Patch—Overwriting of a trampoline in the software cache, to transfer control to the translated instruction.
Software cache—Software-managed memory buffer where software dynamic translators cache the translated code, to amortize the overhead of translation. This region is also known as a code cache.
Trampoline—A code sequence appended to the end of a translated block, that returns control back to the software dynamic translator. It is also responsible for passing as an argument, the address containing the next application instruction scheduled for execution.
ABI—Application Binary Interface
CIF—Code Introspection Framework, which is capable of monitoring and instrumenting the code being executed.
CVM—Composable Virtualization Machines.
DIC—Dynamic Instruction Count. The dynamic instruction count of the application.
EP—The address of the function in the VM code which initiates the process of application virtualization. To mount a successful attack, the attacker has to determine the address of this function
ICV—Instruction Coverage for Variables. Number of instructions that affect the value of a variable.
PVM Process-level Virtual Machine. A software layer that virtualizes the processes that form an application.
SDT—Software Dynamic Translator. A process-level virtual machine that implements binary translation with caching.
SSA—Static Single Assignment. An intermediate representation in which each variable is assigned only once.
SVM System-level virtual machine. A software layer that virtualizes an entire Operating System.
VDA Value-based Dependence Analysis. An analysis technique which consists of identifying application data values from an execution trace, and performing flow analysis on these values in the reverse execution order.
VMM—Virtual Machine Monitor
$I^{HG}$—The set of instructions that are classified as homographic for a particular benchmark
$P_{T(A)}$—An application that has been tampered by an adversary.
$P_{TR(A)}$—An application that is protected by tamper-resistance techniques, static and dynamic

REFERENCES—PATENTS, ETC.

The devices, systems, algorithms, computer program products, computer readable medium, and methods of various embodiments of the invention disclosed herein may utilize aspects disclosed in the following references, applications, publications and patents and which are hereby incorporated by reference herein in their entirety (and which are not admitted to be prior art with respect to the present invention by inclusion in this section):

A. International Patent Application Serial No. PCT/US2006/026932, Davidson, et al., "Method and System for Software Protection Using Binary Encoding", filed Jul. 11, 2006; International Patent Application Publication No. WO 2007/008919, published Jan. 18, 2007.
B. U.S. patent application Ser. No. 11/995,272, Davidson, et al., "Method and System for Software Protection Using Binary Encoding", filed Feb. 29, 2008; U.S. Patent Application Publication No. US 2009/0144561, published Jun. 4, 2009.
C. International Patent Application No. PCT/US2008/087712, Davidson, et al., "System and Related Method for Protecting Software Via Continuous Anti-Tampering and Obfuscation Transforms", filed Dec. 19, 2008; International Patent Application Publication No. WO 2009/108245, published Sep. 3, 2009.
D. U.S. patent application Ser. No. 12/809,627, Davidson, et al., "Method and System for Software Protection Using Binary Encoding", filed Jun. 21, 2010; U.S. Patent Application Publication No. US 2011/0035601, published Feb. 10, 2011.
E. International Patent Application Serial No. PCT/US2013/027944, Hiser, et al., "Method of Instruction Location Randomization (ILR) and Related System", filed Feb. 27, 2013; International Patent Application Publication No. WO 2013/130548, published Sep. 6, 2013.
F. International Patent Application Serial No. PCT/US2013/070180, Nguyen-Tuong, et al., "Methods, Systems and Computer Readable Media for Detecting Command Injection Attacks", filed Nov. 14, 2013; International Patent Application Publication No. WO 2014/078585, published May 22, 2014.
G. U.S. patent application Ser. No. 14/381,464, Hiser, et al., "Method of Instruction Location Randomization (ILR) and Related System", filed Aug. 27, 2014.
H. U. S. Patent Application Publication No. US 2012/0026881 A1, Zuk, et al., "Packet Classification in a Network Security Device", Feb. 2, 2012.
I. U. S. Patent Application Publication No. US 2004/0098617 A1, Sekar, R., "Specification-Based Anomaly Detection", May 20, 2004.

REFERENCES—PUBLICATIONS

Each and every one of the following publications listed below is incorporated herein by reference in their entireties.

[1] David Aucsmith. Tamper-resistant software: An implementation. In *Proceedings of the 1st International Workshop on Information Hiding*, pages 317-333. London, U.K., 1996, Springer-Verlag.

[2] Hoi Chang and Mikhail J. Atallah. Protecting software code by guards. In *DRM '01: Revised Papers from the ACM CCS-8 Workshop on Security and Privacy in Digital Rights Management*, pages 160-175, London, UK, UK, 2092. Springer-Verlag.

[3] B. Horne, L. R, Matheson, C. Sheehan, and R. E. Tarjan. Dynamic self-checking techniques for improved tamper resistance. In *Digital Rights Management Workshop*, pages 141-159, London, U.K., 2001.

[4] Matthias Jacob, Mariusz H. Jakubowski, and Ramarathnam Venkatesan. Towards integral binary execution: Implementing oblivious hashing using overlapped instruction encodings. In *MM&Sec '07: Proceedings of the 9th Workshop on Multimedia & Security*, pages 129-140, New York, N.Y., USA, 2007. ACM Press.

[5] Arvind Seshadri, Mark Luk, Elaine Shi, Adrian Perrig, Loendert van Doorn, and Pradeep Khosla, Pioneer: Verifying code integrity and enforcing untampered code execution on legacy systems. In *SOSP '05: Proceedings of the 20th ACM Symposium cm Operating Systems Principles*, volume 39, pages 1-16, New York, N.Y., USA, December 2005. ACM Press.

[6] A. Seshadri, A. Perrig, L. van Doorn, and P. Khosla. SWATT: Software-based attestation for embedded devices. In *SP '04: Proceedings of the 25th IEEE Symposium on Security and Privacy*, pages 272-282, Oakland, Calif., May 2004.

[7] Christian Collberg, Clark Thomborson, and Douses Low. Manufacturing cheap, resilient, and stealthy opaque constructs. In *POPL '98: Proceedings of the 85th ACM SIGPLAN-SIGACT Symposium on Principles of Programming Languages*, pages 184-196, New York, N.Y., USA, 1998. ACM.

[8] C. Collberg, C. Thomborson, and D. Low. A taxonomy of obfuscating transformations. *University of Auckland Technical Report*, page 170, 1997.

[9] Chenxi Wang, Jonathan Hill, John Knight, and Jade Davidson. Software tamper resistance: Obstructing static analysis of programs. Technical report, University of Virginia, Charlottesville, Va., USA, 2960.

[10] Chenxi Wang, Jack Davidson, Jonathan Hill, and John Knight. Protection of software-based survivability mechanisms. In *DSN '01: Proceedings of the International Conference, on Dependable Systems and Networks*, pages 193-202, Goteborg, Sweden, 2001. IEEE Computer Society.

[11] Bertrand Anckaert, Mariusz Jakubowski, and Ramarathnam Venkatesan. Proteus: virtualization for diversified tamper-resistance. In *DRM '06: Proceedings of the ACM Workshop on Digital Rights Management*, pages 47-58, New York, N.Y., USA, 2006. ACM Press.

[12] Jan Cappaert, Bart Prunoel, Bertrand Anckaert, Matins Madou, and Koen De Bomchere. Towards tamper resistant code encryption: practice and experience. In *ISPEC '08: Proceedings of the 4th International Conference on Information Security Practice and Experience*, pages 88-100, Berlin, Heidelberg, 2008. Springer-Verlag.

[13] Chris Eagle. *The IDA Pro Book: The Unofficial Guide to the World's Most Popular Disassembler*. No Starch Press, San Francisco, Calif., USA, 2008.

[14] Oleh Yuschuk. Ollydbg: A window debugger. http://www.ollydbg.de, 2006.

[15] yOda. Lordpe: A pe file editor. http://http://www.woodmann.com/collaborative/tools/index.php/LordPE, 2009.

[16] Global Software Piracy Study for 2007, May 2008. Business Software Alliance.

[17] Raghusathan Srinivassan, Charles Colbourn, and A viral Shrivastava. Protecting anti-virus software under viral attacks, 2007.

[18] The Benst Worm. http://lists.virus.org/dshield-0310/msg00337.html.

[19] Philippe Biondi and Desclaux Fabriae. Silver needle in the skype. In *Black Hat Europe*, Amsterdam, the Netherlands, 2006.

[20] Glenn Wurster, P. C. van Oorsehot, and Anil Somsynji. A generic attack on checksumming-based software tamper resistance. In *SP '05: Proceedings of the 2005 IEEE Symposium on Security and Privacy*, pages 127-138, Washington D.C., U.S.A., 2005. IEEE Computer Society.

[21] Stanley Chow, Philip A. Eisen, Harold Johnson, and Paul C. van Oorschot. White-box cryptography and an AES implementation. In *SAC '02: Revised Papers from the 9th Annual International Workshop on Selected Areas in Cryptography*, pages 250-270, London, UK, 2003. Springer-Verlag.

[22] Boaz Barak, Oded Goldreich, Russell Impagliazza, Steven Rudich, Amit Sahai Salil P. Vadhan, and Ke Yang. On the (im)possibility of obfuscating programs. In *Crypto '01: Proceedings of the 21st Annual International Cryptology Conference on Advances in Cryptology*, pages 1-18. London, UK, 2001. Springer-Verlag.

[23] Cullen Linn and Sanmyn Debray. Obfuscation of executable code to improve resistance to static disassembly. In *CCS '03: Proceedings of the 10th ACM Conference on Computer and Communications Security (CCS)*, pages 290-299, Washington D.C., U.S.A., 2003. ACM Press.

[24] Kelly Heffner and Christian S. Collberg. The obfuscation executive. In Kan Zhang and Yuliang Zheng, editors, Information Security, *Proceedings of the 7th International Conference on Information security*, volume 3225 of *Lecture Notes in Computer Science*, pages 428-440, Springer, 2004.

[25] <G. Ramalingam. The undesirability of aliasing. *ACM Transactions on Programming Language and Systems*, 16(5): 1467-1471, 1994.

[26] G. E, Suh, D. Clarke, B. Gassend, M. van Dijk, and S, Devadas. AEGIS: Architecture for tamper evident and tamper resistant software. In *SC '03: Proceedings of the 17th Annual International Conference on Supercomputing*, pages 161-171. ACM Press, 2093.

[27] Robert M. Best. Preventing software piracy with crypto-microprocessors. In *The IEEE Spring COMPCON*, page 466, 1980.

[28] David Lie, Chandramohan Thekkath, Mark Mitchell, Patrick Lincoln, Dan Bonch, John Mitchell, and Mark Horowitz. Architectural support for copy and tamper resistant software. In *ASPLOS '00: Proceedings of the 9th International Conference on Architectural Support for Programming Languages and Operating Systems*, volume 35, pages 168-177, New York, N.Y., USA, 2000. ACM Press.

[29] David Lie, John Mitchell, Chandramohan A. Thekkath, and Mark Horowitz. Specifying and verifying hardware for tamper-resistant software. In *SP '03: Proceedings of the 2003 IEEE Symposium on Security and Privacy*, page 166, Washington D.C., U.S.A., 2003. IEEE Computer Society.

[30] Ganrav S. Kc, Angelos D. Keronytis, and Vassilis Pruvelakis. Countering code-injection attacks with instruction-set randomization. In *CCS '03: Proceedings of the 10th ACM Conference on Computer and Communications Security*, pages 272-280, New York, N.Y., USA, 2003. ACM Press.

[31] Benjamin A. Kuperman, Carla E. Brodley, Hilmi Ozboganogh, T. N. Vijaykumar, and Ankit Jalote. Detection and prevention of stack buffer overflow attacks. *Communications of the ACM*, 48(11):50-56, 2005.

[32] Vivek Haklar, Deepak Chandra, and Michael Franx. Semantic remote attestation: a virtual machine directed approach to trusted computing. In *VM '04; Proceedings of the 3rd Conference on Virtual Machine Research And Technology Symposium*, pages 3-3, Berkeley, Calif., USA, 2004. USENIX Association.

[33] Claude Castelluccia, Aurélien Francillos, Daniele Perito, and Claudio Soriente. On the difficulty of software-based attestation of embedded devices, in *CCS '09: Proceedings of the 16th ACM Conference on Computer and Communications Security*, pages 400-409. New York, N.Y., USA, 2009. ACM.

[34] Sudeep Ghosh, Jason D. Hiser, and Jack W. Davidson. A secure and robust approach to software tamper resistance. In *IH '10: Proceedings of the 12th International Conference on Information Hiding*, pages 33-47. Berlin, Heidelberg, 2010. Springer-Verlag.

[35] W. B. Kimball, SecureQEMU: *Emulation-based Software Protection Providing Encrypted Code Excisions and Page Granularity Code Signing*. Air Force Institute of Technology, 2008.

[36] VMProtect Software. VMProtect. http://vmpsoft.com/, 2008.

[37] Oreans Technology. Codevirtualizer. http://oreans.com/codevirtualizer.php, 2009.

[36] Oreans Technologies. Themida. http://oreans.com/themida.php, 2009.

[39] StarForce. Starforce crypto. http://www.star-force.com/, 2008.

[40] Tal Garfinkel, Ben Pfaff, Jim Chow, Mended Rosenblum, and Dan Boneh. Terra: a virtual machine-based platform for trusted computing. In *SOSP '03: Proceedings of the 19th ACM Symposium on Operating Systems Principles*, pages 193-206, New York, N.Y., USA, 2003. ACM Press.

[41] Rolf Rollus. Unpacking virtualization obfuscators. In *WOOT '09: Proceedings of the 3rd USENIX Conference on Offensive Technologies*, pages 1-10, Berkeley, Calif., USA, 2009. USENIX Association.

[42] Mathias Payer and Thomas R. Gross. Fine-grained user-space security through virtualization. In *VEE '11: Proceedings of the 7th ACM SIGPLAN/SIGOPS International Conference on Virtual Execution Environments*, pages 157-168, New York, N.Y., USA, 2011. ACM Press.

[43] Wei Hu, Jason D. Hiser, Daniel Williams, Adrian Filipi, Jack W. Davidson, David Evans, John C. Knight, Anh Nguyen-Tuong, and Jonathan Rowanhill. Secure and practical defense against code-injection attacks using software dynamic translation. In *VEE '06: Proceedings of the 2nd International Conference on Virtual Execution Environments*, pages 2-12, New York, N.Y., USA, 2008. ACM Press.

[44] Gerald J. Popek and Robert P. Goldberg, Formal requirements for virtualizable third generation architectures. *Communications of the ACM*, 17:412-421, July 1974.

[45] James C. Dehnert, Brian K. Grant, John P. Banning, Richard Johnson, Thomas Kistler, Alexander Klaiber, and Jim Mattson. The Transmeta code morphing software: using speculation, recovery, and adaptive retranslation to address real-life challenges. In *CGO '03: Proceedings of the international Symposium on Code Generation and Optimization*, pages 15-24, Washington, D.C., USA, 2001 IEEE Computer Society.

[46] Derek Bruening, Timothy Garnett, and Saman Amarasinghe. An infrastructure for adaptive dynamic optimization, in *CGO '03: Proceedings of the IEEE/ACM International Symposium on Code Generation and Optimisation*, pages 265-275, Los Alamitos, Calif., USA, 2003. IEEE Computer Society.

[47] Vladimir Kiriansky, Derek Bruening, and Saman P. Amarasinghe. Secure execution via program shepherding. In *USENIX '02: Proceedings of the 11th USENIX Security Symposium*, pages 191-296, Berkeley, Calif., USA, 2002. USENIX Association.

[48] Jim Smith and Ravi Nair. *Virtual Machines: Versatile Platforms for Systems and Processes (The Morgan Kaufmann Series in Computer Architecture and Design)* Morgan Kaufmann Publishers Inc., San Francisco, Calif., USA, 2005.

[49] John L. Hennesey and David A. Patterson. *Computer Architecture: A Quantitative Approach* Morgan Kaufmann Publishers Inc. San Francisco, Calif., USA, 3 edition, 2003.

[50] Paul Klint, Interpretation techniques. *Software-Practice and Experience*, 11(9):963-973, 1981.

[51] K. Scott, N. Kumar, S. Vehsamy, B. Childers, J. W. Davidson, and M. L. Soffa. Retargetable and reconfigurable software dynamic translation. In *CGO '03: Proceedings of the International Symposium on Code Generation and Optimisation*, pages 36-47, Washington D.C., U.S.A., 2003. IEEE Computer Society.

[52] Swaroop Sridhar, Jonathan S. Shapiro, Eric Northup, and Prashanth P. Bungale, HDTrans: An open source, kw-level dynamic instrumentation system. In *VEE '06: Proceedings of the 2nd International Conference on Virtual Execution Environments*, pages 175-185, Now York, N.Y., USA, 2006. ACM.

[53] Jason D. Hiser, Daniel Williams, Wei Hu, Jack W. Davidson, Jason Mars, and Bruce R. Childers. Evaluating indirect branch handling mechanisms in software dynamic translation systems. In *CGO '07: Proceedings of the International Symposium on Code Generation and Optimisation*, pages 61-73, Washington, D.C., USA, 2007. IEEE Computer Society.

[54] Jason D. Hiser, Darnel Williams, Adrian Filipi, Jack W. Davidson, and Bruce R. Childers, Evaluating fragment construction policies for SDT systems. In *VEE '06: Proceedings of the 2nd International Conference on Virtual Execution Environments*, pages 122-132, New York, N.Y., USA. 2006. ACM Press.

[55] Kim Hazelwood and James E. Smith. Exploring code cache eviction granularities in dynamic optimization systems. In *CGO '04: Proceedings of the International Symposium on Code Generation and Optimization: Feedback-directed and Runtime Optimisation*, pages 89-, Washington, D.C., USA, 2004. IEEE Computer Society.

[56] Kevin Scott and Jack Davidson. Safe virtual execution using software dynamic translation. In *ACSAC '02: Proceedings of the 18th Animal Computer Security Applications Conference*, page 209, Los Alamitos, Calif., USA, 2002. IEEE Computer Society.

[57] Kevin Coogan, Gen Lu, and Saumya Dehray. Deobfuscation of virutalization-obfuscated software: a semantics-based approach. In *CCS '11: Proceedings of* the 18th ACM conference on Computer and Communications Security, pages 275-284, New York. N.Y., USA, 2011. ACM.

[58] Cataldo Basile, Stefano Di Carlo, Thomas Herles, Brecht Wyseur, and Jasvir Nagra. Towards a formal model for software tamper resistance. http://www.cosic.cost.hulcueen.be/publications/article-1280.pdf, 2009.

[59] Christian Collberg and Jasvir Nagra. *Surreptitious Software: Obfuscation, Watermarking, and Tamperproofing for Software Protection*. Addison-Wesley Professional, 1st edition, 2009.

[60] Matthew A. Bishop, *The Art and Science of Computer Security*. Addison-Wesley Longman Publishing Co., Inc., Boston, Mass., USA, 2002

[61] Peter Szor, *The Art of Computer Virus Research and Defense*. Addison-Wesley Professional, 2005.

[62] Bruno De Bus, Bjorn De Sutter, Ludo Van Put, Dominique Chattel, and Koen De Boschere. Link-time optimization of ARM binaries. In *LCTES '04: Proceedings of the 2004 ACM SIGPLAN/SIGBED Conference on Languages, Compilers, and Tools for Embedded Systems*, pages 211-220, Washington D.C., U.S.A. 7 2004, ACM Press.

[63] Adi Shamir and Nicko van Someren. Playing "hide and seek" with stored keys. In *FC '99: Proceedings of the Third International Conference on Financial Cryptography*, pages 118-124, London, UK, UK, 1999. Springer-Verlag.

[64] J. Alex. Halderman, Seth D. Schoen, Nadia Heninger, William Clarkson, William Paul, Joseph A. Calaudrino, Ariel J. Feldman, Jacob Appellman, and Edward W. Felten. Lest we remember. Cold-boot attacks on encryption keys. In *USENIX '08: Proceedings of the 17th USENIX Security Symposium*, volume 52, pages 91-98, Berkeley, Calif. USA, May 2009. USENIX Technical Association.

[65] Yinqian Zhang, Ari Juels, Michael K. Reiter, and Thomas Ristenpart. Cross-VM side channels and their use to extract private keys. In *CCS '12: Proceedings of the 2012 ACM Conference on Computer and Communications Security*, pages 306-316, New York, N.Y., USA. 2012. ACM.

[66] Stanley Chow, Philip A. Eisen, Harold Johnson, and Paul C. van Oorschet. A white-box DES implementations for DRM applications. In *DRM '08; Proceedings of the Digital Rights Management Workshop*, pages 1-15, London, UK., 2002. Springer.

[67] Olivier Billet, Henri Gilbert, and Charaf Ech-Chalbi, Cryptanalysis of a white box AES implementation. In *Selected Areas in Cryptography*, pages 227-246, Heidelberg, 2004. Springer-Verlag.

[68] Brecht Wyseur, Wil Michiels, Paul Gorissen, and Bart Prensel. Cryptoanalysis of white-box DES implementations with arbitrary external encodings. In *SAC '07: Proceedings of the 14th International Conference on Selected Areas in Cryptography*, pages 264-277, Berlin, Heidelberg, 2007. Springer-Verlag.

[69] Hamilton E. Link and William D. Neumann. Clarifying obfuscation: improving the security of white-box DES. *ITCC '05: Proceedings of the International Conference on Information Technology: Coding and Computing*, 1:679-684, 2005.

[70] Brecht Wyseur, *White-Box Cryptography*. PhD thesis, Kathelicke Universiteit Leuven, 2000. Bart Preneel (promoter).

[71] Brecht Wyseur. White-box cryptography: Hiding keys in software. *MISC Magazine*, 5(5):65-72, 2012.

[72] R. A. Fisher and F. Yates. *Statistical Tables for Biological, Agricultural and Medical Research*. Oliver and Boyd, 2nd edition, 1943.

[73] Roberto Giauxhaxxi and Andrea Toppan. On entropy measures for endo obfuscation. In *SSP '12: Proceedings of the 2012 ACM SIGPLAN Software Security and Protection Workshop*, pages 1-8. New York, N.Y., USA, 2012 ACM.

[74] C. E. Shannon. A mathematical theory of communication. *ACM SIGMOBILE Mobile Computing and Communications Review*, 5(1):3-55, January 2001.

[75] G. Marsaglia. Random numbers fall mainly in the planes. *Proceedings of the National Academy of Sciences of the Untied Statin of America*, 60:25-28, 1968.

[76] S. Pineus. Approximate entropy as a complexity measure. *Proceedings of the National Academy of Sciences of the USA*, 88:2297-2301, 1991.

[77] S. Pineus and R. E. Kalman. Not all (possibly) "Random" sequences are created equal. *Proceedings of the National Academy of Sciences of the USA*, 94:3513-3518, 1997.

[78] Georgia Hansel, Dominique Perrin, and Imre Simon. Compression and entropy. In *STACS '92: Proceedings of the 9th Annual Symposium on Theoretical Aspects of Computer Science*, volume 577, London, UK, 1992. Springer Lecture Notes in Computer Science.

[79] J. Ziv and A. Lempel. Compressions of individual sequences via variable-rate coding. *IEEE Transactions on Information Theory*, 24(5):530-536, September 2006.

[80] Richard Wartell, Yan Zhou, Kevin W. Hamlen, Murat Kantareioglu, and Bhavani Thursisingham. Differentiating code from data in x86 binaries. In *ECML PKDD '11: Proceedings of the European Conference on Machine learning and Knowledge Discovery in Databases—Volume Part III*, pages 522-536. Berlin, Heidelberg, 2011. Springer-Verlag.

[81] Igor V. Popov, Sanmya K. Debray, and Gregory R. Andrews. Binary obfuscation using signals. In *SSYM '07: Proceedings of 16th USENIX Security Symposium—Volume 18*, pages 19:1-19:16. Berkeley, Calif., USA. 2007. USENIX Association.

[82] Chi-Kenug Luk, Robert Cohn, Robert Muth, Harish Patil, Artur Klanser, Geoff Lowney, Steven Wallace, Vijay Janapa Roddi, and Kim Hazelwood. Pin: Building customized program analysts tools with dynamic instrumentation. In *PLDI '05: Proceedings of the 2005 ACM SIGPLAN Conference on Programming Language Design and Implementation*, pages 190-200, New York, N.Y., USA, 2005. ACM Press.

[83] M. T. Yourst. PTLsim: A cycle accurate full system x86-64 microarchitectural simulator. In *ISPASS '07: Proceedings of the IEEE International Symposium on Performance Analysis of Systems and Software*, pages 23-34, Los Alamitos, Calif., USA, 2007. IEEE Computer Society.

[84] Sudeep Ghosh, Jason Hiser, and Jack W. Davidson. Software protection for dynamically-generated code. In *PPREW '13: Proceedings of the 2nd ACM SIGPLAN Program Protection and Reverse Engineering Workshop*, pages 1:1-1:12, Now York, N.Y., USA, 2013. ACM.

[85] Bertrand Anckaert, Bjorn De Sutter, and Koen Do Boschere. Software piracy prevention through diversity. In *DRM '04: Proceedings of the 4th ACM Workshop on Digital Rights Management*, pages 63-71, New York, N.Y., USA, 2004. ACM.

[86] Daniel Williams, Wei Hu, Jack W. Davidson, Jason D. Hiser, John C. Knight, and Auh Nguyen-Tuong. Security

[87] Sandeep Bhatkar and R. Sekar. Data space randomization. In *DIMVA '08: Proceedings of the 5th International Conference on Detection of Intrusions and Malware, and Vulnerability Assessment*, pages 1-22, Berlin, Heidelberg, 2008. Springer-Verlag.

[88] Sandeep Bhatkar, R. Sekar, and Daniel C. DuVarney. Efficient techniques for comprehensive protection from memory error exploits. In *SSYM '05: Proceedings of the 14th Conference an USENIX Security Symposium—Volume 14*, pages 17-17, Berkeley, Calif., USA, 2005. USENIX Association.

[89] Sandeep Bhatkar, Daniel C. DuVarney, and R. Sekar. Address obfuscation: An efficient approach to combat a board range of memory error exploits. In *SSYM '03: Proceedings of the 12th Conference on USENIX Security Symposium—Volume 12*, pages 8-8, Berkeley, Calif., USA, 2003, USENIX Association.

[90] Christian Collberg, Sam Martin, Jonathan Myers, and Jasvir Nagra. Distributed application tamper detection via continuous software updates. In *ACSAC '12: Proceedings of the 28th Annual Computer Security Applications Conference*, pages 319-328. New York, N.Y., USA, 2012. ACM.

[91] Serge Charnette, Olivier Ly, and Renaud Tabary. Automated extraction of polymorphic virus signatures using abstract interpretation, in *NSS '11: 5th International Conference on Network and System Security, NSS 2011*, Milan, Italy, Sep. 6-8, 2011, pages 41-48. IEEE, 2011.

[92] Philippe Beaucamps. Advanced metamorphic techniques in computer viruses. In *CESSE '07: Proceedings of the International Conference on Computer, Electrical, and Systems Science, and Engineering*, pages 10-23. Venice, Italy, 2007.

[93] Gang Tan, Yuqan Chen, and Mariusx H. Jakubowski. Delayed and controlled failures in tamper-resistant systems. In *Proceedings of 5th Information Hiding Workshop*, pages 216-231. Alexandria, Va., U.S.A., July 2006.

[94] Douglas E. Coner and David L. Stevens. *Internetworking with TCP/IP, Vol 2: Design, Implementation, and Intervals*. Prentice Hall, 2 edition, 1994.

[95] Frederick B. Cohen. Operating system protection through program evolution. *Journal on Computing Security*, 12(6):565-584, October 1993.

[96] Mark Stamp. Risks of monoculture. *Communications of the ACM*, 47(3):120-, March 2004.

[97] J. A. Whittaker. No clear answers on monoculture issues. *IEEE Security & Privacy*, 1(6):18-19, 2003.

[98] Jonathan T. Griffin, Mibini Christodarassu, and Louis Kruger. Strengthening software self-checksumming via self-modifying code. In *ACSAC '05: Proceedings of the 21st Annual Computer Security Applications Conference*, pages 23-32, Washington D.C., U.S.A., 2005. IEEE Computer Society.

[99] Matias Madou, Bertrand Ancknert. Bjorn De Sutter, and Koen De Bosschere. Hybrid static-dynamic attacks against software protection mechanisms. In *DRM '05: Proceedings of the 5th ACM workshop on Digital Rights Management*, pages 75-82, New York, N.Y., USA, 2005. ACM Press.

[100] S. K. Udupa, S. K. Debray, and M. Madou. Deobfuscation: Reverse engineering obfuscated code. In *WCRE '05: Proceedings of the international Working Conference on Reverse Engineering*, volume 6, pages 45-54, Los Alamitos, Calif., USA. November 2005, IEEE Computer Society.

[101] Jean-Marie Borella and Ludovic Me. Code obfuscation techniques for metamorphic viruses. *Journal of Computer Virology*, 4:211-220, 2008. 10.1007/a11416-008-0084-2.

[102] Monriul Sharif, Andrea Lanzi, Jonathan Giffin, and Wenke Lee. Automatic reverse engineering of malware emulators. In *SP '07: Proceedings of the 2009 30th IEEE Symposium on Security and Privacy*, pages 94-109, Washington, D.C., USA, 2009. IEEE Computer Society.

[103] Sudeep Ghosh, Jason Hiser, and Jack W. Davidson. Replacement attacks against VM-protected applications. In *VEE '2: Proceedings of the 8th ACM SIGPLAN/SIGOPS conference on Virtual Execution Environments*, pages 202-214, New York, N.Y., USA, 2012. ACM.

[104] Fabrice Bellard. QEMU, a fast and portable dynamic translator. In *ATEC '05: Proceedings of the USENIX Annual technical Conference*, pages 41-41, Berkeley, Calif., USA, 2005. USENIX Association.

[105] John L. Henning. SPEC CPU2000: Measuring CPU performance in the new millenium. *Computer*, 33(7):28-35, July 2000.

[106] Felix Gröbert, Carsten Willems, and Thorsten Holz. Automatic identification of cryptographic primitives in binary programs. In *RAID '11: Proceedings of the 14th International Symposium on Recent Advances in Intrusion Detection*, pages 45-65, London, UK, 2011. Springer-Verlag.

[107] Franek Leder, Peter Martini, and Andrew Wichmann. Finding and extracting crypto routines from malware. In *Proceedings of the IEEE 28th International Performance Computing and Communications Conference (IPCCC)*, pages 394-401. Washington, D.C., USA, December 2009. IEEE.

[108] Juan Caballero, Noah M. Johnson, Stephen McCamant, and Dawn Song. Binary code extraction and interface identification for security applications. In *NDSS '10: Proceedings of the Network and Distributed System Security Symposium*. The Internet Society, 2010.

[109] R. L. (Robert Lawrence) Trask. *A dictionary of phonetics and phonology*/R. L. Trask. London; New York: Routledge, 1996. Includes bibliographical references.

[110] Alfred Whitehead and Bertrand Russell. *Principia Mathematica* Number v. 2 in Principia Mathematics. University Press, 1912.

[111] Alfred V. Aho, Ravi Sethi, and Jeffrey D. Ullman. *Compilers: principles, techniques, and tools*. Addison-Wesley Longman Publishing Co., Inc., Boston, Mass. USA, 1986.

[112] Intel Corporation. *IA-64 application developer's architecture guide*. Intel Corporation, 1999.

[113] Asia Slowinska, Traian Stancescu, and Herbert Bos. Howard: A dynamic excavator for reverse engineering data structures. In *NDSS '11: Proceedings of the 18th Annual Network and Distributed System Security Symposium*, San Diego, Calif., 2011. The Internet Society.

[114] James Clause, Wauchun Li, and Alessandro Orso. Dytan: A generic dynamic taint analysis framework. In *ISSTA '07:Proceedings of the 2007 International Symposium an Software Testing and Analysis*, pages 196-206, New York, N.Y., USA, 2007, ACM.

[115] G. Edward Suh, Jae W. Lee, David Zhang, and Srinivus Devadae. Secure program execution via dynamic information flow tracking. In *ASPLOS '04: Proceedings of the 11th International Conference on Architectural Support for Programming Languages and Operating Systems*, pages 85-96, Now York, N.Y., USA, 2004. ACM.

[116] Harry J. Saal and Israel Gat. A hardware architecture for controlling information flow. In *ISCA '78: Proceedings of the 5th Annual Symposium on Computer Architecture*, pages 73-77, New York, N.Y., USA, 1978. ACM.

[117] Vasileics P. Kenerlis, Georgios Portokalidis, Kangkook Jae, and Angelos D. Keromytis. Hbdft: Practical dynamic data flow tracking for commodity systems. In *VEE '12: Proceedings of the 8th ACM SIGPLAN/SIGOPS Conference on Vertical Execution Environments*, pages 121-132, New York, N.Y., USA, 3012. ACM.

[118] Gogul Balakrishman and Thomas Reps. DIVINE: Discovering variables in executables. In *VM-CAI '07: Proceedings of the 8th International Conference on Verification, Model Checking, and Abstract Interpretation*, pages 1-28, Berlin, Heidelberg, 2007. Springer-Verlag.

[119] Gogul Balakrishman. *WYSINWYE: What you see is not what you execute*. PhD thesis, University of Wisconsin at Madison, Madison, Wis., USA, 2007. AA13278779.

[120] Thomas Reps, Gogul Balkrishman, and Junghee Lim. Intermediate-representation recovery from low-level code. In *PEPM '06: Proceedings of the 2006 ACM SIGPLAN Symposium on Partial Evaluation, and Semantics-based Program Manipulation*, pages 100-111, New York, N.Y., USA. 2006. ACM.

[121] Anthony Cozzie, Frank Stratton, Hui Xue, and Samuel T. King. Digging for data structures. In *OSDI '08: Proceedings of the 8th USENIX Conference on Operating Systems Design and Implementation*, pages 255-266, Berkeley, Calif., USA, 2008. USENIX Association.

[122] Zlriqiang Lin, Xiangyu Zhang, and Dongyan Xu. Automatic reverse engineering of data structures from binary execution. In *NDSS '10: Proceedings of the 17th Annual Network and Distributed System Security Symposium*. The Internet Society, 2010.

[123] Aria Slowinska, Traian Stanceaen, and Herbert Bos. DDE: Dynamic data structure excavation. In *APSys '10: Proceedings of the First ACM Asia-Pacific Workshop on systems*, pages 13-18, New York, N.Y., USA, 2010. ACM.

[124] Steve Zdancewic, Lantian Zheng, Nathaniel Nystrum, and Andrew C. Myers, Untrusted hosts and confidentiality; secure program partitioning. In *SOSP '01: Proceedings of the 18th ACM Symposium on Operating Systems Principles*, pages 1-14, New York, N.Y., USA, 2001. ACM.

[125] S. H. K. Narayanan, M. Kandermir, and R. Brooks. Performance aware secure code partitioning. In *DATE '07; Proceedings of the Conference on Design, Automation and Test in Europe*, pages 1122-1127, San Jose, Calif., USA, 2007. EDA Consortium.

[126] Dan Sandergaard, Christian W. Probst, Christian Damagaard Jensen, and René Rydhof Hansen. Program partitioning using dynamic trust models. In *FAST '06: Proceedings of the 4th international conference on Formal aspects in security and trust*, pages 170-184. Berlin, Heidelberg, 2007. Springer-Verlag.

[127] Tao Zhang, Santosh Pande, Andre dos Santos, and Franz Josef Bruecklmayr. Leakage-proof program partitioning. In *CASES '02, Proceedings of the 2002 International Conference on Compilers, Architecture, and Synthesis for Embedded Systems*, pages 136-145. New York, N.Y., USA, 2002. ACM.

[128] Thomas J. McCabe. A complexity measure. In *ICSE '70: Proceedings of the 2nd International Conference on Software Engineering*, pages 407-, Los Alamitos, Calif., USA, 1976. IEEE Computer Society Press.

[129] Bertrand Ancknert, Matias Madou, Bjorn De Sutter, Bruno Du Bus, Koen Do Bosechere, and Bart Preneol. Program obfuscation: a quantitative approach. In *QoP '07: Proceedings of the 2007 ACM Workshop on Quality of Protection*, pages 15-20, New York, N.Y., USA, 2007. ACM.

[130] Mariano Coccato, Massimiliano Di Penta, Jaxvir Nagra, Paolo Falearin, Filippo Rieca, Marco Torchiano, and Paolo Tonella. Towards experimental evaluation of code obfuscation techniques. In *QoP '08: Proceedings of the 4th ACM Workshop on Quality of Protection*, pages 39-46, New York, N.Y., USA, 2008. ACM.

[131] Stephen A. Cook. The complexity of theorem-proving procedural. In *STOC '71: Proceedings of the Third annual ACM Symposium on Theory of Computing*, pages 151-158, New York, N.Y., USA, 1971. ACM.

[132] Yaichiro Kanzaki, Akito Mondes, Maxahide Nakamara, and Ken-ichi Matsumoto. Exploiting self-modification mechanism for program protection. In *COMPSAC '03: Proceedings of the 27th Annual International Conference on Computer Software and Applications*, pages 170-176, Washington, D.C., USA, 2008. IEEE Computer Society.

[133] Matias Madou, Bertrand Ancksert, Patrick Moseley, Sauraya Debray, Bjorn De Sutter, and Koen Do Bosschere. Software protection through dynamic code mutation. In *The 6th International Workshop on Information Security Applications* (WISA 2005) volume LNCS. Springer Verlag, August 2005.

[134] Mariano Coccate, Mila Dalla Proda, Jasvir Nagra, Christian Collberg, and Paolo Tonella, Barrier slicing for remote software trusting. In *SCAM '07: Proceedings of the 7th IEEE International Working Conference, on Source Code Analysis and Manipulation*, pages 27-36, Washington D.C., U.S.A., 2607. IEEE Computer Society.

[135] Manuel Blum and Sampath Kaman. Designing programs that check their work. *Journal of the ACM*, 42(1): 269-291, 1995.

[136] T. Holz and F. Raynal. Detecting honeypots and other suspicious environments. In *Proceedings from the Sixth Annual IEEE Information Assurance Workshop*, pages 29-36, June 2005.

[137] Kaiping Liu, Hoe Beng Kuan Tau, and Xu Chen. Binary code analysis. *IEEE Computer*, 46(8):60-68, 2013,

[138] Cristina Oifuentes and Mike Van Emmerik. Recovery of jump table ease statements from binary code. In *IWPC '99: Proceedings of the 7th International Workshop on Program Comprehension*, pages 192-, Washington, D.C., USA, 1999. IEEE Computer Society.

[139] Christian Collberg, Jasvir Nagra, and Fei-Yue Wang. Surreptitious software: Models from biology and history. *Communications in Computer and Information Science*, 1:1-21, 2007.

[140] Manuel Egele, Theodoor Scholte, Engin Kirda, and Christopher Kruegel. A survey on automated dynamic malware-analysis techniques and tools. *ACM Computing Survey*, 44(2):6:1-6:42, March 2008.

[141] Nikau Mavrogiammposlos, Nessim Kisserli, and Bart Prunel. A taxonomy of self-modifying code for obfuscation. *Computers & Security*, 30(8):679-691, 2011.

[142] Xiaoxin Chen, Tul Garfunkel, E. Christopher Lewis, Pratap Subrahmamyam, Carl A. Waldspurger, Dan Bonels, Jeffrey Dwoskin, and Dan R. K. Ports. Overshadows A virtualization-based approach to retrofitting protection in commodity operating systems. In *ASPLOS XIII: Proceedings of the 13th International Conference on Architectural Support for Programming Languages and Operating Systems*, pages 2-13, New York, N.Y., USA, 2008. ACM Press.

[143] Nguyen Anh Quysh. Hijacking (Xen) virtual machine for fun and profit. In *Bellua Security Conference*, Jakarta, Indonesia, 2007.

[144] Christian Collberg, Jaxvir Nagra, and Will Snavely, binalian: Remote tamper-resistance with continuous replacement. Technical report, Tuscon, Ariz., USA, 2008.

[145] Peter Williams and Rick Boivie. Cpu support for secure executables. In *TRUST '11: Proceedings of the 4th International Conference on Trust and Trustworthy Computing*, pages 172-187, Berlin, Heidelberg, 2011. Springer-Verlag.

[146] Louis F. G. Samanta, Marten van Dijk, Charles W. O'Donnell, Jonathan Rhodes, and Srinivas Devadas. Virtual monotonic counters and count-limited objects using a tpm without a trusted os. In *STC '06: Proceedings of the 1st ACM Workshop on Sealable Trusted Computing*, pages 27-42, Now York, N.Y., USA, 2006. ACM Press.

[147] Mikhail J. Alallah, Erie D. Bryant, John T. Korh, and John R. Rico. Binding software to specific native hardware in a VM environment: the PUF challenge and opportunity. In *VMSec '08: Proceedings of the 1st ACM Workshop on Virtual Machine Security*, pages 45-48. New York, N.Y., USA, 2008. ACM.

[148] Ryan W. Moore, José A. Baiochi. Bruce R. Childers, Jack W. Davidson, and Jason D. Hiser. Addressing the challenges of DBT for the ARM architecture. In *LCTES '09; Proceedings of the 2009 ACM SIGPLAN/SIGBED conference on Languages, compilers, and tools for embedded systems*, pages 147-156, New York, N.Y., USA, 2009. ACM.

Broad Scope the Invention

Unless clearly specified to the contrary, there is no requirement for any particular described or illustrated activity or element, any particular sequence or such activities, any particular size, speed, material, duration, contour, dimension or frequency, or any particularly interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. It should be appreciated that aspects of the present invention may have a variety of sizes, contours, shapes, compositions and materials as desired or required.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the disclosure, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method for blending the data of an execution environment and the data of the protected application, comprising:

modifying the data values of the protected application using the values of the execution environment in a semantically-neutral manner or modifying the data values of the execution environment using the values of the protected application in a semantically-neutral manner, wherein the execution environment comprises a process-level virtual machine.

2. The method for blending the data of an execution environment and the data of the protected application according to claim 1, comprising:

modifying the data values of the execution environment using the values of the protected application in a semantically-neutral manner, wherein the execution environment comprises a process-level virtual machine.

3. The method according to claim 1 or claim 2, wherein the modifying step includes:

applying at least one operation on the data values of the protected application using an execution environment data value as an operand; and applying the inverse of the at least one operation using the same execution environment data value as an operand.

4. The method according to claim 3, wherein the modifying step occurs at different points in the run time of the protected application.

5. The method according to claim 3, wherein the modifying step occurs when the execution environment obtains control, the execution environment translates or analyzes the protected application, when the execution environment beings execution, or when the protected application begins execution.

6. The method according to claim 3, wherein the modifying step includes:
- storing the data values of the protected application on a software stack;
- using the execution environment to read the data values on the software stack;
- changing at least one data value using at least one execution environment variable;
- storing the changed at least one data value back on the software stack;
- translating the protected application with the at least one changed data value using the execution environment;
- reverting the changes to the at least data value after translating; and
- storing the reverted at least data value to the original stack position,
- wherein the changes to the at least one data value have no semantic effect of the protected application.

7. The method according to claim 6, wherein the at least one execution environment variable is determined based on the number of execution environment operations that affect the variable.

8. The method of claim 1, wherein said modifying involves modifying the data values of the protected application using the values of the execution environment in a semantically-neutral manner.

* * * * *